United States Patent [19]

Wexler et al.

[11] Patent Number: 4,812,627

[45] Date of Patent: Mar. 14, 1989

[54] TIME CLOCK SYSTEM

[75] Inventors: Joel S. Wexler, Des Plaines; John J. Bednarz, Elmhurst, both of Ill.

[73] Assignee: Cyborg Systems, Inc., Chicago, Ill.

[21] Appl. No.: 845,542

[22] Filed: Mar. 28, 1986

[51] Int. Cl.⁴ .............................................. G06K 7/10
[52] U.S. Cl. ..................................... 235/377; 364/406
[58] Field of Search ................. 364/401, 406; D10/41; 235/376, 377

[56] References Cited

U.S. PATENT DOCUMENTS

| | | | |
|---|---|---|---|
| 3,699,525 | 10/1972 | Klavins | 364/200 |
| 3,894,215 | 7/1975 | Lotter | 235/377 |
| 4,004,283 | 1/1977 | Bennet | 364/200 |
| 4,270,043 | 5/1981 | Baxter | 235/377 X |
| 4,323,771 | 4/1982 | Chalker | 235/377 |
| 4,538,056 | 8/1985 | Young | 235/377 |

*Primary Examiner*—Jerry Smith
*Assistant Examiner*—Steven G. Kibby
*Attorney, Agent, or Firm*—Laff, Whitesel, Conte & Saret

[57] ABSTRACT

An employee clock system is disclosed which has a central data collector device connected to a plurality of remote satellite time clock stations. The timekeeping function is performed at the central data collector, and communication between the data collector and the time clocks takes place over communication channels wired in a spoke, rather than in a loop, configuration. The system permits use of a supervisor's card to clock in for another employee, while preventing non-supervisory employees from doing so. The central data collector collects employee attendance data from all the remote time clock stations, puts it in a form usable by a general purpose programmable computer, and sends it to the computer for use in preparing a payroll, Battery backup is provided to permit employees to clock out in the event that the plant is closed because of a power failure.

7 Claims, 11 Drawing Sheets

TIME CLOCK SYSTEM

Field of the Invention

This invention relates to a time clock system. It can be used for recording employee attendance in order to gather data for the preparation of payrolls and other personnel records, as well as for keeping track of employee traffic, controlling access to secure areas, and other applications.

Background and Prior Art

Time clock systems are known in which a plurality of time clock stations are distributed around a plant for clocking employees in and out of work at the beginnings and ends of their work shifts and lunch breaks, and also for keeping track of transfers between departments. Such systems, however, have involved a certain amount of undesirable redundancy, inasmuch as timekeeping circuitry for keeping track of the date and time of day must be duplicated for each time clock station.

In addition, the timekeeping circuitry of the different stations may get out of synchronization with each other as timekeeping errors accumulate at different rates. This is particularly undesirable if an employee may sometimes clock in at one station and clock out at another.

One solution to the problem of synchronization is to provide timekeeping at a common central location for all time clock stations. But if that approach is taken, it is undesirable to wire the central timekeeping device and the various remote time clock stations together in a loop configuration, because it is characteristic of such wiring configurations that a failure of one time clock station disables the entire system and thus prevents communication between the central timekeeping device and any other remote time clock station.

In the past, there has been a problem when a plant is shut down by a general power failure and the employees consequently are sent home, but are unable to clock out because the power failure disables the time clock system.

A desirable objective in the design of a time clock system is that it be able to collect in one place, in electronically readable form, all the employee attendance data gathered by a plurality of individual time clock stations, so that such data can subsequently be used in computer preparation of payrolls and other personnel records.

It is possible to use machine-readable identification cards to identify the employees as they clock in and out. One of the problems with such identification cards, however, is that employees sometimes forget to bring them to work, and thus are unable to clock in or out. It is possible to design a cardreading time clock system so that the identity card of another employee can be used in place of the one which as been forgotten, and a manual input device such as a keyboard can be used to enter the proper employee identification code; but in such a system falsification of attendance entries can occur too easily if employees are able to clock in and out for each other without restriction.

BRIEF SUMMARY OF THE INVENTION AND ITS OBJECTIVES

The present invention is intended to provide an employee time clock system having a central data collector device connected to a plurality of remote time clock stations. One of the objectives of the system is that the timekeeping function for the entire system shall be performed exclusively at the central data collector. Another objective is that communication between the data collector and the time clocks shall take place over a communication system wired in a spoke, rather than in a loop, configuration, so that a disabled time clock does not disable the entire system. Another objective is that the system shall permit use of one employee's card to clock in for another employee, but subject to control by a supervisor. Another objective is that the central data collector shall collect employee attendance data from all the remote time clock stations, put it in a form suitable for use by a general purpose programmable computer, and send it to the computer for use in preparing a payroll or performing other personnel management functions. Another objective is that battery back-up shall be provided in order to permit employees to clock out in the event that the plant is closed because of an AC power failure.

Thus, in accordance with one aspect of the present invention, there is provided an attendance recording system comprising a plurality of satellite devices, each adapted to register information concerning arrival and departure times of respective individuals, and having volatile means for storing such information temporarily. In addition, there is at least one central device having storage means capable of writing to and reading from a non-volatile storage medium, processing means, data communications means responsive to the processing means, communications channel means linking the communications means to the satellite devices, and program means arranged to direct the processing means to cause the data communications means to read out the information stored by the satellite devices over the communications channel means and to write the information to the storage means. Thus, the attendance information entered into the satellite devices is collected in one place in machine-readable form for subsequent use by a computer, for example, in the preparation of payrolls.

In accordance with another aspect of the invention, a system adapted to record arrival and departure times of employees comprises a plurality of machine-readable documents adapted to be given to respective employees and at least one supervisor, the documents contain information for identifying the recipients thereof. At least one time clock station is provided, and includes document reading means adapted to read the documents, alterable means for temporarily storing information read from the documents, means for displaying information stored therein, and means for altering the currently stored information. The document of any such supervisor contains information which distinguishes a supervisor from non-supervisors. The time clock station includes processing means, and program means arranged to cause the processing means to prevent the altering means from altering at least some of the information read from the documents, but to permit at least some of the information which is non-alterable by non-supervisors to be altered when the supervisor identifying information is detected.

If the information which is alterable only by a supervisor includes the information for identifying the recipients of the documents, then the supervisor may operate the time clock station on behalf of an employee who is not in possession of his identifying document.

In accordance with another aspect of the invention, a system adapted to record arrival and departure times of employees, comprises at least one satellite device and at least one central device having time-keeping means, data communications means, communications channel means linking the communications means to the satellite devices, and means arranged to cause the data communications means to communicate time information supplied by the time-keeping means over the communications channel means to the satellite devices. The satellite devices are adapted to employ the time information supplied by the central device to register information concerning arrival and departure times of respective individuals, and have means for storing the information. The central device has means arranged to cause the data communications means to read out the information stored by the satellite devices over the communications channel means.

In addition, the communications channel means linking the communications means to the satellite devices may comprise a separate and independent electrical path between the central device and each of the satellite devices, so that the failure of any of the satellite devices does not impair communication between the central device and the other satellite devices.

It is also contemplated by this invention that power supply means are provided at the satellite devices and the central device, each including both means adapted to power the devices from an alternating current wall outlet and battery-operated back-up power supply means arranged to power the devices in the event of a failure of the alternating current supply, whereby to permit the employees to clock out in the event of a plant closure during the power failure.

A preferred embodiment of the invention will now be described in detail, for the purpose of illustrating the general concepts of the invention. The detailed description will be correlated with the following drawings.

DRAWINGS

Figure 7A:
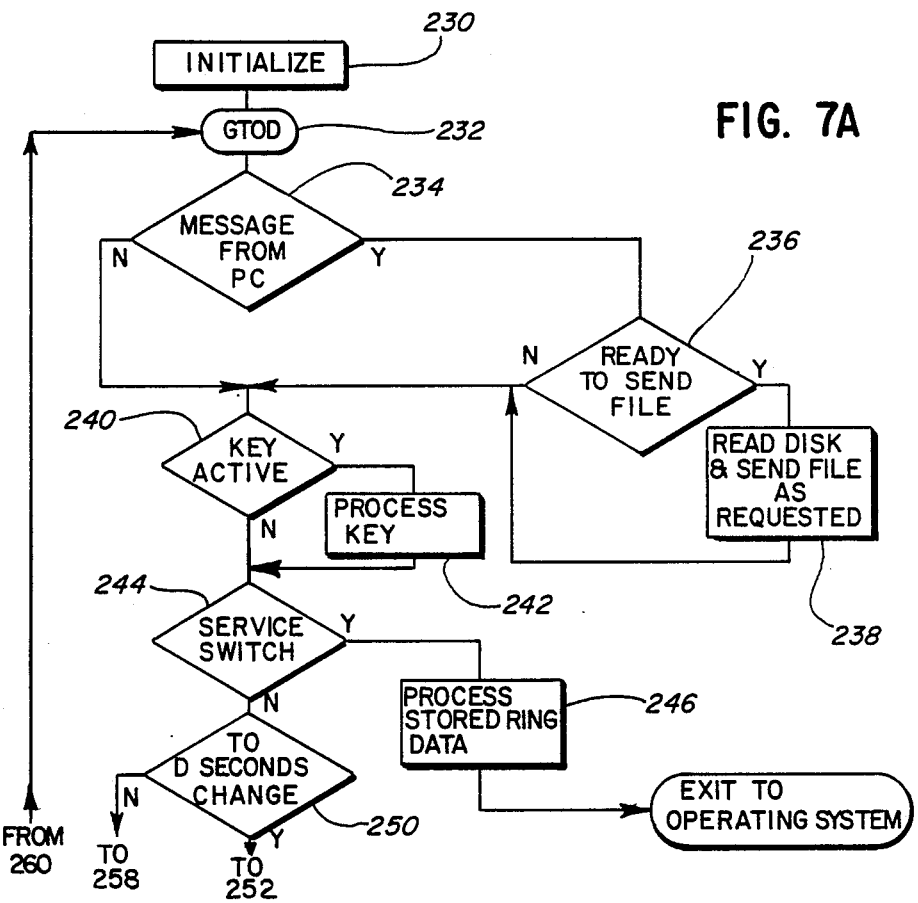
Figure 7B:
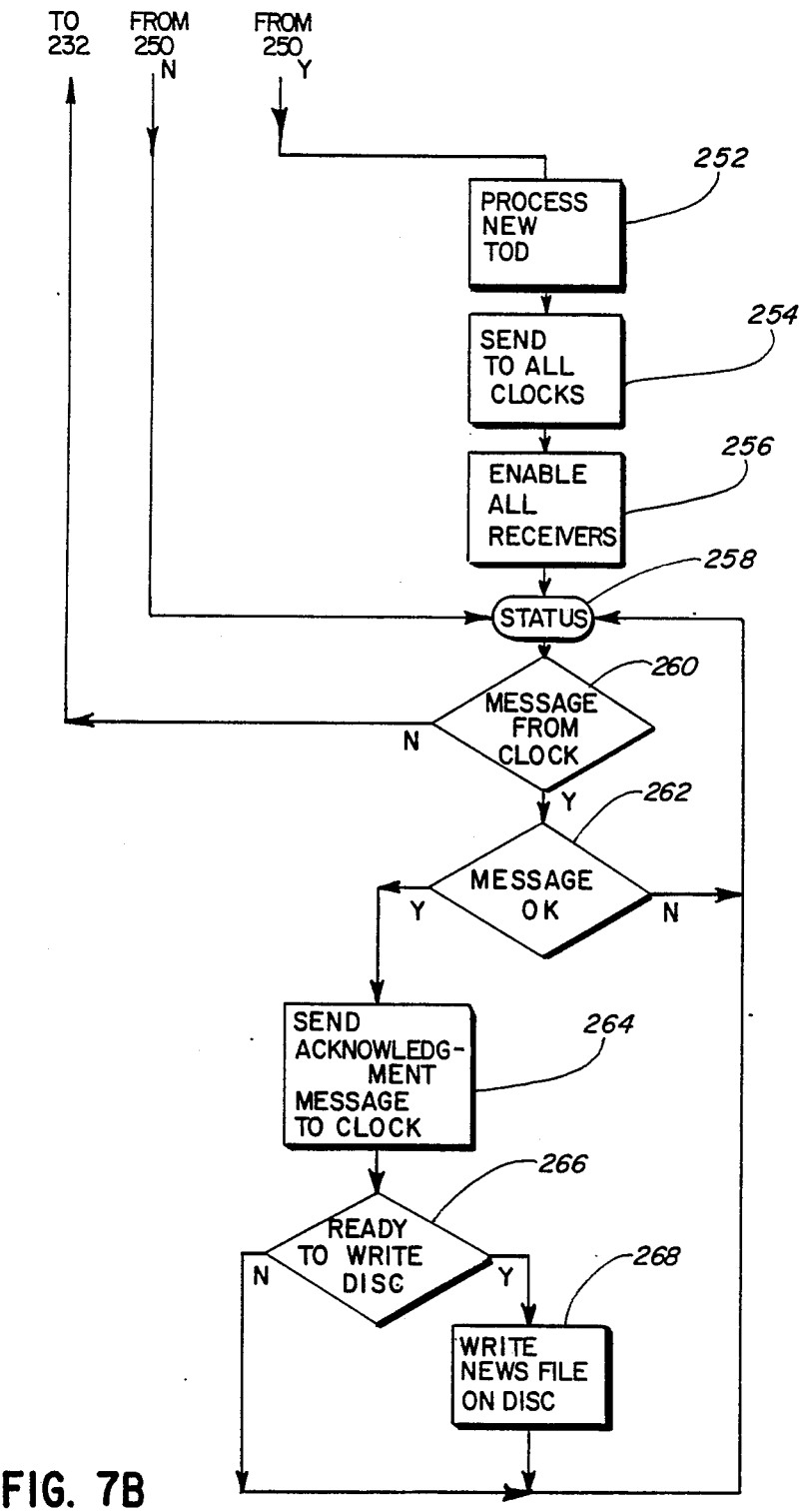

FIGS. 7a and b are a generalized software flow chart of the data collector control program stored on a floppy disk.

Figure 1:
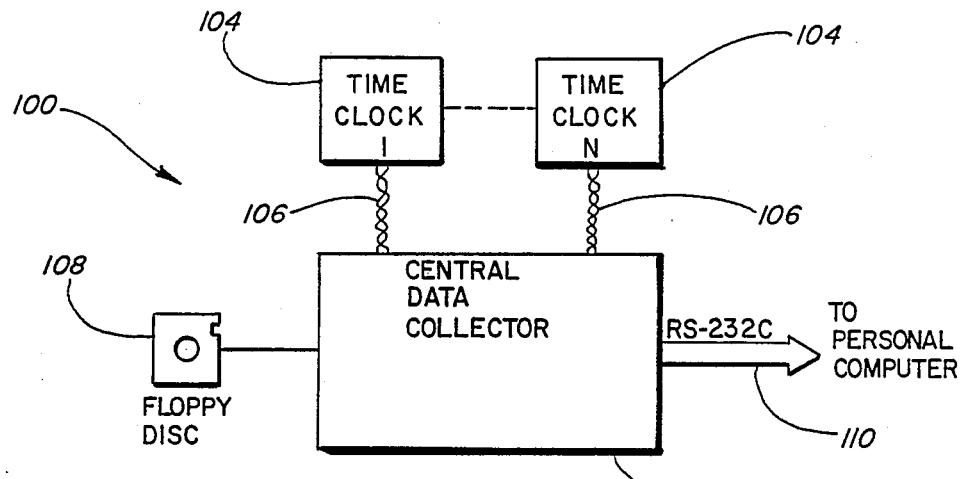
FIG. 1 is an overall system and a computer with which it communicates hardware block diagram of the time clock system of this invention.
Figure 8:
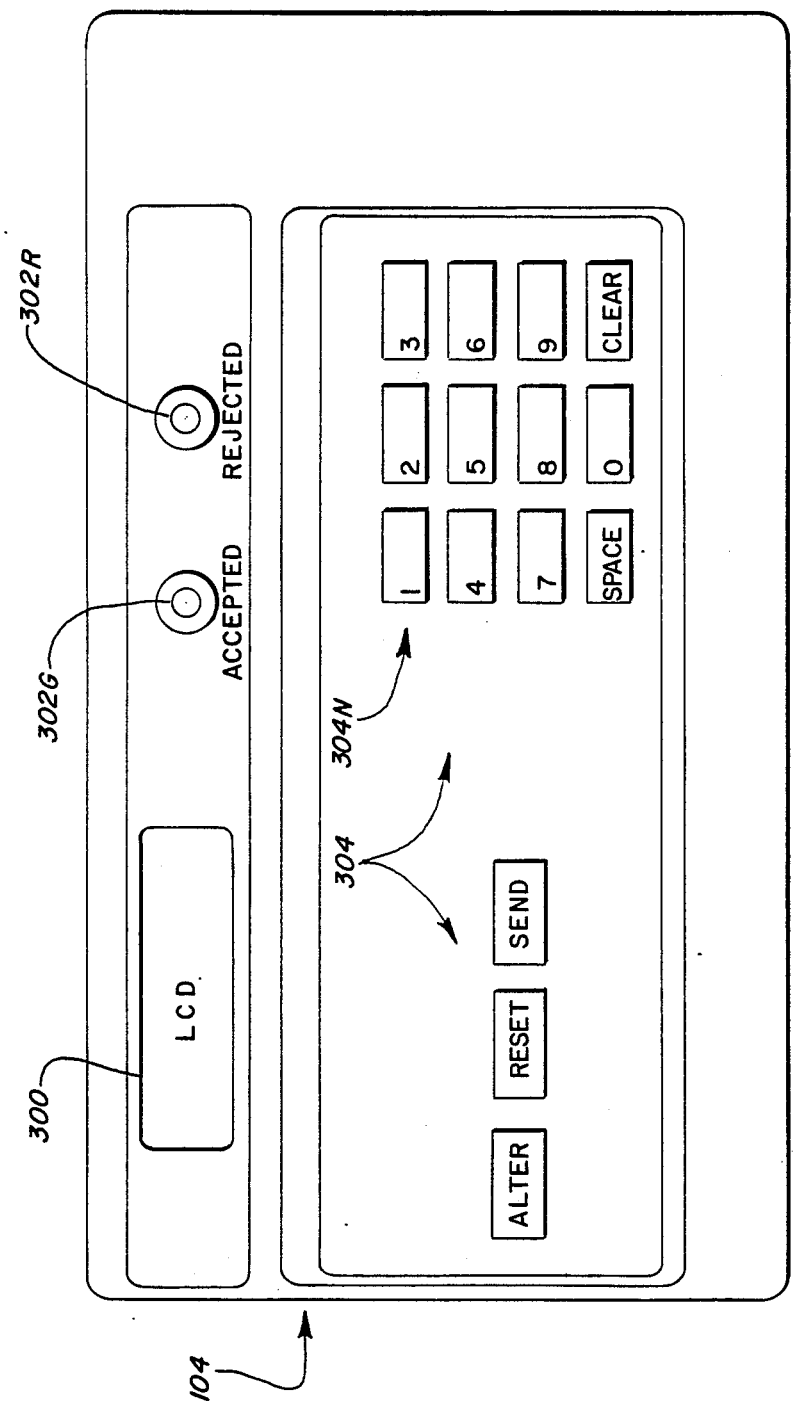

FIG. 8 is a front view of the control panel of a remote time clock station included in the system of FIG. 1.

Figure 9:
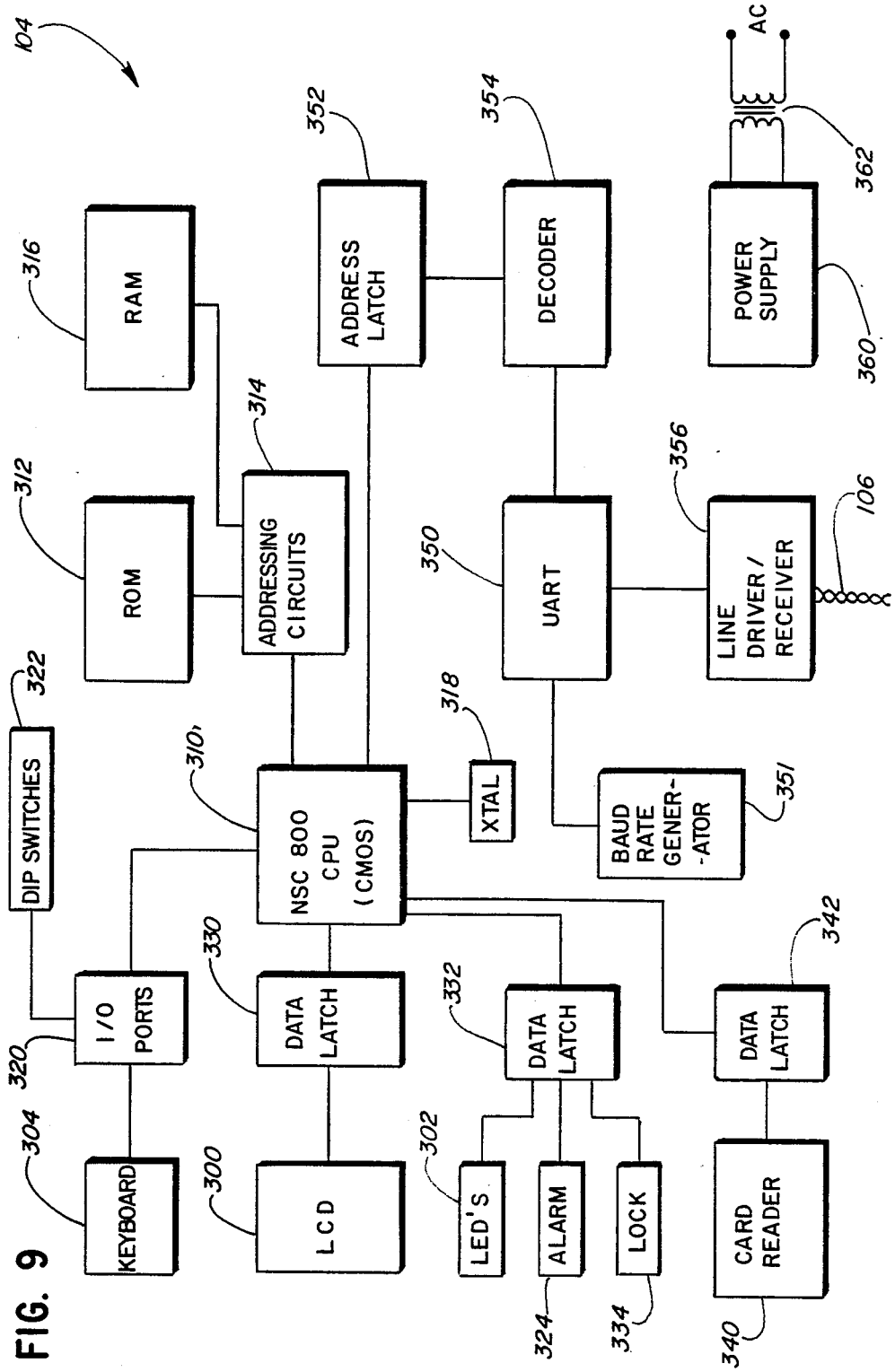

FIG. 9 is an overall hardward block diagram of such a time clock station.

Figure 10A:
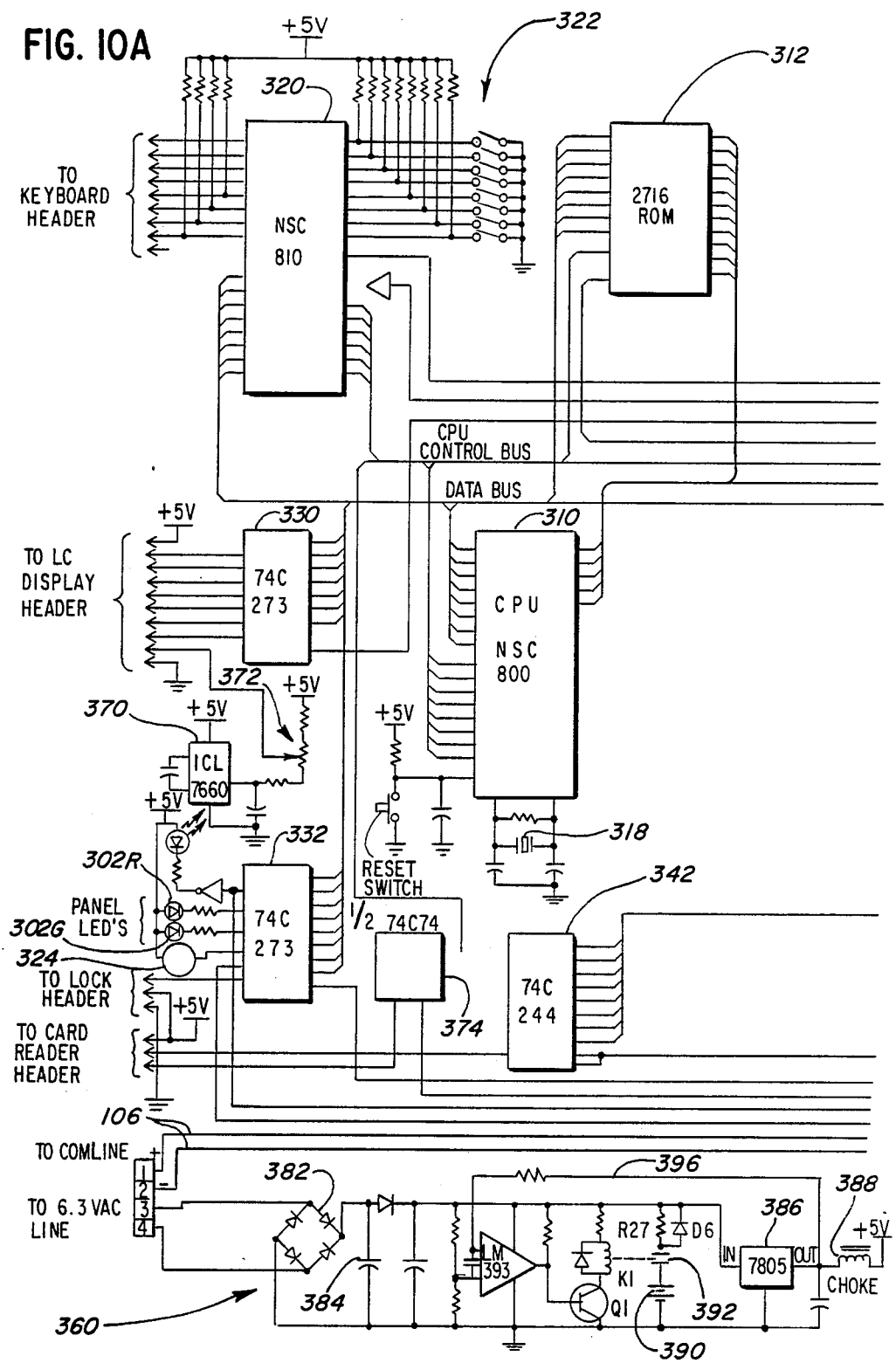
Figure 10B:
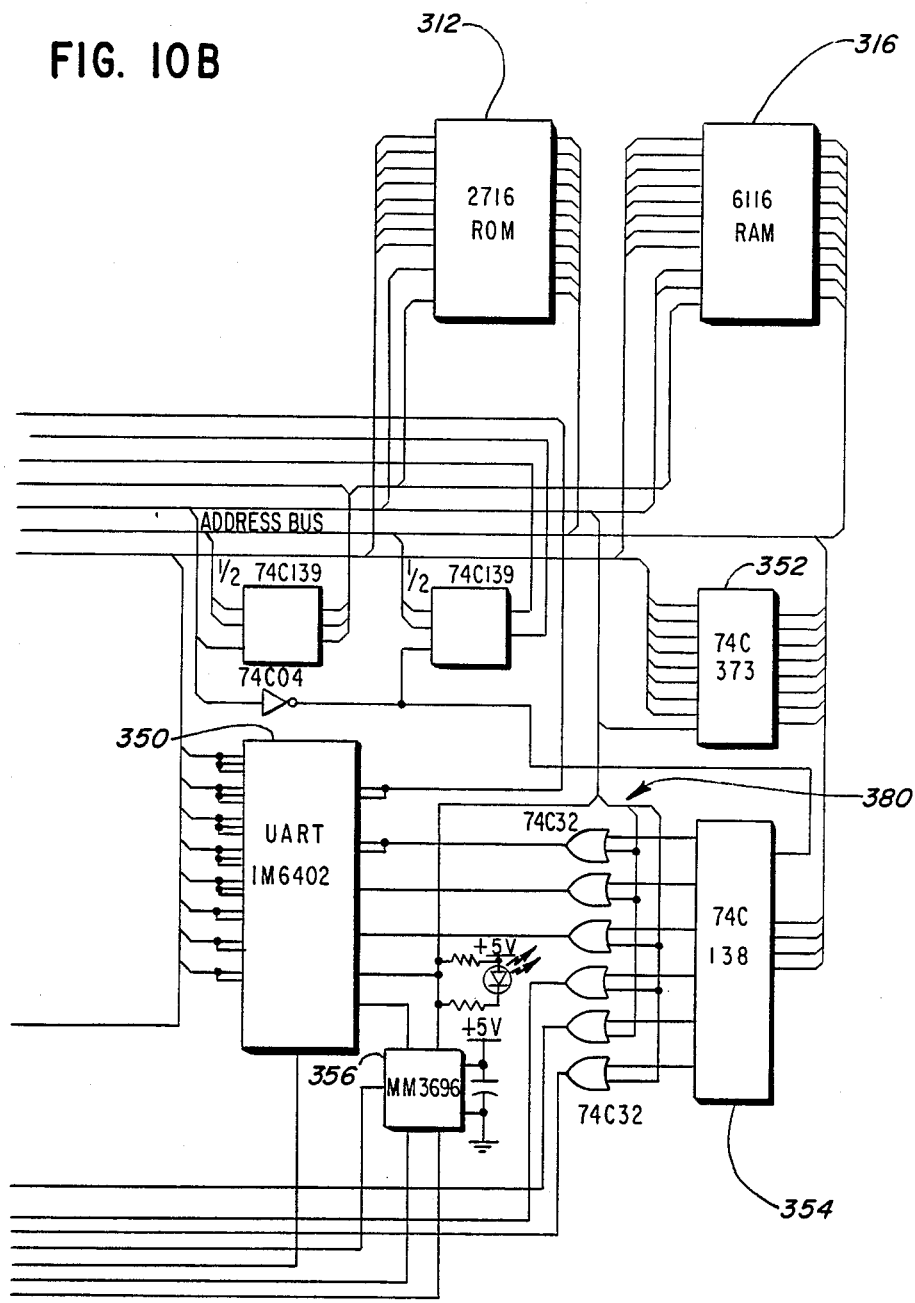

FIGS. 10a and 10b are a schematic circuit diagram of the time clock station.

Figure 11:
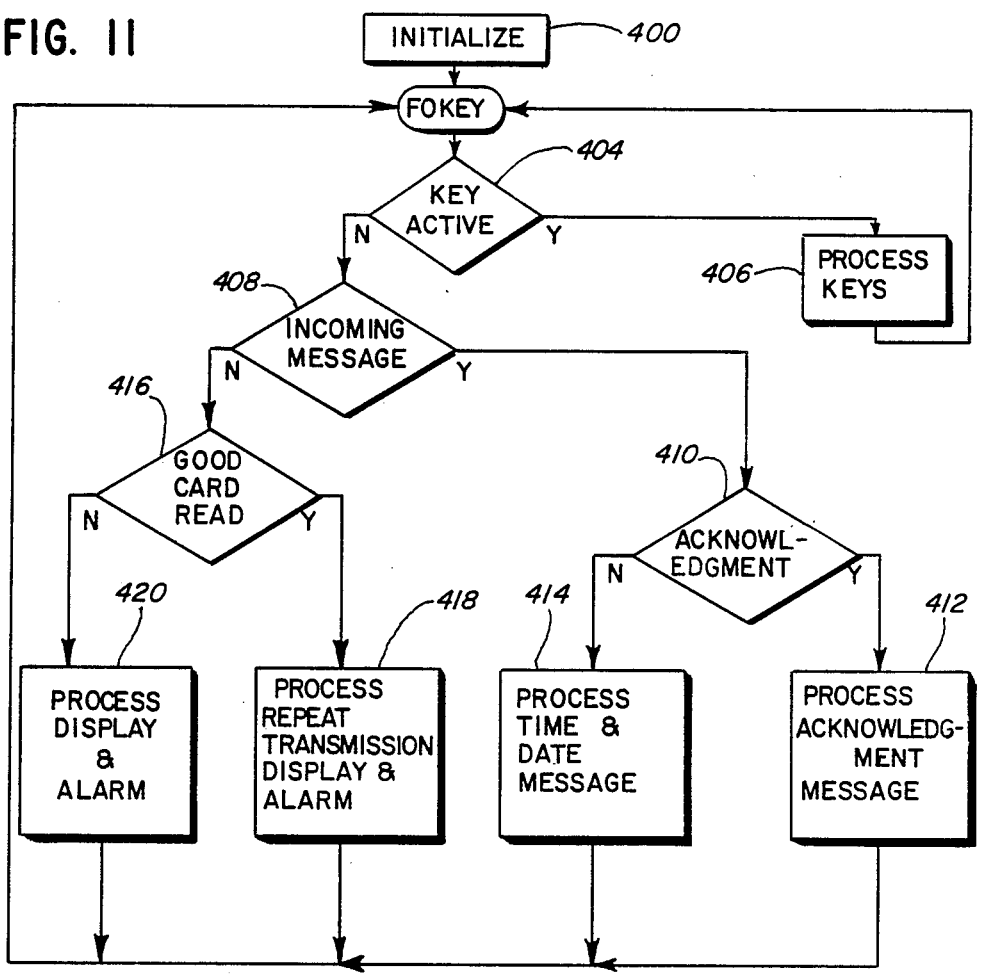

FIG. 11 is a generalized flow chart of the main polling loop of the control program software stored in the time clock ROM.

Figure 12:
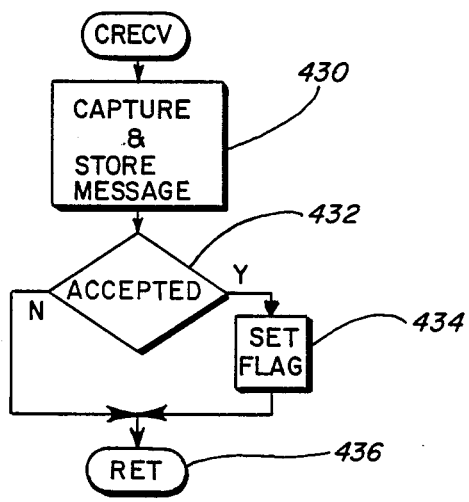

FIG. 12 is a software flow chart showing the handling by the time clock control program of interrupts resulting from messages received from the data collector of FIGS. 1-7.

Figure 13:
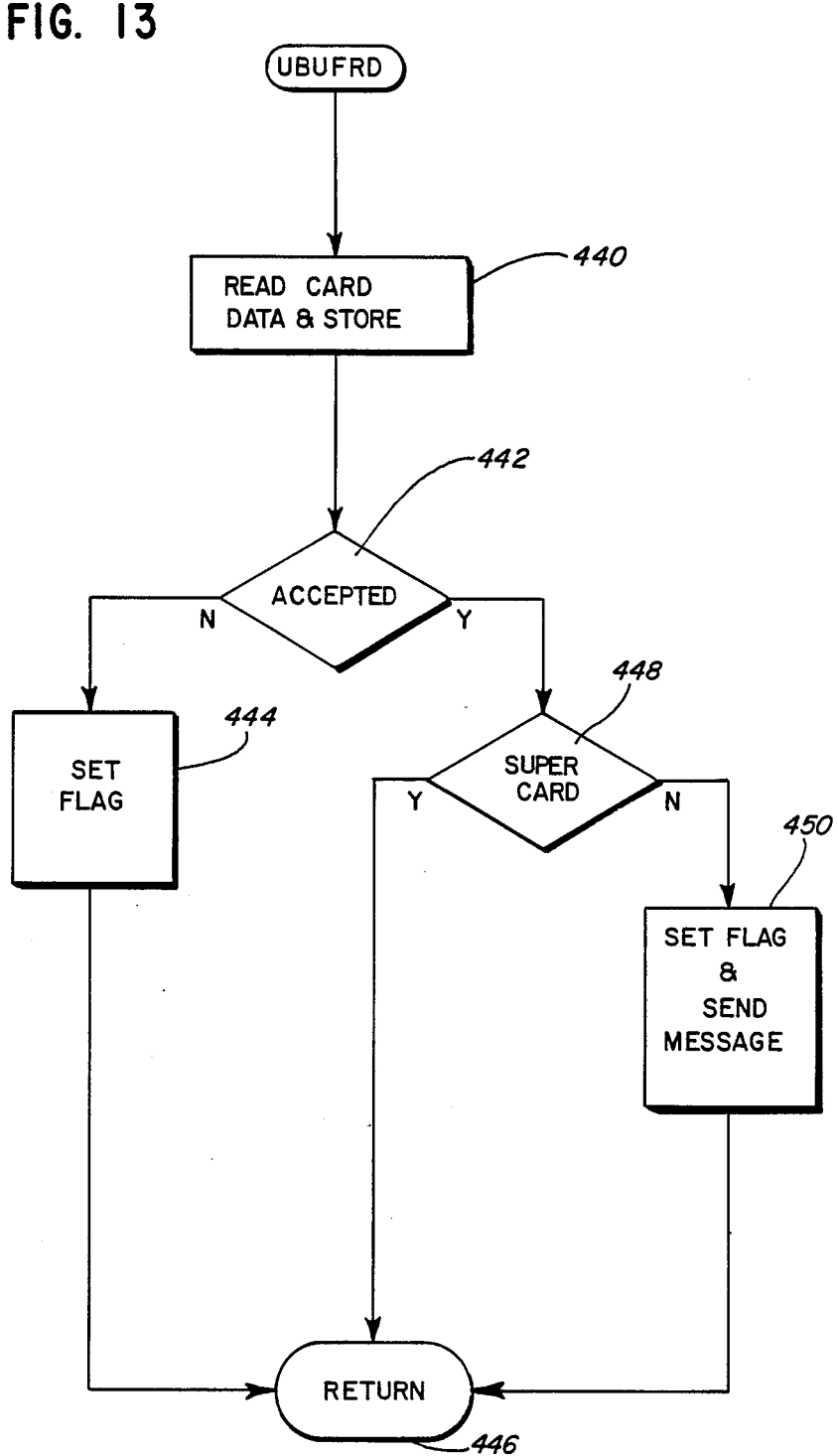

FIG. 13 is a software flow chart showing the handling by the time clock control program of interrupts resulting from card read inputs received from an ID card reader, and showing the portion of the time clock control program which discriminates between a supervisor card and a non-supervisor card.

DETAILED DESCRIPTION OF A PREFERRED EMBODIMENT

FIG. 1 illustrates a time clock system 100 comprising a central data collector unit 102 suitable for installation in an industrial plant or similar environment, and a plurality of time clock stations 104 located at places around the plant more or less remote from the data collector 102. Each time clock is connected to the data collector by its own dedicated communications line 106 comprising a twisted pair, telephone cable, or the like. Communications between the data collector 102 and any one of the clock units 104 are not required to pass through any other clock 104. Consequently, a malfunction in any one clock 104 will not disable the entire system 100.

The clock units 104 receive employee ring-in and ring-out data, and send it to the data collector 102. The data collector, after collecting a certain number of "rings," then writes that information to a file on a floppy magnetic disc 108. Thereafter, the collector reads the ring data back out of the disc file and transmits it over an RS-232 communications link 110 to a conventional programmable digital computer, such as an IBM PC or similar personal computer. It is contemplated that the personal computer will then put the ring data in a form suitable for payroll calculation by a mainframe computer, but that aspect is beyond the scope of this invention.

Figure 2:
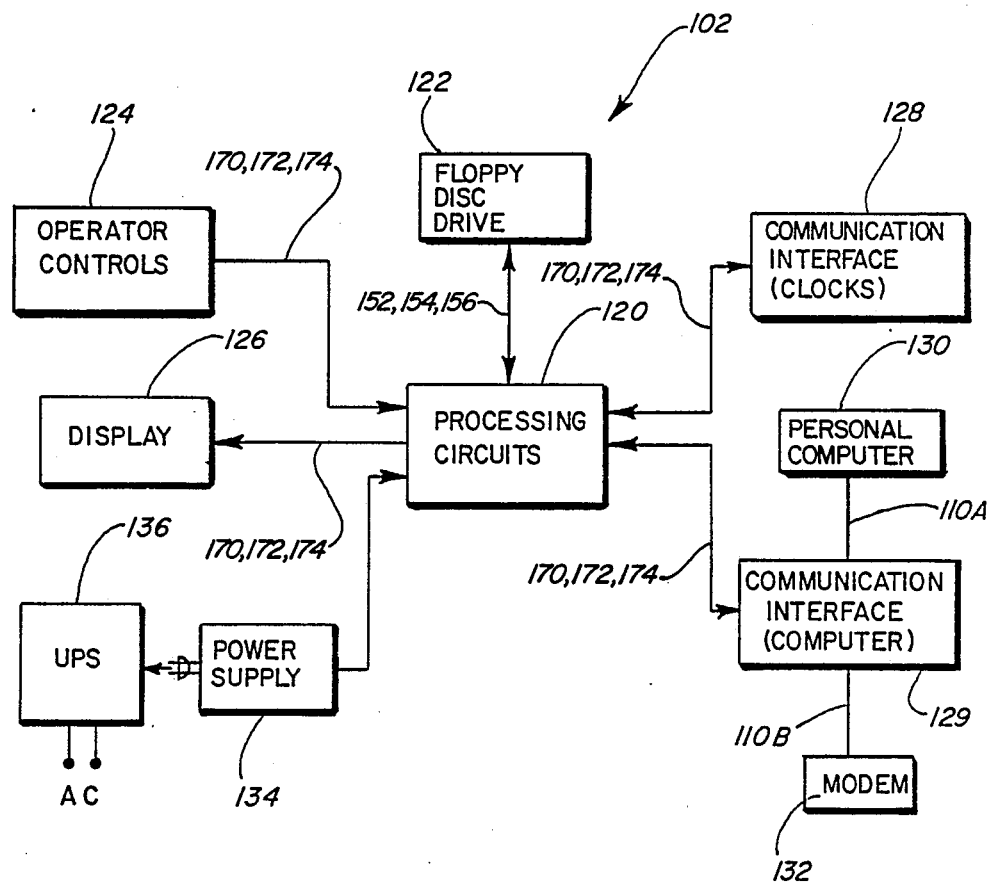
FIG. 2 is an overall hardware block diagram of the central data collector unit of the above system.

FIG. 2 illustrates further details of the data collector 102, which comprises processing circuitry 120 arranged to communicate with a disc drive 122 for reading from and writing to the floppy disc 108. The processing circuitry also interacts with various operator controls 124 and an alphanumeric display 126. In addition, it communicates with the time clocks 104 by means of a communications interface 128, and another communications interface circuite 129 is used to communicate with a general purpose programmable digital computer 130, such as an IBM-PC XT. If the computer is not located on the premises, then as an alternative the communications interface circuit 129 is connected to a modem 132, which in turn may be used to communicate with the computer via the telephone system. The RS-232 interface 110 thus includes two separate channels. One of them, channel 110A, is adapted to talk directly by means of a local cable connection to the IBM PC 130, while the other channel 110B is available for connection to the modem 132.

Figure 3:
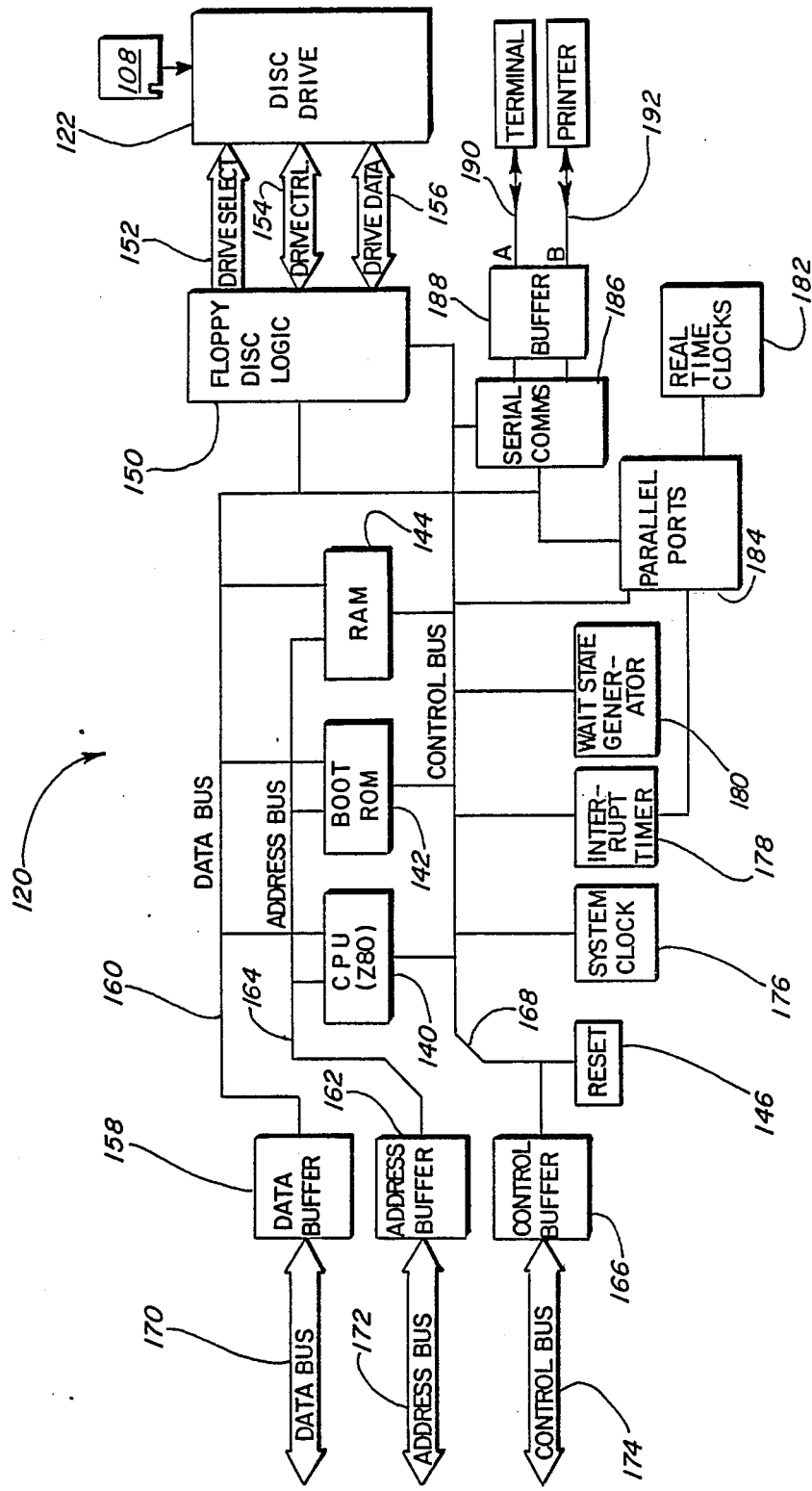
FIG. 3 is a hardward block diagram of the processing circuits of FIG. 2.

A DC power supply 134 is provided, which supplies various DC levels to the internal circuitry of blocks 120–128. The circuit 134 derives its AC supply from an uninterruptible power supply (UPS) unit 136. The latter device, several of which are commercially available, contains a rechargable battery which is continuously trickle-charged from the AC supply, and, in the event of an AC power failure, it switches over to draw power from the rechargable battery and convert it to AC FIG. 3 illustrates further details of the processing circuits 120. The heart of the data collector 102 is a Z80 central processing unit (CPU) integrated circuit chip 140 driven by the 8-bit CP/M operating system and a control program, both of which are found on the disc 108. A boot RO (read-only memory) chip 142 contains enough information to read the operating system and control program from the disc by means of the floppy disc drive 122, and load it into random access memory (RAM) when the collector 102 is turned on or reset by a reset circuit 146. The disc drive 122 is controlled by a floppy disc logic circuit 150, which communicates with it by means of drive select, drive control and drive data busses 152, 154 and 156 respectively.

During running of the data collector control program, data is stored temporarily in data buffer circuitry and communicated internally by means of a data bus 160. Similarly, memory and buffer addresses are stored temporarily in address buffer circuitry 162 and communicated internally over an address bus 164; while control information is stored temporarily in control buffer circuitry 166 and communicated internally over a control bus 168.

Externally of the processing circuitry 120, data is transferred into and out of the buffer circuitry 158 over an external data bus 170, which includes the data communications links to the operator controls 124 and the display 126 indicated in FIG. 2. Address and control information are similarly exchanged with the operator controls 124 and display 126 over an external address bus 172 and an external control bus 174.

The processing circuitry also includes a system clock circuit 176, interrupt timer 178, and wait state generator 180, which function in the normal manner.

A real-time clok 182 keeps track of time of day and calendar date information, and is provided with a small back-up battery to avoid the need for reseting the time and date every time there is a power failure which lasts beyond the battery capacity of the UPS 136 (FIG. 2). The real-time clock communicates with the rest of the procesing circuitry 120 through a parallel port circuit 184.

There is also a serial communications circuit 186 which, in conjunction with a buffer circuit 188, provides a pair of RS-232 ports 190 and 192 suitable for connection to a terminal and a printer respectively. These ports play no part in the normal operation of the system, but are useful for diagnostic and development purposes.

Figure 4:
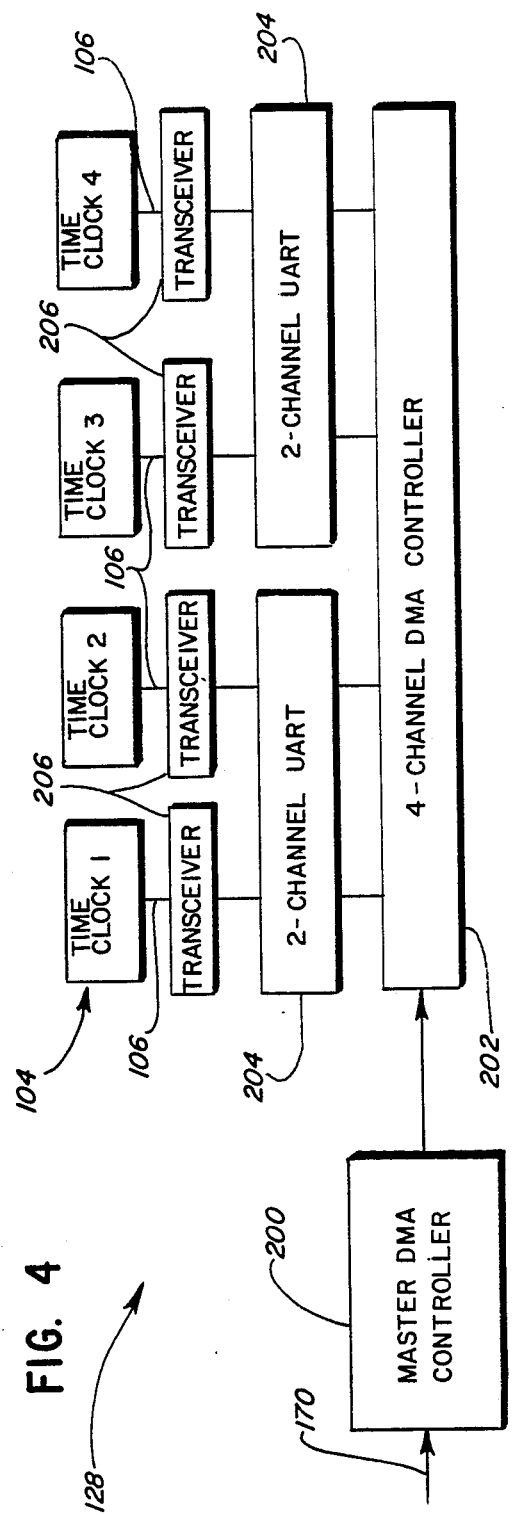
FIG. 4 is a hardward block diagram of the clock communications interface of FIG. 2.

FIG. 4 shows some of internal detail of the clock communication interface 128 (FIG. 2). The internal data bus 160 (FIG. 3) is connected to a master DMA (direct memory access) controller circuit, which in turn drives one or more auxiliary DMA controllers 202, each of which is capable of addressing four time clock stations 104. Each of these 4-channel DMA controllers communicates through a pair of 2-channel UART's (universal asynchronous receiver/transmitters) 204, each channel of which communicates with the clock lines 106 (FIG. 1) through a data transceiver circuit 206.

Figure 5:
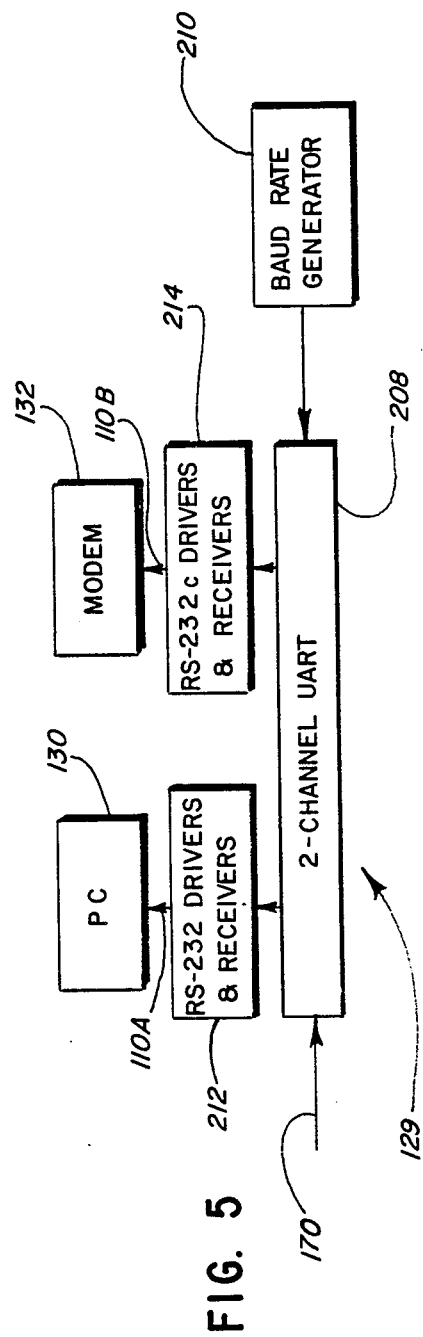
FIG. 5 is a hardware block diagram of the computer communications interface of FIG. 2.

As seen in FIG. 5, the serial communications interface circuitry 129 includes a 2-channel UART 208 which is plugged into the data bus 160, and governed by a baud rate (serial bit rate) generator 210. Each UART channel uses one of two RS-232C driver/receiver circuits 212 and 214, which respectively communicate with the PC 130 and modem 132 over lines 110A and B.

Figure 6:
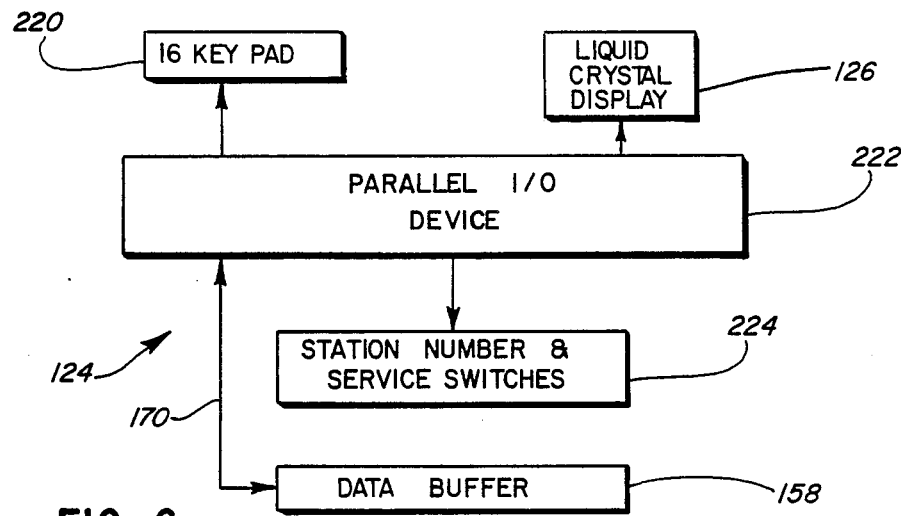
FIG. 6 is a hardware block diagram of the operator controls of FIG. 2.

As seen in FIG. 6, the operator controls 124 of FIG. 2 include a manual key pad 220 which, together with the display 126 (FIG. 2), communicate with a parallel I/O circuit 222. The display 126 is of the conventional liquid crystal type. The I/O circuit 222 communicates with the data bus buffer 158 (FIG. 3). The key pad 220 is used to set the time and date on the real-time clock 182 when necessary, while the display 126 indicates the current time and date values at all times.

In addition there are station number and service switches 224 which also communicate with the buffer 158. The station number switches are DIP switches which identify the particular data collector unit 102 to the personal computer 130, which may have communications with several such data collectors. The service switches allow the system operator to tell the data collector 102 when to suspend operations for replacement of the disc 108, and when to print data through printer port 192.

In operation, the real-time clock 182 supplies time and date information which is sent out over lines 106 at regular intervals (e.g. every second) to the time clocks 104. The information which is sent by the clocks 104 over the lines 106 includes the ring data collected thereby. When enough ring data has been collected in RAM, it is written to a file on floppy disc 108. Later, the disc file is transmitted over channel 110 to the personal computer 130.

All of this occurs under the control of a control program which is stored on floppy disc 108 and read out by disc drive 122. The complete control program for data collector 102 is listed, in Z80 assembly language, in Appendix A filed with this patent application. For a more generalized understanding of the collector control program, the reader may refer to FIG. 7, which summarizes it in flow chart form.

As seen there, after an initialization step 230, the program enters a subroutine designated GTOD, step 232 of FIG. 7. As indicated in the program listing of Appendix A, starting at hex address 0149, GTOD (Get Time Of Day) is designed to access the real-time clock 182 of FIG. 3. to determine the current time of day and calendar date, and load that information into a temporary register location.

But before delivering that information to the time clocks 104 (FIG. 1), the collector control program first checks to see if it is being called upon to assume any higher priority responsibilities. It first checks (step 234) to see whether it is being called upon by the PC 130 (FIG. 2) to send the latter a file containing ring information which is stored on floppy disc 108. If so, the control program of FIG. 7 then tests (step 236) to see whether the data collector 102 is ready to upload a file. If so, in step 238 the program addresses the disc drive 122, reads the ring file on disc 108, and sends it to the personal computer 130 over one of the RS-232 channels 110A or B, depending on whether the latter is nearby or modem 132 must be used to access it over telephone lines.

In the event of a negative answer to one of the inquiries 234 or 236, or at the culmination of the disc file upload operation 238, the program next (step 240) tests to see it must attend to input from the key paid 220 (FIG. 6). If so, in step 242 it processes the key pad input (e.g., resets the time of day and calendar date in the real-time clock 182) and goes on.

The next step 244, which follows the key pad processing step 242 or a negative answer to inquiry 240, is to determine whether one of the service switches 224 is calling for attention. For example, if the operator has employed one of the service switches to call for processing of the ring data stored in RAM 144, then in step 246 the program writes the ring data to floppy disc 108 and exits to the operating system in step 248. This enables the operator to remove a used disc 108 and replace it with a fresh one. After a new disc is placed in the drive 122 and the service switch is turned off, the initialization step 230 is re-invoked, and the control program is reloaded. There is also a disc file erase routine incorporated into the control program, which can be called by the computer 130 when it no longer needs to retain a file on the disc 108.

If no service switch requires attention, after step 244 the program tests (step 250) to determine whether the time-of-day (TOD) value obtained from the real-time clock in step 232 has advanced by at least one second from the last value stored in RAM 144 (FIG. 3). If so, then the new TOD value stored in a temporary register replaces the old one in a permanent TOD register location (step 252), and is sent to all remote time clock stations 104 (step 254) in parallel over their respective individual communications channels 106 (FIG. 1).

Subsequently, in step 256 the program switches all of the transceiver circuits 206 (FIG. 4) of the respective time clocks 104 from transmit mode to receive mode; and in step 258 it reads and clears all status registers to await ring data from the time clocks 104.

In the event that the TOD has not changed by one second since the last pass, the program goes to step 258 directly from step 250. In that event, it will test to see if a ring message has been received fro one or more time clocks 104.

In either case, step 260 determines whether a transmission has been received from a clock. If not, the program returns to step 232. If a message has been received, however, then in step 262 the program tests whether the message is a good one (i.e. not garbled) by checking parity and message length. If the message is not good, it refrains from acknowledging receipt, and returns to step 258 to try again. If the message passes the tests 262, however, then in step 264 the collector sends an acknowledgement back to the relevant time clock station 104.

In step 266 the program determines whether the collector is ready to do a disc write. If not, it will loop back to step 258, accumulating all rings in RAM, until it is ready. At that time it will then perform step 268, writing to disc 108 all rings which have accumulated in RAM since the last disc write operation, and returning to step 258.

We turn now to the time clock units 104 of FIG. 1. FIG. 8 illustrates the operator interface of each time clock, which includes an alphanumeric read-out such as a liquid crystal display (LCD) 300 green and red light-emitting diodes (LED's) 302G and R respectively for indicating acceptance and rejection respectively of an employee identification card read, and a manual keyboard 304 including numeric key pad 304N plus additional keys labeled "Space, Clear, Alter, Reset" and "Send."

As seen in FIG. 9, the clock circuitry is driven by a central processing unit (CPU) such as an National Semiconductor Corp. NSC800 complementary metal oxide semiconductor (CMOS) integrated circuit chip 310 operating in conjunction with a control program stored in ROM circuitry 312 which the CPU accesses through addressing circuits 314 and an address latch 352. A RAM memory is also provided, and is also accesed through the addressing circuits 314. A clock crystal 318 provides timing for the internal operations of the CPU.

The keyboard 304 (see also FIG. 8) talks to the CPU through an I/O port, as does a group of DIP switches 322. The latter are used to set a station number which identifies a particular remote time clock station 104 to the central data collector 102, and also to enable or disable an audible alarm device 324, depending on customer requirements or preferences. For some applications it is appropriate to audibly announce various clock operations (e.g. recognition of a valid card read sequence, an unacceptable card read, receipt of an acknowledgement message, and various error conditions), whereas under other circumstances such audible indication may be undesirable. The DIP switch disable feature allows users to make that choice individually.

The LCD 300 (see also FIG. 8) communicates with the CPU through a data latch 330. Another data latch 332 provides the interface between the CPU and the LED's 302 (see also FIG. 8), also between the CPU and the audible alarm 324 and a user-provided solenoid-operated mechanical lock. The latter may be used to admit an employee to a secure area at clock-in time when the ID card identifies an authorized individual.

The ID cards may be any of the various conventional types of machine-readable documents, such as a magnetic stripe card, in which case the card reader 340 of each clock station may be a conventional magnetic stripe reader designed according to the ISO/ANSI standard. Communications between the reader 340 and the CPU are buffered by another data latch 342.

Each remote clock station 104 communicates with the central collector 102 by means of a UART (universal asynchronous receiver/transmitter) 350, which is governed by a baud rate generator 351. The CPU addreses the UART through an address latch 352 and decoder 354. The messages exchanged with the collector are sent and received over twisted pair 106 (see also FIG. 1) by a line driver/receiver circuit 356.

A power supply circuit 360 is fed by the secondary of a step-down transformer 362 which in turn is plugged into an AC supply. The power supply 360 provides DC for all the circuits of the clock 104.

Greater circuit detail of clock 104 is provided by FIG. 10. The I/O port 320 comprises an NSC810 integrated circuit. The DIP switch 322 has eight bits, the first seven of which are used as the station address for clock 104, while the eighth bit is used to enable or disable the alarm 324.

The ROM 312 comprises two 2716 integrated circuit (IC) chips, the first of which provides memory addresses 0 through 7FF hex, while the second provides addresses 800H through FFF. The RAM 316 comprises a 6116 IC chip which is addresed as 1000 through 17FF hex. The address latch 352 is a 74C373 IC chip. The data latches 330 and 332 are 74C273 integratd circuit chips. An ICL7660 chip provides a negative DC supply voltage for the LCD, while a potentiometer 372 controls the view angle. The card reader data latch 342 is a 74C244 IC. Half of a dual D-flop 374 (a 74C74 IC) is interposed between the latch 342 and the header for the card reader 340.

The UART 350 is an IM6402 chip. The circuit 356 which addresses the communications line 106 is an MM3696 IC. The address decoder 354 is a 74C138 IC, and operates in conjunction with a group of OR gates 380 which comprise a 74C32 IC.

The power supply 360 comprises a diode rectifier bridge 382, a ripple filtering capacitor 384, and a voltage regulator 386 in the form of a 7805 integrated circuit, the output of which is 5 V. DC fed to the circuitry of the clock 104 through a filter choke 388 which blocks feedback to the power line of high frequency interference produced by the downstream digital circuitry described above.

A nickel-cadmium rechargable battery 390 is provided for back-up when the AC power fails. The NICad battery 390 is designed to power the clock 104 for about two hours, so that if the AC power in a facility goes out for a long enough interval to justify closing the facility and sending the work force home before AC power is restored, the employees will still be able to clock out if the decision is made before too much of the two hour grace period elapses. The avoids a significant loss of clock-out data which would otherwise have to be entered into the system manually in order to facilitate payroll calculation.

The NiCad battery 390 is trickle-charged from the output of the rectifier bridge 382 through registor R27 the normally closed contacts 392 of a latched-on relay K1 during normal operation of the clock 104. The relay is held on by transistor Q1. When the NiCad battery is charged and the AC power fails, the NiCad begins to give back DC power to the power supply circuit 360 through diode D6 in order to keep the clock 104 running so that employees are still able to clock out.

When the NiCad battery is powering the clock 104 and its voltage falls below a preset limit, the battery is switched out of the circuit 360 by the opening of contacts 392 when relay K1 is de-energized by transistor Q1. The transistor at this time is switched by a voltage comparator 394 in the form of an LM393 integragated circuit differential amplifier chip. A reference voltage is fed back over line 396 from the output of the regulator circuit 386 to the minus input of the voltage comparator 394, enabling the latter to sense when the NiCad voltage has fallen below the designed threshold. At that time the amplifier 394 turns off transister Q1 and relay K1 to open the contacts 392 and cut battery 392 out of the circuit. After that, no further operation of the clock 104 is possible until the AC power comes back on.

The control power for the clock 104 is contained in the ROM circuits 312. A complete listing of that program, which is written in Z80 assembly language, is provided in Appendix B which is filed with this patent application. A more general idea of the nature of the program can be gleaned, however, from the software flow charts in FIGS. 11-13.

FIG. 11 illustrates the broad outlines of the clock control program, which begins with an initialization routine 400 and then runs a routine designated FOKEY. The latter routine is the main polling loop of the program, and is found at ROM address 0051 (see listing in Appendix B). In general terms, FOKEY starts at step 404 by polling the clock keyboard to see if any of the keys are depressed. If so, in step 406 the program processes the key input and returns to the beginning of the FOKEY routine.

If there is no keyboard activity, the program in step 408 tests to see if there is an incoming message from the data collector 102. If there is, in step 410 the program tests to determine whether the incoming message is an acknowledgment from the collector 102 of a message previously sent to the collector by the clock. If so, in step 412 the program processes that acknowledgment message and returns to the beginning of the FOKEY routine.

If not, then the received message must have been a time and date message, because acknowledgments and time/date messages are the only kinds which the collector sends to the clock. Thus, in step 414 the program processes the latter type of message and returns to the beginning of the FOKEY routine.

If the result of inquiry 408 is negative, i.e. if there is no incoming message, the program then turns its attention to the card reader flags, and in step 416 it determines whether there has been a good card read, i.e. an input from the card reader which passes a series of tests. If so, in step 418 the program processes the information read from an employee identity card, including transmitting the card read information (ring) to the data collector 102, repeating that transmission if the acknowledgment from the collector is delayed, putting the appropriate information on the time clock LCD display, and sounding the time clock alarm (if the latter has not been disabled as described above).

If there is a bad card read, in step 420 the program puts the appropriate information on the display and sounds the alarm in a different fashion, again assuming that it has not been disabled.

FOKEY is a polling routine which is subject at all times to a hard-wired interrupt from the communications line 106 when a message arrives from the data collector 102, and another hard-wired interrupt from the time clock card reader when an employee inserts an ID card.

The message interrupt service routine, which is summarized in FIG. 12, is designated CRECV and is found at memory address 051B hex (see Appendix B). In general terms, this routine captures and stores the message from the collector (step 430), and then determines (step 432) whether the message is accepted or rejected, on the basis of a message length test. If the message passes the test, in step 434 this routine sets an incoming message flag and in step 436 returns to wherever it was in the main polling loop (FIG. 11) when the interrupt occurred. The message flag will be dealt with subsequently by the main polling loop as part of step 408. If the message does not pass the parity test, the program goes to step 436 directly, and returns to the main polling loop.

The card reader interrupt routine, which is seen in FIG. 13, is designated UBUFRD, and is found at memory address 0573 (see Appendix B). In general terms, this routine first reads and stores the information arriving from the card reader (step 440), and then (in step 442) tests to see whether that information should be accepted or rejected. If the data is not acceptable, a bad card read flag is set in step 444, and in step 446 the program returns to whever it was in the main polling loop (FIG. 11) prior to the occurrence of the interrupt.

If the card read is acceptable, in step 448 the program then tests to see if the data read from the card reader indicates that the card currently being read is a supervisor card. If it is not, then no further keyboard input is allowable, and in step 450 the routine sets a flag and immediately sends the ring message to the data collector 102 over wires 106. The resulting message may include information which was entered into the clock keyboard 304 (FIGS. 8 and 9) before the ID card was inserted into the reader 340, for the purpose of altering any ID card data fields which are permitted to be altered by non-supervisory employees, but it cannot include any information which the employee may try to enter by means of the keyboard after the card is read.

If a supervisor card is detected in step 448, however, the ring messaage is not sent to the data collector 102 at this time. Instead, the interrupt routine goes directly to step 446 and returns to the main polling loop of FIG. 11. Then, in the course of the keyboard polling steps 404 and 406 which are incorporated into that routine, the program will first read any information which the supervisor enters by means of the keyboard to alter information read from the card (such as the employee ID number) which is permitted to be altered only by the supervisor. Then it will read the SEND key (FIG. 7B), and it is only when the SEND key is actuated that the program actually sends the ring message to the data collector 102 when a supervisor card is detected.

A non-supervisory employee must use the keyboard, to alter any information which is not reserved to supervisory personnel, before inserting his ID card into the reader. Thereafter, he reads all data fields into the clock 104 by inserting his ID card into the card reader 304; and at that time the entire block of ring information (altered plus unaltered information) is immediately transmitted to the collector 102.

Thus, the reason why reserved data fields cannot be altered by a non-superisory employee is because until the supervisor identification bit on an ID card is read, these fields are locked; after the card is read the message is immediately transmitted, allowing no opportunity for further data alteration by keyboard entry prior to transmission. When a supervisor card is encountered, on the other hand, reading of the card does not immediately release the message for transmission. The clock sends the message only when the supervisor has finished altering data and decides to actuate the SEND key.

CONCLUSION

It will now be appreciated that the system of this invention provides a means of collecting employee attendance data in which a central data unit provides synchronized time and calendar information to a plurality of satellite time clock units scattered at various locations around the plant, and gathers employee attendance information from those satellite units. Each of the satellite units has its own dedicated communications channel to the central station. The central unit assembles the collected ring data in a file suitable for use by a general purpose programmable computer, stores it in non-volatile from, and subsequently transmits the resulting file to the computer for use in payroll preparation.

The supervisor recognition logic embedded in the control program of the satellite stations permits certain types of data to be altered only by someone who has the appropriate machine readable credentials. Consequently the supervisor can clock in or out on behalf of another employee who has lost or forgotten his ID card, by using the supervisor's own ID card and altering the employee ID number field. Non-supervisors can not alter that field, although other fields may be alterable by any employee, supervisory or not.

In addition, the satellite time clock stations and the central data collection station are all backed by rechargable battery systems which keep the entire system operating for a long enough time after an AC power failure so that the employees can clock out when they are sent home, thus avoiding a massive loss of attendance data.

The above-described embodiment of the invention is merely one example of a way in which the invention may be carried out. Other ways may also be possible, and are within the scope of the following claims defining the invention.

APPENDIX A

```
TITLE    "TT"  = CYBORG DATA COLLECTOR PROGRAM
SUBTTL REV. 209  ***  3/17/86

;CONTAINS THE FOLLOWING FUNCTIONS:
        ;16 CHANNEL TRANSMIT AND RECEIVE,
        ;KEYBOARD/DISPLAY FOR TIME-OF-DAY AND CALENDAR,
        ;DISK WRITE/READ, 180 FILES, MAX.,
        ;FILENAME IS "RINGFILE.nnn" WHERE nnn IS 000 TO 179.
        ;COMMUNICATIONS TO PC, INCLUDING FILE MARKING.

;FOR LRC ERROR VERSION (TTF) SEE LABEL "FAIL".

.Z80                            ;ASSEMBLE FOR Z80

C  INCLUDE TTEQU.MAC              ;TABLE OF PARAMETERS AND ADDRESSES
      C
      C  ;FILENAME IS "TTEQU", 3/15/86
      C
      C          ;CARD ADDRESSES ARE DETERMINED BY DIP SWITCH,
      C          ;ONLY ONE MAY BE SELECTED ON EACH DMA CARD AND
      C          ;MUST NOT BE REPEATED IN A GIVEN SYSTEM.
0000  C  CRD0    EQU     0              ;SWITCH 1
0020  C  CRD1    EQU     20H            ;SWITCH 2
0040  C  CRD2    EQU     40H            ;SWITCH 3
0060  C  CRD3    EQU     60H            ;SWITCH 4
      C
```

```
                    C           ;UART DEVICE, CHANNEL AND FUNCTION SELECTION
0000                C   UART0   EQU     0
0004                C   UART1   EQU     4
0000                C   CHNA    EQU     0
0001                C   CHNB    EQU     1
0000                C   DT      EQU     0
0002                C   CTL     EQU     2
                    C
                    C           ;UART WRITE REGISTER 0
0018                C   CHNRST  EQU     18H                 ;UART RESET
                    C
                    C           ;UART WRITE REGISTER 1
00C0                C   TREADY  EQU     0C0H                ;TRANSMITTER READY ON
00E0                C   RREADY  EQU     0E0H                ;RECEIVER READY ON
0000                C   NOREADY EQU     0                   ;READY PINS OFF
                    C
                    C           ;UART WRITE REGISTER 3
00C0                C   RXDIS   EQU     0C0H                ;RECEIVER OFF
00C1                C   RXEN    EQU     0C1H                ;RECEIVER ON
                    C
                    C           ;UART WRITE REGISTER 5
00E0                C   TXDIS   EQU     0E0H                ;TRANSMITTER AND LINE DRIVER OFF
0068                C   TXEN    EQU     68H                 ;TRANSMITTER AND LINE DRIVER ON
                    C
                    C           ;UART READ REGISTER 0
0000                C   RXRDY   EQU     0                   ;RECEIVER CHARACTER READY BIT
0002                C   TXEMT   EQU     2                   ;TRANSMITTER BUFFER EMPTY BIT
                    C
                    C           ;UART READ REGISTER 1
0000                C   ALLSENT EQU     0                   ;LAST BIT HAS BEEN TRANSMITTED
                    C
                    C           ;DMA DEVICE, COMMAND AND CONTROLLER SELECTION
00B0                C   MDMA    EQU     0B0H                ;MASTER DMA DEVICE PORT
0010                C   DMA     EQU     10H                 ;CHANNEL CARDS
0010                C   DMA0    EQU     CRD0+DMA            ;CHANNELS 0-3
0030                C   DMA1    EQU     CRD1+DMA            ;CHANNELS 4-7
0050                C   DMA2    EQU     CRD2+DMA            ;CHANNELS 8-11
0070                C   DMA3    EQU     CRD3+DMA            ;CHANNELS 12-15
000C                C   FLFF    EQU     0CH                 ;FIRST/LAST FLIP-FLOP CLEAR
0008                C   CMD     EQU     8                   ;COMMAND REGISTER
000A                C   SMSK    EQU     0AH                 ;SINGLE CHANNEL MASK REGISTER
000E                C   CMSK    EQU     0EH                 ;CLEAR ALL MASK BITS, NO DATA
000F                C   MSK     EQU     0FH                 ;MASK REGISTER, SELECTIVE
0040                C   DMAEN   EQU     40H                 ;MEMORY-TO-MEMORY DISABLE, CONTROLLER
                    C                                       ;ENABLED, NORMAL TIMING, FIXED PRIORITY,
                    C                                       ;LATE WRITE TIMING,
                    C                                       ;DREQ SENSE = LOW, DACK SENSE = LOW
0044                C   DMADIS  EQU     44H                 ;SAME AS DMAEN, BUT CONTROLLER DISABLED
0008                C   MODE    EQU     08H                 ;DMA MODE REGISTER
0048                C   DRD     EQU     48H                 ;MEMORY TO UART, SINGLE BYTE
0044                C   DWR     EQU     44H                 ;UART TO MEMORY, SINGLE BYTE
0008                C   STAT    EQU     8                   ;STATUS REGISTER
0000                C   TC0     EQU     0                   ;STATUS REGISTER BITS
0001                C   TC1     EQU     1
0002                C   TC2     EQU     2
0003                C   TC3     EQU     3
```

```
C596            C       TSTADR  EQU     0C596H          ;ANY UNEXPECTED NUMBER
                C
                C
                C               ;SYSTEM EQUATES, BIOS AND BDOS FUNCTIONS
F200            C       BIOS    EQU     0F200H
F218            C       SELDSK  EQU     BIOS+18H
F21E            C       SETTRK  EQU     BIOS+1EH
F221            C       SETSEC  EQU     BIOS+21H
F224            C       STBDMA  EQU     BIOS+24H
F227            C       BIREAD  EQU     BIOS+27H
0000            C       WBOOT   EQU     0
0005            C       BDOS    EQU     5
005C            C       FCB     EQU     5CH
006B            C       FCBRC   EQU     FCB+15          ;RECORD COUNT, NORMALLY AT 6BH
007C            C       FCBCR   EQU     FCB+32          ;CURRENT RECORD, NORMALLY AT 7CH
0001            C       GETTOD  EQU     1               ;EXT BDOS CALL, GET TIME/CALENDAR
0002            C       SETTOD  EQU     2               ;EXT BDOS CALL, SET TIME/CALENDAR
0002            C       CONOUT  EQU     2               ;SINGLE CHARACTER CONSOLE OUTPUT
0005            C       LIST    EQU     5               ;PRINTER DRIVER
0006            C       DIRIO   EQU     6               ;DIRECT I/O
0009            C       PSTRING EQU     9               ;SEND A STRING TO CONSOLE
000B            C       CONST   EQU     11              ;CONSOLE STATUS
000D            C       DSKRST  EQU     13              ;DRIVE A, DISKS ARE R/W, DMA = 80H
000F            C       OPENF   EQU     15              ;OPEN A DISK FILE
0010            C       CLOSEF  EQU     16              ;CLOSE A DISK FILE
0011            C       SRCHF   EQU     17              ;SEARCH FOR A FILE
0012            C       SRCHN   EQU     18              ;SEARCH FOR NEXT OCCURRENCE
0013            C       DELETF  EQU     19              ;DELETE A DISK FILE
0014            C       READF   EQU     20              ;SEQUENTIAL READ
0015            C       WRITEF  EQU     21              ;WRITE A FILE
0016            C       MAKEF   EQU     22              ;MAKE A FILE
001A            C       SETDMA  EQU     26              ;SET DISK MEMORY ADDRESS
                C
                C               ;MISCELLANEOUS DEFINITIONS
0040            C       RNGLEN  EQU     64              ;LENGTH OF RING
001F            C       BUNCH   EQU     31              ;NUMBER OF RINGS IN A RINGFILE,
                C                                       ;MUST BE AN ODD NUMBER.
0004            C       REPEAT  EQU     4               ;# OF REPEATS IF DISK READ ERROR
0009            C       TXON    EQU     9               ;TEMPORARY XON
0011            C       XON     EQU     11H             ;XON CHARACTER
0013            C       XOFF    EQU     13H             ;XOFF CHARACTER
000D            C       CR      EQU     13              ;CARRIAGE RETURN
000A            C       LF      EQU     10              ;LINE FEED
001B            C       ESC     EQU     1BH             ;ESCAPE CHARACTER
001A            C       EOF     EQU     1AH             ;END OF FILE MARKER
                C
                C               ;KEYBOARD/DISPLAY/UART BOARD PARAMETERS AND ADDRESSES
0001            C       DISPCLR EQU     1               ;LCD CLEAR
0002            C       DISPHM  EQU     2               ;LCD CURSOR TO HOME POSITION
000C            C       DISPON  EQU     0CH
0080            C       DRT     EQU     80H             ;UART PORT
0090            C       PIO     EQU     90H             ;DISPLAY AND KEYBOARD DEVICE
00A0            C       AUXBB   EQU     0A0H            ;AUXILIARY BUS BUFFER
0090            C       DISP    EQU     PIO+DT+CHNA     ;DISPLAY DATA PORT
0091            C       KYBD    EQU     PIO+DT+CHNB     ;KEYPAD DATA PORT
0028            C       US25    EQU     40              ;.25 MSEC. TIME DELAY PARAMETER
000F            C       CURSOR  EQU     0FH             ;LCD CURSOR AND DISPLAY BLINKING
```

```
0000            C       CONKEY   EQU    0              ;CONSOLE KEY FLAG
0001            C       PADKEY   EQU    1              ;KEYPAD FLAG
0002            C       DSKWARN  EQU    2              ;FLAG : DISK LIMIT ON BLOCKS
0007            C       LOCKRST  EQU    7              ;KEY LOCK SWITCH POSITION: RESET
0006            C       LOCKSRV  EQU    6              ;KEY LOCK SWITCH POSITION: SERVICE
0005            C       PRNTON   EQU    5              ;AUX BUS BUFFER BIT: PRINTER ENABLED
                C
                C              ;SUFFIX RING LOCATIONS, OFFSETS FROM BYTE 0
0002            C       DWTOFF   EQU    2              ;DISK WRITE TOD
000C            C       DRTOFF   EQU    12             ;DISK READ TOD
0016            C       FNOFF    EQU    22             ;FILENAME NUMBER
0019            C       RCTOFF   EQU    25             ;RING COUNTER, MSB
001C            C       STAOFF   EQU    28             ;CONCENTRATOR STATION NUMBER
001D            C       LRCOFF   EQU    29             ;LRC
                C
                C              ;RINGFILE TABLE EQUATES
0000            C       INACT    EQU    0              ;RINGFILE WITH THIS NUMBER NON EXISTENT
00FF            C       ACTIVE   EQU    0FFH           ;FILE EXISTS, NOT SENT YET
004F            C       SENTOK   EQU    '0'            ;4FH, FILE EXISTS, SENT WITHOUT ERROR
0050            C       SENTPRB  EQU    'P'            ;50H, FILE EXISTS, SENT WITH ERROR
0072            C       RDPROB   EQU    'r'            ;72H, FILE EXISTS, CAN'T BE READ
0007            C       EXT      EQU    9              ;RELATIVE LOCATION OF FILETYPE
0030            C       DIRSZE   EQU    48             ;DIRECTORY SIZE IN SECTORS
                C
                C              ;AUXILIARY COMMUNICATION ITEMS (TO PC)
0080            C       COMBLK   EQU    128            ;BLOCK SIZE
                C
                C       ;END OF EQUATE TABLE
                        $EJECT
                        .SALL                          ;SUPPRESS MACRO LISTING
                        ;UARTWR IS A UART COMMAND STRING MACRO
              +         UARTWR   MACRO  PORTAB,PORLEN,DTATBL,DTALEN
              +                  LOCAL  NXTPRT
              +                  LD     HL,PORTCTR     ;STORE LENGTH OF STRING OF PORTS
              +                  LD     (HL),PORLEN
              +                  LD     DE,PORTAB      ;PORTS ADDRESS POINTER
              +         NXTPRT:  LD     A,(DE)
              +                  LD     C,A
              +                  LD     HL,DTATBL      ;DATA TO BE WRITTEN
              +                  LD     B,DTALEN       ;NUMBER OF DATA BYTES
              +                  OTIR
              +                  INC    DE
              +                  LD     A,(PORTCTR)
              +                  DEC    A
              +                  LD     (PORTCTR),A
              +                  JR     NZ,NXTPRT      ;CHECK FOR FINISHED
                                 ENDM
                        $EJECT
0000'                            ASEG                  ;ABSOLUTE ADDRESSING
                                 ORG    100H          ;TRANSIENT PROGRAM STARTING POINT 0100  31 104D           START::  LD     SP,STACK       ;LOCAL STACK
0103  CD 0BC8                    CALL   DINIT          ;INITIALIZE PIO AND DISPLAY
0106  AF                         XOR    A
0107  32 1462                    LD     (FLAGS),A      ;CLEAR KEY FLAGS
010A  32 1006                    LD     (TCBUF+0),A    ;START WITH NOTHING PENDING
```

```
0100    32 1007                 LD      (TCBUF+1),A
0110    32 1008                 LD      (TCBUF+2),A
0113    32 1009                 LD      (TCBUF+3),A
0116    CD 0A41                 CALL    DMAINI          ;INITIALIZE DMA DEVICES AND BUFFERS
0119    CD 0B22                 CALL    UINIT           ;INITIALIZE ALL UARTS (DARTS)
011C    11 13B7                 LD      DE,SYSTRT       ;SYSTEM LOADING MESSAGE
011F    CD 0590                 CALL    MSGPR
0122    CD 0ECD                 CALL    DIREC           ;MAKE RINGFILE TABLE FROM DIRECTORY
0125    3E FF                   LD      A,ACTIVE        ;SEARCH CONDITION
0127    DD 21 11E3              LD      IX,WRTNAM       ;DESTINATION OF NEW FILENAME
012B    CD 0491                 CALL    DNSRCH          ;FIND NEXT AVAILABLE RINGFILE NUMBER
012E    FE 4E                   CP      'N'             ;MARKER FOR DISK FULL
0130    CA 05AA                 JP      Z,FULL 0133    21 1A60         NOTFUL::LD      HL,WRTBF        ;SET RING BUFFER POINTER
0136    22 145D                 LD      (RNGPTR),HL
0139    AF                      XOR     A
013A    32 1462                 LD      (FLAGS),A       ;CLEAR KEY FLAGS
013D    32 1456                 LD      (RNGCTR),A      ;CLEAR THE RING COUNTER
0140    32 146E                 LD      (AUXBF),A       ;PC COM BUFFER
0143    32 146F                 LD      (AUXBF+1),A
0146    32 1461                 LD      (RDCTR),A       ;DISK READ REPEAT COUNTER

;GET SYSTEM TIME OF DAY USING EXTENDED BDOS CALL
0149    CD 0193         GTOD::  CALL    COMIN           ;LOOK AT AUX RECEIVER
014C    CD 0C0A         GKY::   CALL    KYLP            ;LOOK FOR KEYPAD ACTIVITY
014F    DB A0                   IN      A,(AUXBB)       ;GET KEY LOCK SWITCH BITS
0151    CB 77                   BIT     LOCKSRV,A       ;RESET POSITION
0153    CA 031E                 JP      Z,DSKCNG        ;SWITCH IS ON
                                ;GET TIME AND CALENDAR
0156    11 106D                 LD      DE,TODBUF       ;LOCAL BYTE VECTOR ADDRESS TO DE
0159    06 01                   LD      B,GETTOD        ;SUBFUNCTION NUMBER IN REG B
015B    0E FF                   LD      C,0FFH          ;EXTENDED BDOS FUNCTION NUMBER
015D    CD 0005                 CALL    BDOS            ;GET TIME OF DAY AND CALENDAR
0160    D3 BE                   OUT     (MDMA+CMSK),A   ;CLEAR MASTER MASK BITS
                                ;COMPARE MOST RECENT SECONDS TO LAST DISPLAYED SECONDS
0162    3A 1073         COMP::  LD      A,(LOCLSEC)     ;MOST RECENT RTC READ
0165    21 1074                 LD      HL,PREVSEC      ;POINT TO EARLIER READ
0168    BE                      CP      (HL)            ;SAME ?
0169    32 1074                 LD      (PREVSEC),A     ;SAVE MOST RECENT READ
016C    CA 05F7                 JP      Z,STATUS        ;NO CHANGE
                                ;CHECK IF ANY CONSOLE KEY IS DOWN
016F    0E 06           KEYIN:: LD      C,DIRIO         ;BDOS DIRECT CONSOLE INPUT
0171    1E FF                   LD      E,0FFH          ;ANY CONSOLE KEY ?
0173    CD 0005                 CALL    BDOS
0176    FE 00                   CP      0               ;0 IF NO CONSOLE KEY ON
0178    20 06                   JR      NZ,RNGWT        ;CONSOLE KEY IS ON
017A    CD 0887                 CALL    TIME            ;IF NO KEY, CONTINUE MAIN LOOP
017D    C3 0825                 JP      RECVR
0180    3A 1456         RNGWT:: LD      A,(RNGCTR)      ;CHECK IF ANY RINGS IN BUFFER
0183    FE 00                   CP      0
0185    28 03                   JR      Z,KEYS          ;NO RINGS IN BUFFER
0187    CD 036C                 CALL    DSKWR           ;WRITE FILE IF SOME RINGS
018A    11 127C         KEYS::  LD      DE,CONSTP       ;DISPLAY MESSAGE
018D    CD 0590                 CALL    MSGPR
0190    C3 0000                 JP      WBOOT           ;EXIT
```

```
                        ;AUXILIARY RECEIVER MESSAGE PROCESS. (PC COM LINE)
0193  0E 82     COMIN::  LD    C,DRT+CHNA+CTL
0195  ED 40              IN    B,(C)
0197  CB 40              BIT   RXRDY,B
0199  C8                 RET   Z                    ;DART RECEIVER IS EMPTY
019A  DB 80     AUXIN::  IN    A,(DRT+CHNA+DT)      ;GET CHARACTER
019C  FE 11              CP    XON
019E  20 1A              JR    NZ,LKZ               ;NOT XON, 'z' ?
                ;CHARACTER RECEIVED IS XON,
                ;CHECK IF ALL BLOCKS IN FILE HAVE BEEN TRANSMITTED.
01A0  3A 1460   GXON::   LD    A,(ACMCTR)           ;GET COM BLOCK COUNTER
01A3  FE 00              CP    0                    ;DONE ?
01A5  28 5D              JR    Z,CLRBUF             ;YES
01A7  2A 146B            LD    HL,(ACMPTR)          ;NO, SEND ANOTHER BLOCK
01AA  06 80              LD    B,128                ;128 BYTE COM BLOCK
01AC  CD 02F2   AUXOUT::CALL   AUXMIT
01AF  22 146B            LD    (ACMPTR),HL          ;SAVE FOR NEXT BLOCK
01B2  3A 146D            LD    A,(ACMCTR)           ;ADJUST BLOCK COUNTER
01B5  3D                 DEC   A
01B6  32 146D            LD    (ACMCTR),A
01B9  C9                 RET

01BA  FE 7A     LKZ::    CP    'z'
01BC  20 4E              JR    NZ,NOTZ
                ;CHARACTER RECEIVED IS 'Z', CHECK BUFFER
01BE  3A 146E   BUFCHK::LD    A,(AUXBF)            ;LOOK AT FIRST BUFFER CHARACTER
01C1  FE 73              CP    's'
01C3  20 0F              JR    NZ,CK0
01C5  3A 146F            LD    A,(AUXBF+1)          ;LOOK AT SECOND CHARACTER
01C8  FE 64              CP    'd'
01CA  20 38              JR    NZ,CLRBUF            ;GOT 's', BUT NO 'd', ERROR
01CC  3E 04              LD    A,REPEAT             ;# OF DISK REPEATS IF READ ERROR
01CE  32 1461            LD    (RDCTR),A
01D1  C3 0225            JP    PRPCOM               ;GOT 'sdz' SEQUENCE ;GOT A 'z', BUT 1ST CHARACTER WAS NOT 's'.
01D4  FE 6F     CK0::    CP    'o'                  ;1ST CHAR. = 'o' ?
01D6  20 0B              JR    NZ,CKF               ;NO, CHECK = 'f'
01D8  3A 146F            LD    A,(AUXBF+1)
01DB  FE 6B              CP    'k'
01DD  20 25              JR    NZ,CLRBUF            ;GOT 'o', BUT NO 'k', ERROR
01DF  3E 4F              LD    A,SENTOK             ;FILE HAS BEEN ACCEPTED
01E1  18 10              JR    FINFL
01E3  3A 146E   CKF::    LD    A,(AUXBF)            ;1ST CHAR. NOT 'o'
01E6  FE 66              CP    'f'
01E8  20 1A              JR    NZ,CLRBUF            ;1ST CHAR. NOT 's','o' OR 'f', ERROR
01EA  3A 146F   CKFF::   LD    A,(AUXBF+1)          ;2ND CHAR. = 'f' ?
01ED  FE 66              CP    'f'
01EF  20 13              JR    NZ,CLRBUF            ;2ND CHAR. NOT 'f', ERROR
01F1  3E 50              LD    A,SENTPRB            ;FILE RECEIVED WITH ERROR ;FILE HAS BEEN ACCEPTED, FIX FNTBL AND BLOCK COUNTER.
01F3  2A 1478   FINFL::  LD    HL,(FNUM1)           ;PUT MARKER IN TABLE
01F6  77                 LD    (HL),A
01F7  AF                 XOR   A
01F8  32 1460            LD    (ACMCTR),A           ;CLEAR COM BLOCK COUNTER
```

```
01FB  DB A0                IN    A,(AUXBB)      ;READ AUXILIARY BUS BUFFER
01FD  CB 6F                BIT   PRNTON,A       ;PRINT THIS FILE ?
01FF  20 03                JR    NZ,CLRBUF      ;SWITCH IS OFF
0201  CD 0DC0              CALL  PRINT          ;SWITCH IS ON

;COM AND PRINT DONE OR ERROR, CLEAR AUX BUFFER.
0204  AF             CLRBUF::XOR  A
0205  32 146E              LD    (AUXBF),A
0208  32 146F              LD    (AUXBF+1),A
020B  C9                   RET

;RECEIVED CHARACTER IS IN A, IS NOT 'z'.
020C  47             NOTZ:: LD   B,A            ;SAVE CHARACTER
020D  3A 146E              LD    A,(AUXBF)      ;LOOK AT 1ST CHARACTER
0210  FE 00                CP    0              ;EMPTY ?
0212  20 05                JR    NZ,CH2         ;NOT EMPTY
0214  78                   LD    A,B            ;GET BACK
0215  32 146E              LD    (AUXBF),A      ;STORE IT
0218  C9                   RET
0219  3A 146F        CH2:: LD    A,(AUXBF+1)    ;LOOK 2ND CHARACTER
021C  FE 00                CP    0              ;EMPTY ?
021E  20 E4                JR    NZ,CLRBUF      ;NEITHER EMPTY, ERROR
0220  78                   LD    A,B            ;GET BACK
0221  32 146F              LD    (AUXBF+1),A    ;STORE IT
0224  C9                   RET

;PREPARE A FILE FOR TRANSMISSION TO THE PC.
0225  3E FF          PRPCOM::LD  A,ACTIVE
0227  DD 21 11F3           LD    IX,RDNAM
022B  CD 0462              CALL  UFSRCH         ;SEARCH GOING UP, FILE # IN FNUM0
022E  FE 4E                CP    'N'            ;MARKER FOR NO ACTIVE FILES
0230  CA 020C              JP    Z,LSTFL        ;SEE IF ANOTHER FILE IS NEEDED
0233  ED 5B 1476           LD    DE,(FNUM0)     ;MOVE THE FILE NAME POINTER
0237  ED 53 1478           LD    (FNUM1),DE

;DISK READ OPERATIONS START HERE. ENTER WITH FILENAME ADDR IN HL.
023B  CD 050F        DISKRD::CALL SUPFCB        ;MOVE COMMAND INTO FCB
023E  21 2260              LD    HL,RDBF
0241  22 145F              LD    (DMAPTR),HL    ;DESTINATION OF DISK DATA
0244  CD 0531              CALL  SUPDMA
0247  CD 0538              CALL  OPEN           ;SETS CURRENT RECORD = 0
024A  20 06                JR    NZ,RDSEC       ;FILE FOUND
024C  11 129F              LD    DE,NOFILE      ;FILE NOT FOUND
024F  C3 02C9              JP    RDEC
0252  CD 055B        RDSEC::CALL READ           ;READ FROM DISK
0255  28 06                JR    Z,RDOK         ;Z = TRUE, IF SUCCESSFUL READ
0257  11 12C2              LD    DE,READPR      ;READ PROBLEM
025A  C3 02C9              JP    RDEC
025D  21 007C        RDOK:: LD   HL,FCBCR       ;GET CURRENT NUMBER
0260  46                   LD    B,(HL)
0261  3A 006B              LD    A,(FCBRC)      ;GET FILE RECORD COUNT
0264  B8                   CP    B              ;FCBCR = FCBRC ?
0265  28 0F                JR    Z,FNOSUF       ;COMPLETE FILE HAS BEEN READ
0267  2A 145F              LD    HL,(DMAPTR)    ;GET DATA POINTER
026A  11 0080              LD    DE,128         ;SECTOR SIZE
026D  19                   ADD   HL,DE          ;NEXT ADDRESS
026E  22 145F              LD    (DMAPTR),HL    ;SAVE NEXT DMA
```

```
0271  CD 0531              CALL   SUPDMA
0274  18 0C                JR     RDSEC

;FIND THE SUFFIX RING, (DMAPTR) IS 1ST BYTE OF LAST SECTOR.
0276  3A 006B       FNDSUF::LD    A,(FCBRC)       ;GET FILE RECORD COUNT
0279  CB 27                SLA    A                ;X2 = RINGS PER RECORD (SECTOR)
027B  D6 02                SUB    2                ;BACK UP THROUGH THE SECTOR
027D  47                   LD     B,A              ;SAVE
027E  3E 1A                LD     A,EOF            ;LOOK FOR END-OF-FILE MARKER
0280  2A 145F              LD     HL,(DMAPTR)      ;FIRST BYTE, LAST SECTOR READ
0283  BE                   CP     (HL)             ;FIRST HALF OF SECTOR
0284  28 0E                JR     Z,GTSUF          ;IF Z, (HL) IS SUFFIX RING
0286  04                   INC    B
0287  11 0040              LD     DE,64            ;MUST BE LAST HALF OF SECTOR
028A  19                   ADD    HL,DE
028B  BE                   CP     (HL)             ;MAKE SURE
028C  28 06                JR     Z,GTSUF          ;GOT IT
                           ;SUFFIX NOT FOUND, TRY AGAIN.
028E  11 12E5              LD     DE,SUFPRB        ;SUFFIX ERROR MESSAGE
0291  C3 02C9              JP     RDEC

;HL POINTS TO 1ST BYTE OF SUFFIX RING, B IS # OF RINGS IN FILE.
                           ;PUT DISK READ TOD, PARITY AND LRC IN SUFFIX.
0294  C5            GTSUF::PUSH   BC               ;SAVE # OF RINGS
0295  11 000C              LD     DE,DRTOFF        ;DISK READ TOD POSITION
0298  19                   ADD    HL,DE
0299  CD 072F              CALL  SPRED             ;PUT TOD IN SUFFIX, HL IS LOCATION

029C  C1            SUFL:: POP    BC               ;GET # OF RINGS
029D  68                   LD     L,B              ;CALCULATE NUMBER OF BYTES IN RINGS
029E  26 00                LD     H,0
02A0  06 06                LD     B,6              ;X64 IS 6 SHIFTS
02A2  AF                   XOR    A                ;CLEAR CARRY
02A3  CB 15         MULT:: RL     L                ;X 2, WITH CARRY
02A5  CB 14                RL     H
02A7  10 FA                DJNZ   MULT
02A9  11 0010              LD     DE,STAOFF+1      ;INCLUDE SUFFIX BYTES
02AC  19                   ADD    HL,DE
02AD  EB                   EX     DE,HL            ;DE IS TOTAL BYTES
02AE  21 2260              LD     HL,RDBF
02B1  CD 070C              CALL   LRCALC
                           ;TO PRODUCE AN ERROR IN THE TRANSMITTED LRC, USE THE FOLLOWING CODE.
                           ;FAIL:: DEC   HL                ;BACK UP TO LSD OF LRC
                           ;       LD    A,(HL)
                           ;       ADD   A,20H             ;CHANGES NUMBER TO 'P' - 'Y'.
                           ;       LD    (HL),A
                           ;       *     *     *     *     *     *     *

02B4  3A 006B       RCS::  LD     A,(FCBRC)        ;GET NUMBER OF DISK RECORDS
02B7  32 146D              LD     (ACNCTR),A       ;SAVE COUNTER
02BA  21 2260              LD     HL,RDBF          ;SET UP SOURCE POINTER
02BD  22 146B              LD     (ACMPTR),HL
02C0  21 11FC              LD     HL,RDNAM+9       ;SEND FILE NUMBER BACK
02C3  06 03                LD     B,3
02C5  CD 02F2              CALL   AUXMIT
02C8  C9                   RET
```

```
                    ;CHECK IF REPEAT COUNTER = 0, TRY AGAIN OR SET TABLE MARKER.
02C9  21 1461       RDEC::  LD      HL,RDCTR
02CC  35                    DEC     (HL)
02CD  C2 0225               JP      NZ,PRPCOM       ;CTR NOT 0
02D0  2A 1478               LD      HL,(FNUM1)
02D3  3E 72                 LD      A,RDPROB
02D5  77                    LD      (HL),A          ;STORE IN TABLE
02D6  CD 0594               CALL    DISTMR          ;DISPLAY AND TERMINAL
02D9  C3 0225               JP      PRPCOM          ;TRY AGAIN, NEXT FILE

;LOOK FOR ANY RINGS STILL IN BUFFER.
02DC  3A 1456       LSTFL:: LD      A,(RNGCTR)
02DF  FE 00                 CP      0
02E1  28 06                 JR      Z,NOACT         ;NONE PENDING
02E3  CD 0371               CALL    DISKWR          ;SAVE SOME
02E6  C3 0225               JP      PRPCOM          ;SEND THEM

;THERE ARE NO FILES TO SEND.
02E9  21 147A       NOACT:: LD      HL,NAMSG        ;NAMSG IS 'naz'
02EC  06 03                 LD      B,3
02EE  CD 02F2               CALL    AUXMIT
02F1  C9                    RET ;AUXILIARY DART DRIVER. ENTER WITH BYTE COUNT IN B,
                    ;DATA LOCATION POINTER IN HL.
02F2  CD 0204       AUXMIT::CALL    CLRBUF          ;CLEAR THE INCOMING BUFFER
02F5  0E 82         AUXMTT: LD      C,DRT+CHNA+CTL
02F7  1E 05                 LD      E,5
02F9  ED 59                 OUT     (C),E
02FB  1E 68                 LD      E,TXEN          ;XMIT ON
02FD  ED 59                 OUT     (C),E
02FF  7E            STUF::  LD      A,(HL)
0300  ED 58         TX::    IN      E,(C)
0302  CB 53                 BIT     TXEMT,E
0304  28 FA                 JR      Z,TX
0306  D3 80                 OUT     (DRT+CHNA+DT),A
0308  23                    INC     HL
0309  10 F4                 DJNZ    STUF 030B  1E 01         LAST::  LD      E,1
030D  ED 59                 OUT     (C),E
030F  ED 58                 IN      E,(C)
0311  CB 43                 BIT     ALLSENT,E       ;CHECK ALL SENT
0313  28 F6                 JR      Z,LAST
0315  1E 05                 LD      E,5
0317  ED 59                 OUT     (C),E
0319  1E E0                 LD      E,TXDIS         ;TRANSMITTER OFF
031B  ED 59                 OUT     (C),E
031D  C9                    RET ;SERVICE LOCKSWITCH IS ON.
031E  11 1371       DSKCNG::LD      DE,FINISH       ;DISK CHANGE MESSAGE
0321  CD 0590               CALL    MSGPR           ;TO CONSOLE AND LCD
0324  21 1462               LD      HL,FLAGS        ;POINT TO FLAGS
0327  CB F6                 SET     LOCKSRV,(HL)    ;USE SAME BIT AS SWITCH
0329  3A 1456       DSKR::  LD      A,(RNGCTR)      ;ANY RINGS IN BUFFER ?
```

```
032C    FE 00               CP      0
032E    28 0C               JR      Z,REDSK         ;NO RINGS
0330    CD 0371             CALL    DISKWR          ;CAPTURE PENDINGS RINGS
0333    11 0000             LD      DE,0
0336    CD 0BC2             CALL    DELAY
0339    CD 0BC2             CALL    DELAY
033C    11 1394     REDSK:: LD      DE,REPDSK       ;REPLACE DISK MESSAGE
033F    CD 059D             CALL    MSGPR           ;TO CONSOLE AND LCD
0342    DB A0       SWON::  IN      A,(AUX8B)       ;CHECK SWITCH AGAIN
0344    CB 77               BIT     LOCKSRV,A
0346    CA 0342             JP      Z,SWON          ;STILL ON
0349    11 13B7             LD      DE,SYSTRT       ;SYSTEM LOADING MESSAGE
034C    CD 059D             CALL    MSGPR
034F    C3 0000             JP      WBOOT           ;EXIT 0352    2A 10FA     KEEP::  LD      HL,(RCBFPTR)    ;SOURCE
0355    ED 5B 145D          LD      DE,(RNGPTR)     ;DATA DESTINATION
0359    01 0040             LD      BC,64
035C    ED B0               LDIR
035E    ED 53 145D          LD      (RNGPTR),DE     ;SAVE NEXT DESTINATION
0362    3A 1456             LD      A,(RNGCTR)      ;GET COUNTER
0365    3C                  INC     A
0366    32 1456             LD      (RNGCTR),A
0369    FE 1F               CP      BUNCH
036B    C9                  RET                     ;IF RNGCTR = BUNCH, WILL GO DISKWR

;DISK WRITE OPERATIONS START HERE.
036C    21 1462     DSKWR:: LD      HL,FLAGS        ;SET FLAG IF CONSOLE KEY EXIT
036F    CB C6               SET     CONKEY,(HL)
0371    21 1A60     DISKWR::LD      HL,WRTBF        ;ADDRESS OF FIRST RING OF THIS BUNCH
0374    22 145F             LD      (DMAPTR),HL     ;DISK MEMORY POINTER
0377    CD 0531             CALL    SUPDMA
037A    21 11E3             LD      HL,WRTNAM       ;MAKE SURE FCB IS CORRECT
037D    CD 050F             CALL    SUPFCB
0380    CD 0545             CALL    MAKE            ;MAKE A NEW FILE
0383    CA 05AA             JP      Z,FULL          ;Z = TRUE IF NO DIRECTORY SPACE

;BEFORE WRITING THE FILE, THE SUFFIX RING MUST BE ASSEMBLED
                    ;IN THE SPACE FOLLOWING THE LAST RING.
                    ;SUFFIX CONFIGURATION, ASCII UNLESS OTHERWISE MARKED.
                            ;Byte   0       1A hex End-of-file markers
                            ;       1       1A hex
                            ;       2-11    Time of disk write
                            ;       12-21   Time of disk read
                            ;       22-24   File number
                            ;       25-27   Ring counter
                            ;       28      Concentrator station #
                            ;       29-30   Lrc of message
                            ;       31-63   1A hex 0386    2A 145D     WRGO::  LD      HL,(RNGPTR)     ;GET FIRST LOCATION OF SUFFIX
0389    3E 1A               LD      A,EOF           ;END OF FILE MARKER
038B    06 80               LD      B,COMBLK        ;COM BLOCK (128)
038D    77          EOFFL:: LD      (HL),A
038E    23                  INC     HL
038F    10 FC               DJNZ    EOFFL           ;FILL MEMORY WITH EOF CHARACTERS
```

```
                            ;PUT ASCII TOD IN SUFFIX
0391    2A 145D             LD      HL,(RNGPTR)     ;GET SUFFIX LOCATION
0394    11 0002             LD      DE,DWTOFF       ;DISK WRITE TOD LOCATION
0397    19                  ADD     HL,DE           ;HL IS DESTINATION
0398    CD 072F             CALL    SPRED 039B    21 0016             LD      HL,FNOFF        ;FILE NUMBER LOCATION
039E    ED 5B 145D          LD      DE,(RNGPTR)
03A2    19                  ADD     HL,DE
03A3    EB                  EX      DE,HL           ;DE POINTS TO SUFFIX
03A4    21 11EC             LD      HL,WRTNAM+9
03A7    01 0003             LD      BC,3
03AA    ED B0               LDIR                    ;PUT FILENUMBER IN SUFFIX

;MAKE RING COUNTER INTO ASCII
03AC    3A 1456     RNGFL:: LD      A,(RNGCTR)
03AF    32 1457             LD      (RNGCTR+1),A    ;COPY TO SAVE
03B2    06 08               LD      B,8             ;PROCESS 8 BITS
03B4    AF                  XOR     A               ;CLEAR 2 WORKSPACES
03B5    21 1458             LD      HL,RNGCTR+2
03B8    77                  LD      (HL),A
03B9    23                  INC     HL
03BA    77                  LD      (HL),A
03BB    AF          LP1::   XOR     A
03BC    21 1457             LD      HL,RNGCTR+1
03BF    7E                  LD      A,(HL)
03C0    8F                  ADC     A,A
03C1    77                  LD      (HL),A
03C2    21 1459             LD      HL,RNGCTR+3
03C5    0E 02               LD      C,2
03C7    7E          LP2::   LD      A,(HL)
03C8    8F                  ADC     A,A
03C9    27                  DAA
03CA    77                  LD      (HL),A
03CB    2B                  DEC     HL
03CC    0D                  DEC     C
03CD    C2 03C7             JP      NZ,LP2
03D0    10 E9               DJNZ    LP1
                            ;PACKED BCD IN RNGCTR+1 AND +2, MOVE TO SUFFIX
03D2    3A 1458             LD      A,(RNGCTR+2)
03D5    F6 30               OR      30H
03D7    12                  LD      (DE),A          ;STORE 100'S DIGIT
03D8    13                  INC     DE
03D9    21 1459             LD      HL,RNGCTR+3     ;POINT TO 10'S AND 1'S
03DC    ED 6F               RLD                     ;GET 10'S
03DE    12                  LD      (DE),A          ;STORE 10'S
03DF    13                  INC     DE
03E0    ED 6F               RLD                     ;GET 1'S
03E2    12                  LD      (DE),A          ;STORE 1'S
03E3    13                  INC     DE
03E4    DB A0       STAST:: IN      A,(AUXB8)       ;GET STATION SWITCH
03E6    2F                  CPL
03E7    E6 0F               AND     0FH             ;MASK TOP
03E9    FE 0A               CP      10              ;LETTER ?
03EB    FA 03F2             JP      M,NUMB
03EE    C6 37               ADD     A,37H           ;ASCII LETTER OFFSET
```

```
03F0    18 02                   JR      BYT
03F2    F6 30         NUMB::    OR      30H                     ;MAKE ASCII NUMBER
03F4    12            BYT::     LD      (DE),A                  ;STORE STATION NUMBER

;USE RNGCTR AS A SECTOR COUNTER.
03F5    21 1456       PRCTR::   LD      HL,RNGCTR
03F8    34                      INC     (HL)                    ;ADD FOR SUFFIX
03F9    CD 0551       WREDY::   CALL    WRITE                   ;WRITE TO DISK
03FC    28 09                   JR      Z,WROK                  ;Z = TRUE, IF SUCCESSFUL WRITE
03FE    11 1236                 LD      DE,WRITPRB
0401    CD 059D                 CALL    MSGPR
0404    C3 0000                 JP      WBOOT                   ;EXIT

0407    AF            WROK::    XOR     A
0408    3A 1456                 LD      A,(RNGCTR)              ;GET SECTOR COUNTER
040B    D6 02                   SUB     2                       ;2 RINGS PER SECTOR
040D    28 15                   JR      Z,CLS                   ;NOW = 0, WAS +2, DONE
040F    FA 0424                 JP      M,CLS                   ;NOW = -1, WAS +1, DONE
0412    32 1456                 LD      (RNGCTR),A              ;NOT DONE, SAVE REMAINING RINGS
0415    2A 145F       DMAP::    LD      HL,(DMAPTR)             ;GET DATA POINTER
0418    11 0080                 LD      DE,128                  ;SECTOR SIZE
041B    19                      ADD     HL,DE
041C    22 145F                 LD      (DMAPTR),HL
041F    CD 0531                 CALL    SUPDMA
0422    18 D5                   JR      WREDY

0424    CD 0565       CLS::     CALL    CLOSE                   ;CLOSE THE FILE
0427    20 09                   JR      NZ,FIXTBL               ;Z = FALSE, IF CLOSED
0429    11 1259                 LD      DE,CLOSPRB
042C    CD 059D                 CALL    MSGPR                   ;IF CANNOT CLOSE
042F    C3 0000                 JP      WBOOT                   ;EXIT
0432    21 11EC       FIXTBL::  LD      HL,WRTNAM+9
0435    CD 0F51                 CALL    EXTCNV
0438    3E FF                   LD      A,ACTIVE                ;SET TABLE VALUE
043A    77                      LD      (HL),A
043B    CD 0570       CFNM::    CALL    FNMSG                   ;"FILENAME" MSG TO CONSOLE
043E    21 1462                 LD      HL,FLAGS                ;TEST IF CONSOLE EXIT
0441    CB 46                   BIT     CONKEY,(HL)
0443    20 12                   JR      NZ,NOSRCH               ;KEY ON
0445    CB 76                   BIT     LOCKSRV,(HL)            ;SERVICE SWITCH ON ?
0447    20 0E                   JR      NZ,NOSRCH               ;YES, DO NOT DEVELOP NEXT FILENAME
0449    3E FF                   LD      A,ACTIVE                ;SEARCH CONDITION
044B    DD 21 11E3              LD      IX,WRTNAM               ;LOCATION OF NEW FILENAME
044F    CD 0491                 CALL    DNSRCH                  ;FIND NEXT FILENAME
0452    FE 4E                   CP      'N'                     ;MARKER FOR DISK FULL
0454    CA 05AA                 JP      Z,FULL                  ;IF DIRECTORY IS FULL
0457    21 1A60       NOSRCH::  LD      HL,WRTBF                ;RESET RING BUFFER POINTER
045A    22 145D                 LD      (RNGPTR),HL             ;FOR RING COLLECTION
045D    AF                      XOR     A
045E    32 1456                 LD      (RNGCTR),A              ;RESET RING COUNTER
0461    C9                      RET

;SEARCH RINGFILE TABLE FOR NEXT AVAILBLE RINGFILE NUMBER.
                ;ENTER WITH IX POINTING TO LOCATION OF FILENAME.
                ;EXIT WITH HL POINTING TO NEW FILENAME, AND RESULT OF SEARCH IN A.
                ; 0 = NEW FILE ESTABLISHED, 'N' = CONDITION NOT FOUND.
```

```
                            ;SEARCH GOING UP.
0462    F5          UPSRCH::PUSH    AF              ;SAVE SEARCH CONDITION
0463    3E 02               LD      A,2             ;2 TABLE SECTIONS
0465    32 1465             LD      (BLKCTR),A      ;10 x 10 OR 8 BLOCKS
0468    21 1490             LD      HL,FNTBL        ;BASE ADDRESS
046B    0E 0A       LOOP2:: LD      C,10            ;FIRST SECTION OF TABLE IS 10 LINES
046D    F1          LOOP1:: POP     AF              ;GET SEARCH CONDITION
046E    F5                  PUSH    AF
046F    06 0A               LD      B,10            ;BYTES PER LINE
0471    BE          LOOP0:: CP      (HL)
0472    CA 04E6             JP      Z,NEWCMD        ;FOUND IT
0475    23                  INC     HL              ;KEEP LOOKING
0476    10 F9               DJNZ    LOOP0
0478    11 0006             LD      DE,6            ;SKIP LINE END, A-FH
047B    19                  ADD     HL,DE           ;NEXT LINE
047C    0D                  DEC     C
047D    20 EE               JR      NZ,LOOP1        ;NEXT LINE
047F    21 1590             LD      HL,FNTBL+100H   ;2ND SECTION OF TABLE
0482    0E 08               LD      C,8             ;SECOND SECTION OF TABLE IS 8 LINES
0484    3A 1465             LD      A,(BLKCTR)
0487    3D                  DEC     A
0488    32 1465             LD      (BLKCTR),A
048B    20 E0               JR      NZ,LOOP1        ;DO 2ND SECTION
                            ;SEARCHED WHOLE TABLE, NOT FOUND
048D    F1          NFND::  POP     AF              ;ADJUST SP
048E    3E 4E               LD      A,'N'           ;CONDITION NOT FOUND
0490    C9                  RET
                            ;SEARCH THE FILE NUMBER TABLE FOR CONDITIONS, GOING DOWN.
0491    F5          DNSRCH::PUSH    AF              ;SAVE SEARCH CONDITION
0492    3E 02               LD      A,2             ;2 TABLE SECTIONS
0494    32 1465             LD      (BLKCTR),A      ;10 x 10 OR 8 BLOCKS
0497    21 1609             LD      HL,FNTBL+179H   ;LAST POSITION
049A    3E 00               LD      A,INACT         ;CHECK FOR TABLE NOT FULL
049C    BE                  CP      (HL)
049D    C2 05AA             JP      NZ,FULL         ;IF POSITION 179 IS USED
04A0    0E 08       LOOP5:: LD      C,8             ;SECOND SECTION OF TABLE IS 8 LINES
04A2    F1          LOOP4:: POP     AF              ;GET SEARCH CONDITION
04A3    F5                  PUSH    AF
04A4    06 0A               LD      B,10            ;BYTES PER LINE
04A6    BE          LOOP3:: CP      (HL)
04A7    CA 04C9             JP      Z,DNCMD         ;FOUND IT
04AA    2B                  DEC     HL              ;KEEP LOOKING
04AB    10 F9               DJNZ    LOOP3
04AD    11 0006             LD      DE,6            ;SKIP END OF LINE, A-F
04B0    AF                  XOR     A               ;CLEAR CARRY
04B1    ED 52               SBC     HL,DE           ;NEXT LINE
04B3    0D                  DEC     C
04B4    20 EC               JR      NZ,LOOP4        ;NEXT LINE
04B6    21 1529             LD      HL,FNTBL+99H    ;1ST SECTION OF TABLE
04B9    0E 0A               LD      C,10            ;FIRST SECTION OF TABLE IS 10 LINES
04BB    3A 1465             LD      A,(BLKCTR)      ;MUST NEXT LOWER LINE.
04BE    3D                  DEC     A
04BF    32 1465             LD      (BLKCTR),A
04C2    20 DE               JR      NZ,LOOP4        ;DO 2ND SECTION
04C4    21 1490             LD      HL,FNTBL        ;NOT FOUND, USE 1ST NUMBER
04C7    18 1D               JR      NEWCMD
```

```
                    ;GENERATE NEXT COMMAND LINE. HL IS POINTER TO FNTBL.
04C9  E5            DNCMD:: PUSH  HL              ;SAVE POINTER
04CA  11 1529               LD    DE,FNTBL+99H    ;LAST POSITION IN 1ST SECTION
04CD  AF                    XOR   A
04CE  ED 52                 SBC   HL,DE           ;AT LAST POSITION ?
04D0  E1                    POP   HL              ;GET POINTER
04D1  20 05                 JR    NZ,TEND         ;NOT AT LAST POSITION
04D3  21 1590               LD    HL,FNTBL+100H   ;GO TO FILE # 100
04D6  18 0E                 JR    NEWCMD          ;MAKE FILENAME
04D8  7D            TEND::  LD    A,L             ;GET LSB
04D9  E6 0F                 AND   0FH             ;MASK TOP
04DB  FE 09                 CP    9               ;AT END OF LINE ?
04DD  28 03                 JR    Z,ADD7          ;MOVE TO NEXT LINE
04DF  23                    INC   HL              ;NOT AT END OF LINE
04E0  18 04                 JR    NEWCMD
04E2  11 0007       ADD7::  LD    DE,7
04E5  19                    ADD   HL,DE           ;TO NEXT LINE
04E6  22 1476       NEWCMD::LD    (FNUM0),HL      ;SAVE FOUND FILE TABLE ADDRESS
04E9  11 1490               LD    DE,FNTBL        ;BASE ADDRESS
04EC  AF                    XOR   A
04ED  ED 52                 SBC   HL,DE           ;GET ACTUAL NUMBER
04EF  7C                    LD    A,H             ;MSD
04F0  F6 30                 OR    30H             ;ASCII
04F2  DD 77 09              LD    (IX+9),A
04F5  7D                    LD    A,L             ;GET 10'S AND 1'S
04F6  E6 F0                 AND   0F0H
04F8  0F                    RRCA
04F9  0F                    RRCA
04FA  0F                    RRCA
04FB  0F                    RRCA
04FC  F6 30                 OR    30H
04FE  DD 77 0A              LD    (IX+10),A       ;10'S DIGIT
0501  7D                    LD    A,L
0502  E6 0F                 AND   0FH
0504  F6 30                 OR    30H
0506  DD 77 0B              LD    (IX+11),A       ;1'S DIGIT
0509  F1                    POP   AF              ;ADJUST STACK
050A  DD E5                 PUSH  IX
050C  E1                    POP   HL              ;READY FOR FCB SET UP
050D  AF                    XOR   A               ;NEW FILE "OK" MARKER
050E  C9                    RET

;LOAD FILENAME INTO DEFAULT FCB LOCATION, SET CURRENT RECORD NUMBER = 0.
                    ;ENTER WITH HL = FILENAME ADDRESS.
050F  11 005C       SUPFCB::LD    DE,FCB
0512  01 0010               LD    BC,16
0515  ED B0                 LDIR
0517  AF                    XOR   A
0518  32 007C               LD    (FCBCR),A       ;CLEAR THE CURRENT RECORD NUMBER
051B  C9                    RET

;ERASE ALL FILES WITH THE GENERIC FILENAME = 'RINGFILE.nnn'
051C  21 1203       ERASE:  LD    HL,ERSNAM
051F  CD 050F               CALL  SUPFCB
0522  11 130A               LD    DE,ERSMSG       ;SETUP DISPLAY
0525  CD 059D               CALL  MSGPR
```

```
0528   0E 13                    LD      C,DELETF
052A   11 005C                  LD      DE,FCB
052D   CD 0005                  CALL    BDOS
0530   C9                       RET

;SET UP THE DISK MEMORY ADDRESS
0531   0E 1A            SUPDMA::LD      C,SETDMA
0533   ED 5B 145F               LD      DE,(DMAPTR)
0537   CD 0005                  CALL    BDOS
053A   C9                       RET

;OPEN THE FILE.  Z = TRUE, IF NOT FOUND
053B   0E 0F            OPEN::  LD      C,OPENF
053D   11 005C                  LD      DE,FCB
0540   CD 0005                  CALL    BDOS
0543   FE FF                    CP      0FFH
0545   C9                       RET

;MAKE A NEW FILE. Z = TRUE, IF NO DIRECTORY SPACE
0546   0E 16            MAKE::  LD      C,MAKEF
0548   11 005C                  LD      DE,FCB
054B   CD 0005                  CALL    BDOS
054E   FE FF                    CP      0FFH
0550   C9                       RET

;WRITE THE FILE TO DISK.  Z = TRUE, IF SUCCESSFUL
0551   0E 15            WRITE:: LD      C,WRITEF
0553   11 005C                  LD      DE,FCB
0556   CD 0005                  CALL    BDOS
0559   B7                       OR      A
055A   C9                       RET

;READ A DISK FILE.  Z = TRUE, IF SUCCESSFUL
055B   0E 14            READ::  LD      C,READF
055D   11 005C                  LD      DE,FCB
0560   CD 0005                  CALL    BDOS
0563   B7                       OR      A
0564   C9                       RET
                                ;CLOSE THE FILE.  Z = TRUE, IF FAILURE TO CLOSE
0565   0E 10            CLOSE:: LD      C,CLOSEF
0567   11 005C                  LD      DE,FCB
056A   CD 0005                  CALL    BDOS
056D   FE FF                    CP      0FFH
056F   C9                       RET

;SEND THE FILENAME TO THE CONSOLE AND LCD
0570   21 1308          FNMSG:: LD      HL,FILDR        ;GET MESSAGE, TWO LINES
0573   11 1132                  LD      DE,DISBUF
0576   01 0020                  LD      BC,32
0579   ED B0                    LDIR
057B   21 11E4                  LD      HL,WRTNAM+1     ;GET FILENAME
057E   11 1144                  LD      DE,DISBUF+18
0581   01 0008                  LD      BC,8
0584   ED B0                    LDIR
0586   21 11EC                  LD      HL,WRTNAM+9     ;GET FILENAME
0589   11 114D                  LD      DE,DISBUF+27
```

```
058C   01 0003                    LD      BC,3
058F   ED B0                      LDIR
0591   11 1132                    LD      DE,DISBUF
0594   CD 059D    DISTMR::CALL    MSGPR                   ;TO CONSOLE AND LCD
0597   3E 05                      LD      A,5             ;START DISPLAY TIMER
0599   32 1159                    LD      (DPHOLD),A
059C   C9                         RET
```

```
;IF ERROR OR CONSOLE KEY, DISPLAYS TEXT MESSAGE ON LCD AND TERMINAL.
;TO LOOP FOREVER ON SUBMIT COMMANDS, USE THE JUMP TO WBOOT.
;ELIMINATE THE $$$.SUB BY HOLDING THE RUBOUT/DEL KEY ON A TERMINAL
;UNTIL THERE A CONTINOUS PROMPT ON THE SCREEN.
;TO STOP WITHIN THIS PROGRAM, DELETE THE JUMP TO WBOOT AT EXIT.
;MUST ENTER WITH TEXT POINTER IN DE.
```

```
059D   ED 53 1155  MSGPR::  LD      (DISPTR),DE
05A1   0E 09                LD      C,PSTRING
05A3   CD 0005              CALL    BDOS            ;FOR TERMINAL
05A6   CD 0859              CALL    SHOW            ;FOR LCD
05A9   C9                   RET

05AA   11 132B     FULL::   LD      DE,DISKFUL      ;DISK DIRECTOR: FULL
05AD   CD 059D              CALL    MSGPR
05B0   06 03       YELL:    LD      B,3
05B2   21 1470              LD      HL,SDMSG
05B5   CD 02F5              CALL    AUXMTT
05B8   CD 0193              CALL    COMIN
05BB   11 0000              LD      DE,0
05BE   CD 0BC2              CALL    DELAY
05C1   0E 06                LD      C,DIRIO         ;TEST FOR CONSOLE KEY
05C3   1E FF                LD      E,0FFH
05C5   CD 0005              CALL    BDOS
05C8   FE 00                CP      0
05CA   28 E4                JR      Z,YELL          ;NO KEY
05CC   C3 0000              JP      WBOOT
```

```
;****** END OF DISK OPERATIONS.
$EJECT
            ;****** BEGINNING OF DMA OPS. ***
;CALLS TO LOAD THE DMA MODE REGISTERS OF 16 CHANNELS
05CF   0E 18       DMADRD::LD      C,DMA0+MODE
05D1   3E 48       MRR:    LD      A,0+DRD         ;MEMORY TO UART
05D3   06 04               LD      B,4
05D5   ED 79       WRR:    OUT     (C),A
05D7   3C                  INC     A
05D8   10 FB               DJNZ    WRR
05DA   79                  LD      A,C
05DB   FE 7B               CP      07BH            ;LAST ADDRESS
05DD   C8                  RET     Z
05DE   C6 20               ADD     A,20H           ;CARD OFFSET
05E0   4F                  LD      C,A
05E1   18 EE               JR      MRR             ;AROUND AGAIN

05E3   0E 18       DMADWR::LD      C,DMA0+MODE
05E5   3E 44       MRW:    LD      A,0+DWR         ;UART TO MEMORY
05E7   06 04               LD      B,4
```

```
05E9  ED 79           WRW:    OUT     (C),A
05EB  3C                      INC     A
05EC  10 FB                   DJNZ    WRW
05EE  79                      LD      A,C
05EF  FE 78                   CP      078H            ;LAST ADDRESS
05F1  C8                      RET     Z
05F2  C6 20                   ADD     A,20H           ;CARD OFFSET
05F4  4F                      LD      C,A
05F5  18 EE                   JR      WRW             ;AROUND AGAIN

;READ TCBUF(0-3) FOR EXISTING CARDS, TEST DMA STATUS REGISTERS
                      ;FOR INCOMING MESSAGES, IF MESSAGES WAITING, VALIDATE AND
                      ;RETURN ACKNOWLEDGEMENTS OR DISCARD IF IN ERROR.
05F7  D3 8E           STATUS::OUT     (MDMA+CMSK),A   ;CLEAR MASTER MASK BITS
05F9  06 04                   LD      B,4
05FB  21 1009                 LD      HL,TCBUF+3      ;GO DOWN TO USE B
05FE  3E 80           BITA::  LD      A,80H           ;CARD PRESENT, NO ACTIVITY
0600  96                      SUB     (HL)
0601  DA 0623                 JP      C,CALPTR        ;IF SOME ACTIVITY
0604  2B                      DEC     HL              ;NEXT TCBUF
0605  10 F7                   DJNZ    BITA
                      ;NOTHING ACTIVE IN A TCBUF, READ DMA STATUS REGISTERS
0607  06 04           INSTAT::LD      B,4             ;4 CARDS
0609  0E 18                   LD      C,DMA0+STAT
060B  21 1006                 LD      HL,TCBUF
060E  CB 7E           INSTA:: BIT     7,(HL)          ;CARD PRESENT ?
0610  28 07                   JR      Z,INSTB         ;NO
0612  ED 78           STATRD::IN      A,(C)
0614  E6 0F                   AND     0FH             ;DISCARD HI BITS
0616  F6 80                   OR      80H             ;SET CARD PRESENT BIT
0618  77                      LD      (HL),A          ;SAVE IN TCBUF
0619  23              INSTB:: INC     HL              ;NEXT TCBUF
061A  3E 20                   LD      A,DMA1-DMA0
061C  81                      ADD     A,C
061D  4F                      LD      C,A             ;NEXT CARD PORT
061E  10 EE                   DJNZ    INSTA
0620  C3 0149                 JP      GTOD            ;POLL DONE 0623  22 10F2         CALPTR::LD      (TCBFPTR),HL    ;SAVE TCBUF POINTER
0626  05                      DEC     B               ;ADJUSTMENT
0627  48                      LD      C,B             ;FORM 16 BIT ADDRESS
0628  06 00                   LD      B,0
062A  21 100A                 LD      HL,DMATBL
062D  09                      ADD     HL,BC           ;ADD OFFSET
062E  22 10F4                 LD      (DMAPT),HL      ;SAVE PTR
0631  CB 21                   SLA     C               ;X 2
0633  CB 21                   SLA     C               ;X 4
0635  21 100E                 LD      HL,UARTBL       ;BASE
0638  09                      ADD     HL,BC
0639  22 10F6                 LD      (UARPTR),HL     ;SAVE LINE ADDRESS, NOT CHANNEL YET
                      ;SEARCH FOR LOWEST ACTIVE BIT IN A TCBUF
063C  2A 10F2         TCBTST::LD      HL,(TCBFPTR)    ;GET POINTER
063F  7E                      LD      A,(HL)          ;GET TCBUF
0640  1E 00                   LD      E,0
0642  CB 47                   BIT     TC0,A           ;DMA CHANNEL 0?
0644  CB C3                   SET     TC0,E           ;E = 1
```

```
0646   20 1B                JR     NZ,RECP      ;IF SET, THEN ACTIVE BIT
0648   CB 83                RES    TC0,E        ;WAS NOT ACTIVE BIT,E = 0
064A   CB 4F                BIT    TC1,A
064C   CB CB                SET    TC1,E        ;E = 2
064E   20 13                JR     NZ,RECP
0650   CB 88                RES    TC1,E        ;E = 0
0652   CB 57                BIT    TC2,A
0654   CB D3                SET    TC2,E        ;E = 4
0656   20 0B                JR     NZ,RECP
0658   CB 93                RES    TC2,E        ;E = 0
065A   CB 5F                BIT    TC3,A
065C   CB DB                SET    TC3,E        ;E = 8
065E   20 03                JR     NZ,RECP
0660   C3 0149     WHEND::  JP     GTOD         ;NO ACTIVITY, GO AROUND AGAIN
0663   AB          RECP::   XOR    E            ;REMOVE CURRENT CHANNEL BIT
0664   77                   LD     (HL),A       ;SAVE LEFTOVER
0665   21 10EE              LD     HL,CHNTBL    ;TABLE BASE
0668   06 04                LD     B,4
066A   AF                   XOR    A
066B   7B                   LD     A,E
066C   0F          ROTA::   RRCA                ;LOOK FOR CHANNEL BIT
066D   38 03                JR     C,NROT
066F   23                   INC    HL
0670   10 FA                DJNZ   ROTA
0672   22 10F8     NROT::   LD     (CHNPTR),HL  ;SAVE CHANNEL #
0675   AF                   XOR    A
0676   01 10EE              LD     BC,CHNTBL
0679   ED 42                SBC    HL,BC        ;OFFSET TO ACTUAL CHANNEL NUMBER
067B   EB                   EX     DE,HL
067C   2A 10F6              LD     HL,(UARPTR)  ;LINE ADDRESS, ONLY
067F   19                   ADD    HL,DE        ;ADD CHANNEL NUMBER OFFSET
0680   22 10F6              LD     (UARPTR),HL  ;UART CHANNEL PORT ADDRESS POINTER
0683   2A 10F6     RECPR::  LD     HL,(UARPTR)
0686   11 10DE              LD     DE,UARTBL    ;TABLE BASE
0689   AF                   XOR    A
068A   ED 52                SBC    HL,DE        ;GET PORT OFFSET
068C   45                   LD     B,L          ;NUMBER 0-15, LOOP COUNTER
068D   21 1640              LD     HL,RCBF      ;BASE OF BUFFER
0690   28 06                JR     Z,RECLRC     ;0 NOT ALLOWED IN LOOP COUNTER
0692   11 0040              LD     DE,RNGLEN    ;RING INTERVAL
0695   19          SUM::    ADD    HL,DE
0696   10 FD                DJNZ   SUM

;CALCULATE THE RECEIVED MESSAGE LRC
0698   22 10FA     RECLRC:: LD     (RCBFPTR),HL ;SAVE MEMORY POINTER
069B   06 3E                LD     B,62
069D   AF                   XOR    A
069E   AE          RLR::    XOR    (HL)
069F   23                   INC    HL
06A0   10 FC                DJNZ   RLR
06A2   32 10C3              LD     (RLRC),A     ;STORE CALCULATED LRC
06A5   B7                   OR     A            ;PARITY ?
06A6   EA 06B0              JP     PE,PAREVN    ;IF EVEN, LEAVE AS IS
06A9   3E 01                LD     A,1
06AB   32 10C2              LD     (RLRCP),A    ;SET PARITY BIT
06AE   18 04                JR     PARCHK
```

```
06B0   AF              PAREVN: XOR    A              ;RESET PARITY BIT
06B1   32 10C2                 LD     (RLRCP),A
06B4   2A 10FA         PARCHK: LD     HL,(RCBFPTR)   ;ACTIVE RECEIVE BUFFER
06B7   11 003E                 LD     DE,62          ;ADD OFFSET TO LRC
06BA   19                      ADD    HL,DE
06BB   BE                      CP     (HL)           ;COMPARE TO MESSAGE PARITY BIT
06BC   28 02                   JR     Z,LRCCHK       ;PARITY BIT OK
06BE   18 07                   JR     RLRCNG         ;PARITY BIT WRONG
06C0   3A 10C3         LRCCHK: LD     A,(RLRC)       ;GET CALCULATED LRC
06C3   23                      INC    HL
06C4   BE                      CP     (HL)           ;COMPARE TO MESSAGE LRC
06C5   28 0C                   JR     Z,PREP         ;LRC OK
                               ;ARRIVE HERE IF LRC OR PARITY IS WRONG
06C7   CD 0700         RLRCNG::CALL   RECCHN
06CA   11 2710                 LD     DE,10000
06CD   CD 08C2                 CALL   DELAY
06D0   C3 05F7                 JP     STATUS         ;AROUND AGAIN

;INCOMING RING MESSAGE HAS BEEN RECEIVED AND ACCEPTED.
                        ;ADD THE TOD, PLACE IN RING BUFFER.
06D3   2A 10FA         PREP::  LD     HL,(RCBFPTR)   ;POINT TO MESSAGE
06D6   11 0004                 LD     DE,4           ;OFFSET TO YEAR10
06D9   19                      ADD    HL,DE
06DA   CD 072F                 CALL   SPRED          ;LOAD ASCII TOD

;CALCULATE NEW LRC AND PLACE IN MESSAGE IN 2 ASCII BYTES.
06DD   2A 10FA         BUFLRC::LD     HL,(RCBFPTR)   ;POINT TO MESSAGE
06E0   11 003E                 LD     DE,62          ;# OF BYTES IN SUM
06E3   CD 070C                 CALL   LRCALC

;SET UP ACKNOWLEDGE MESSAGE
06E6   21 10A8         ACCMSG::LD     HL,CRDACC      ;PARTIAL TEXT
06E9   11 1A40                 LD     DE,XMTBUF
06EC   01 0016                 LD     BC,16+6
06EF   ED B0                   LDIR
06F1   2A 10FA                 LD     HL,(RCBFPTR)   ;ADD EMPLOYEE NUMBER
06F4   01 0016                 LD     BC,16+6
06F7   09                      ADD    HL,BC
06F8   01 000A                 LD     BC,10
06FB   ED B0                   LDIR

06FD   CD 0752         SEND::  CALL   XMTCHN         ;SEND ACK MSG AND ENABLE RECEIVER
0700   CD 0352                 CALL   KEEP           ;TEST IF READY FOR DISK OPERATION
0703   C2 05F7                 JP     NZ,STATUS      ;NOT READY TO WRITE DISK
0706   CD 0371         CLDK::  CALL   DISKWR         ;DISK WRITE OPERATION
0709   C3 05F7         GN::    JP     STATUS

;CALCULATE LRC OF DATA STARTING AT (HL), WITH BYTE COUNT IN DE.
                        ;ASCII LRC IS PLACED IN THE 2 LOCATIONS FOLLOWING THE DATA.
070C   AF              LRCALC::XOR    A              ;START WITH 0
070D   AE              PUTE::  XOR    (HL)           ;FORM SUM
070E   23                      INC    HL             ;NEXT CHARACTER
070F   4F                      LD     C,A            ;SAVE SUM
0710   1B                      DEC    DE             ;BYTE COUNTER
0711   7A                      LD     A,D
0712   B3                      OR     E
```

```
0713  79             LD    A,C          ;GET SUM
0714  20 F7          JR    NZ,PUTE      ;IF NOT DONE
0716  1F             RRA
0717  1F             RRA
0718  1F             RRA
0719  1F             RRA                ;GET HIGH NIBBLE
071A  06 02          LD    B,2
071C  E6 0F    RLO:: AND   0FH          ;MASK TOP
071E  FE 0A          CP    10           ;> 9 ?
0720  FA 0727        JP    M,NUM        ;IF < 10
0723  C6 37          ADD   A,37H        ;ASCII OFFSET
0725  18 02          JR    BY
0727  F6 30    NUM:: OR    30H          ;MAKE ASCII NUMBER
0729  77       BY::  LD    (HL),A       ;STORE IT
072A  23             INC   HL
072B  79             LD    A,C          ;GET ORIGINAL DATA
072C  10 EE          DJNZ  RLO          ;DO TWICE
072E  C9             RET

;CONVERT THE PACKED BCD TOD/CAL STORED IN TODBUF TO ASCII.
                    ;DESTINATION OF ASCII IS (HL).
072F  06 03    SPRED::LD   B,3          ;COUNTER FOR YR, MON, AND DATE
0731  0E 02          LD    C,2          ;LOOP COUNTER
0733  11 106D        LD    DE,TODBUF    ;SOURCE
0736  1A       SPRD::LD    A,(DE)       ;GET DATA
0737  1F             RRA
0738  1F             RRA
0739  1F             RRA
073A  1F             RRA                ;GET HIGH NIBBLE
073B  E6 0F          AND   0FH          ;MASK TOP
073D  F6 30          OR    30H          ;ASCII IT
073F  77             LD    (HL),A       ;STORE
0740  23             INC   HL
0741  1A             LD    A,(DE)       ;GET DATA AGAIN
0742  E6 0F          AND   0FH
0744  F6 30          OR    30H
0746  77             LD    (HL),A
0747  23             INC   HL
0748  13             INC   DE           ;NEXT SOURCE BYTE
0749  10 EB          DJNZ  SPRD
074B  06 02          LD    B,2          ;COUNTER FOR HR AND MIN
074D  13             INC   DE           ;SKIP DAY-OF-WEEK
074E  0D             DEC   C            ;CHECK IF 2 PASSES DONE
074F  20 E5          JR    NZ,SPRD
0751  C9             RET

;TRANSMITTER ROUTINE FOR A SINGLE CHANNEL.
                    ;ASSUMES POINTERS HAVE BEEN SET-UP BEFORE CALL.
                    ;CLEAR MASTER MASK BITS
0752  D3 8E    XMTCHN::OUT (MDMA+CMSK),A ;CLEAR MASTER MASK BITS
                    ;WRITE DMA MODE FOR MEMORY TO UART TRANSFER
0754  2A 10F4        LD    HL,(DMAPT)   ;DMA PORT POINTER
0757  7E             LD    A,(HL)
0758  57             LD    D,A          ;SAVE DMA PORT
0759  C6 08          ADD   A,MODE
075B  4F             LD    C,A
```

```
075C  2A 10F8            LD      HL,(CHNPTR)     ;DMA CHANNEL #
075F  7E                 LD      A,(HL)
0760  5F                 LD      E,A             ;SAVE CHANNEL #
0761  C6 48              ADD     A,DRD
0763  ED 79              OUT     (C),A
                 ;CLEAR FIRST/LAST FLIP/FLOP
0765  3E 0C              LD      A,FLFF
0767  82                 ADD     A,D             ;DMA PORT
0768  4F                 LD      C,A
0769  ED 79              OUT     (C),A
                 ;WRITE BASE AND CURRENT MEMORY ADDRESS REGISTERS
076B  7B                 LD      A,E             ;CHANNEL #, 0,1,2,3
076C  87                 ADD     A,A             ;X 2 = 0,2,4,6
076D  82                 ADD     A,D             ;DMA PORT
076E  4F                 LD      C,A
076F  21 1A40            LD      HL,XMTBUF       ;DATA SOURCE
0772  ED 69              OUT     (C),L           ;A0 A7
0774  ED 61              OUT     (C),H           ;A8 A15
                 ;WRITE BASE AND CURRENT WORD COUNT REGISTERS
0776  0C                 INC     C               ;ODD # REGISTERS
0777  21 001F            LD      HL,31
077A  ED 69              OUT     (C),L
077C  ED 61              OUT     (C),H
                 ;ENABLE UART TRANSMITTER AND READY LINE
077E  DD 2A 10FA  ENTR0: LD      IX,(UARPTR)     ;UART PORT ADDRESS
0782  DD 4E 00           LD      C,(IX)
0785  06 04              LD      B,4             ;COMMAND CHARACTERS
0787  21 10FC            LD      HL,XMITON       ;COMMAND STRING
078A  7E          UON0:  LD      A,(HL)
078B  ED 79              OUT     (C),A
078D  23                 INC     HL
078E  10 FA              DJNZ    UON0
                 ;DISABLE DMA CONTROLLER
0790  3E 08              LD      A,CMD           ;FUNCTION
0792  82                 ADD     A,D             ;DMA PORT
0793  4F                 LD      C,A
0794  3E 44              LD      A,DMADIS        ;COMMAND
0796  ED 79              OUT     (C),A
                 ;CLEAR 4 CHANNEL MASK BITS
0798  3E 0E       CLRMK0:LD      A,CMSK          ;FUNCTION
079A  82                 ADD     A,D             ;DMA PORT
079B  4F                 LD      C,A
079C  ED 79              OUT     (C),A
079E  D3 BE              OUT     (MDMA+CMSK),A   ;CLEAR MASTER MASK BITS

07A0  EB                 EX      DE,HL
07A1  11 0700            LD      DE,2000         ;WAIT FOR CLOCK TO BE READY
07A4  CD 0BC2            CALL    DELAY
07A7  EB                 EX      DE,HL

;ENABLE DMA CONTROLLER
07A8  3E 08       DX1:   LD      A,CMD           ;FUNCTION
07AA  82                 ADD     A,D
07AB  4F                 LD      C,A
07AC  3E 40              LD      A,DMAEN         ;COMMAND
07AE  ED 79              OUT     (C),A
```

```
07B0   D3 BE              OUT    (MDMA+CMSK),A    ;CLEAR MASTER MASK BITS

07B2   EB                 EX     DE,HL
07B3   11 1B58            LD     DE,7000          ;ALLOW TIME FOR TRANSMISSION
07B6   CD 0BC2            CALL   DELAY
07B9   EB                 EX     DE,HL
07BA   D3 BE              OUT    (MDMA+CMSK),A    ;CLEAR MASTER MASK BITS

;DISABLE UART
07BC   DD 4E 00    UARTOF::LD    C,(IX)           ;UART PORT POINTER
07BF   06 04              LD     B,4
07C1   21 1100            LD     HL,XMITOF
07C4   7E          UOFF:  LD     A,(HL)
07C5   ED 79              OUT    (C),A
07C7   23                 INC    HL
07C8   10 FA              DJNZ   UOFF

;READ STATUS REGISTER TO CLEAR
07CA   3E 08              LD     A,STAT
07CC   82                 ADD    A,D
07CD   4F                 LD     C,A
07CE   ED 78              IN     A,(C)

;ENABLE THE CURRENT CHANNEL FOR RECEIVING
07D0                RECCHN::
                          ;WRITE DMA MODE
07D0   2A 10F4            LD     HL,(DMAPT)
07D3   7E                 LD     A,(HL)
07D4   57                 LD     D,A
07D5   C6 0B              ADD    A,MODE
07D7   4F                 LD     C,A
07D8   2A 10F8            LD     HL,(CHNPTR)
07DB   7E                 LD     A,(HL)
07DC   5F                 LD     E,A
07DD   C6 44              ADD    A,DWR            ;UART TO MEMORY TRANSFER
07DF   ED 79              OUT    (C),A
                          ;CLEAR F/L F/F
07E1   3E 0C              LD     A,FLFF
07E3   82                 ADD    A,D
07E4   4F                 LD     C,A
07E5   ED 79              OUT    (C),A
                          ;WRITE B & C ADDRESS REGISTERS
07E7   7B                 LD     A,E              ;CHANNEL #, 0,1,2,3
07E8   87                 ADD    A,A              ;X 2 = 0,2,4,6
07E9   82                 ADD    A,D              ;DMA PORT
07EA   4F                 LD     C,A
07EB   2A 10FA            LD     HL,(RCBFPTR)     ;DATA SOURCE
07EE   ED 69              OUT    (C),L            ;A0-A7
07F0   ED 61              OUT    (C),H            ;A8-A15
                          ;WRITE BASE AND CURRENT WORD COUNT REGISTERS
07F2   0C                 INC    C                ;ODD # REGISTERS
07F3   21 003F            LD     HL,RNGLEN-1
07F6   ED 69              OUT    (C),L
07F8   ED 61              OUT    (C),H
                          ;ENABLE UART RECEIVER AND READY LINE
07FA   DD 2A 10F6  ENTR1::LD     IX,(UARPTR)      ;UART PORT ADDRESS
```

```
07FE   DD 4E 00              LD      C,(IX)
0801   06 04                 LD      B,4              ;COMMAND CHARACTERS
0803   21 1104               LD      HL,RECVON        ;COMMAND STRING
0806   7E            UON1:   LD      A,(HL)
0807   ED 79                 OUT     (C),A
0809   23                    INC     HL
080A   10 FA                 DJNZ    UON1
                     ;DISABLE DMA CONTROLLER
080C   3E 08                 LD      A,CMD            ;FUNCTION
080E   82                    ADD     A,D              ;DMA PORT
080F   4F                    LD      C,A
0810   3E 44                 LD      A,DMADIS         ;COMMAND
0812   ED 79                 OUT     (C),A
                     ;CLEAR 4 CHANNEL MASK BITS
0814   3E 0E         CLRMK1: LD      A,CMSK           ;CLEARS ALL 4 BITS
0816   82                    ADD     A,D
0817   4F                    LD      C,A
0818   ED 79                 OUT     (C),A
                     ;ENABLE DMA CONTROLLER
081A   3E 08                 LD      A,CMD
081C   82                    ADD     A,D
081D   4F                    LD      C,A
081E   3E 40                 LD      A,DMAEN
0820   ED 79                 OUT     (C),A
0822   D3 8E                 OUT     (MDMA+CMSK),A    ;CLEAR MASTER MASK BITS
0824   C9            DMR::   RET

;RECEIVER ROUTINE FOR 16 CHANNELS: DMA "WRITE" MODE
0825   CD 05E3       RECVR:: CALL    DMADWR

;CLEAR FIRST/LAST FLIP/FLOPS
0828   D3 1C                 OUT     (DMA0+FLFF),A
082A   D3 3C                 OUT     (DMA1+FLFF),A
082C   D3 5C                 OUT     (DMA2+FLFF),A
082E   D3 7C                 OUT     (DMA3+FLFF),A
                     ;WRITE BASE AND CURRENT ADDRESS REGISTERS
0830   0E 10                 LD      C,DMA0+0         ;CHANNEL 0
0832   21 1640               LD      HL,RCBF
0835   11 0040               LD      DE,RNGLEN        ;INTERVAL
0838   06 04         WR2:    LD      B,4
083A   ED 69         WR3:    OUT     (C),L            ;A0-A7
083C   ED 61                 OUT     (C),H            ;A8-A15
083E   0C                    INC     C
083F   0C                    INC     C
0840   19                    ADD     HL,DE
0841   10 F7                 DJNZ    WR3
0843   79                    LD      A,C
0844   FE 78                 CP      78H              ;LAST PORT
0846   28 05                 JR      Z,WR4
0848   C6 18                 ADD     A,20H-8          ;NEXT CARD INTERVAL
084A   4F                    LD      C,A
084B   18 EB                 JR      WR2

;WRITE BASE AND CURRENT COUNT REGISTERS
084D   21 003F       WR4:    LD      HL,RNGLEN-1
0850   0E 11                 LD      C,DMA0+1
0852   CD 0A2D               CALL    DMAREG           ;16 CHANNELS
```

```
                        ;ENABLE RECEIVER FOR 16 CHANNELS
                                UARTWR  UARTBL,16,RECVON,4

;CLEAR CHANNEL MASKS
0870    D3 1E                   OUT     (DMA0+CMSK),A
0872    D3 3E                   OUT     (DMA1+CMSK),A
0874    D3 5E                   OUT     (DMA2+CMSK),A
0876    D3 7E                   OUT     (DMA3+CMSK),A
0878    D3 8E                   OUT     (MDMA+CMSK),A    ;CLEAR MASTER MASK BITS
                        ;ENABLE DMA CONTROLLERS
087A    3E 40                   LD      A,DMAEN
087C    D3 18                   OUT     (DMA0+CMD),A
087E    D3 38                   OUT     (DMA1+CMD),A
0880    D3 58                   OUT     (DMA2+CMD),A
0882    D3 78                   OUT     (DMA3+CMD),A
0884    C3 05F7                 JP      STATUS

;TRANSMITTER ROUTINE FOR TOD FOR 16 CHANNELS.
                        ;LOAD THE MESSAGE BUFFER WITH THE TIME DISPLAY TEXT.
                        ;TOGGLE THE TIME ':' EVERY SECOND.
0887    3A 1073         TIME::  LD      A,(LOCLSEC)      ;GET LATEST SECONDS
088A    CB 47                   BIT     0,A              ;SET/RESET Z FLAG
088C    28 05                   JR      Z,TIM1
088E    21 0F89                 LD      HL,TMSIGN2
0891    18 03                   JR      TIM2
0893    21 0F69         TIM1::  LD      HL,TMSIGN1
0896    11 1A40         TIM2::  LD      DE,XMTBUF
0899    01 0020                 LD      BC,32
089C    ED B0                   LDIR
089E    11 000B         TODEXP::LD      DE,11            ;LENGTH OF MONTH DISPLAY
08A1    21 0FA9                 LD      HL,MNTAB         ;TEXT TABLE
08A4    3A 106E                 LD      A,(TODBUF+1)     ;GET MONTH
08A7    4F                      LD      C,A
08A8    3E 01                   LD      A,1              ;CHECK FOR FIRST MONTH
08AA    B9              ARMON:  CP      C
08AB    28 05                   JR      Z,NVIT           ;THIS ONE
08AD    19                      ADD     HL,DE            ;NOT THIS ONE
08AE    3C                      INC     A
08AF    27                      DAA                      ;DECIMAL ONLY
08B0    18 F8                   JR      ARMON            ;LOOK SOME MORE

;HL CONTAINS ADDRESS OF MONTH TEXT
08B2    11 1A40         NVIT:   LD      DE,XMTBUF
08B5    01 000B                 LD      BC,11
08B8    ED B0                   LDIR

;CONVERT RTC DATE, HRS AND MINUTE TO ASCII AND STORE IN TRANSMIT BUFFER
08BA    21 106F         NOW::   LD      HL,TODBUF+2      ;DATE IN BCD
08BD    11 1A4B                 LD      DE,XMTBUF+11     ;POSITION ON DISPLAY
08C0    3E 20                   LD      A,20H            ;READY FOR SPACE
08C2    ED 6F                   RLD                      ;GET 10'S DIGIT
08C4    FE 20                   CP      20H              ;IS IT ZERO ?
08C6    28 02                   JR      Z,DTEN           ;YES
08C8    C6 10                   ADD     A,10H            ;NO, FIX TO ASCII
08CA    12              DTEN:   LD      (DE),A           ;STORE IT
08CB    13                      INC     DE               ;NEXT STORE
08CC    ED 6F                   RLD                      ;GET 1'S DIGIT
```

```
08CE  E6 0F              AND    0FH            ;MASK HI BITS
08D0  C6 30              ADD    A,30H          ;ASCII OFFSET
08D2  12                 LD     (DE),A
08D3  ED 6F              RLD
08D5  21 1A5D    HOURS:: LD     HL,XMTBUF+16+13 ;AM/PM POSITION
08D8  11 1A57            LD     DE,XMTBUF+16+7 ;HOURS POSITION
08DB  3A 1071            LD     A,(TODBUF+4)
08DE  FE 12              CP     12H
08E0  28 19              JR     Z,SETPM        ;HRS = 12 PM
08E2  38 09              JR     C,LT12         ;HRS < 12
08E4  D6 0C              SUB    12             ;HRS > 12, ADJUST
08E6  27                 DAA
08E7  27                 DAA
08E8  32 1071            LD     (TODBUF+4),A   ;PUT IN MEMORY FOR ASCII
08EB  18 0E              JR     SETPM
08ED  FE 00      LT12::  CP     0
08EF  20 05              JR     NZ,SETAM       ;HRS > 0, < 12
08F1  3E 12              LD     A,12H          ;HRS = 12 AM
08F3  32 1071            LD     (TODBUF+4),A   ;PUT MEMORY FOR ASCII
08F6  0E 41      SETAM:: LD     C,'A'          ;'A' FOR AM
08F8  71                 LD     (HL),C
08F9  18 03              JR     HRSASC
08FB  0E 50      SETPM:: LD     C,'P'          ;'P' FOR PM
08FD  71                 LD     (HL),C
08FE  21 1071    HRSASC::LD     HL,TODBUF+4
0901  3E 20              LD     A,20H          ;READY FOR SPACE
0903  ED 6F              RLD                   ;GET 10'S DIGIT
0905  FE 20              CP     20H            ;IS IT 0 ?
0907  28 02              JR     Z,HRTEN        ;YES
0909  C6 10              ADD    A,10H          ;NO, FIX TO ASCII
090B  12         HRTEN:: LD     (DE),A         ;STORE IT
090C  13                 INC    DE             ;NEXT STORE
090D  ED 6F              RLD                   ;GET 1'S DIGIT
090F  E6 0F              AND    0FH            ;MASK HI BITS
0911  C6 30              ADD    A,30H          ;ASCII OFFSET
0913  12                 LD     (DE),A
0914  ED 6F              RLD                   ;PUT IT BACK
0916  11 1A5A    MINS:   LD     DE,XMTBUF+16+10
0919  21 1072            LD     HL,TODBUF+5    ;GET MINUTES
091C  3E 30              LD     A,30H          ;ASCII OFFSET
091E  ED 6F              RLD                   ;GET 10'S DIGIT
0920  12                 LD     (DE),A
0921  13                 INC    DE
0922  ED 6F              RLD                   ;GET 1'S DIGIT
0924  12                 LD     (DE),A
0925  ED 6F              RLD                   ;PUT IT BACK

;SET UP PRINTER TIME BUFFER
0927  21 1A40            LD     HL,XMTBUF
092A  11 1112            LD     DE,CALBUF
092D  01 0020            LD     BC,32
0930  ED B0              LDIR
0932  3E 2C              LD     A,','
0934  32 111F            LD     (CALBUF+13),A

;TURN RECEIVERS AND DMA OFF
```

```
0937   CD 0A07              CALL   RCQUIT

;DMA "READ" MODE FOR 16 CHANNELS
093A   CD 05CF              CALL   DMADRD

;CLEAR FIRST/LAST FLIP/FLOP
093D   D3 1C                OUT    (DMA0+FLFF),A
093F   D3 3C                OUT    (DMA1+FLFF),A
0941   D3 5C                OUT    (DMA2+FLFF),A
0943   D3 7C                OUT    (DMA3+FLFF),A

;WRITE BASE AND CURRENT ADDRESS REGISTERS, 16 CHANNELS
0945   21 1A40              LD     HL,XMTBUF
0948   0E 10                LD     C,DMA0+0
094A   CD 0A20              CALL   DMAREG

;WRITE BASE AND CURRENT COUNT REGISTERS, 16 CHANNELS
094D   21 001F              LD     HL,32-1
0950   0E 11                LD     C,DMA0+1
0952   CD 0A20              CALL   DMAREG

;ENABLE TRANSMITTERS FOR 16 CHANNELS
         +           UARTWR UARTBL,16,XMITON,4

;CLEAR CHANNEL MASK FOR 16 CHANNELS
0970   D3 1E                OUT    (DMA0+CMSK),A
0972   D3 3E                OUT    (DMA1+CMSK),A
0974   D3 5E                OUT    (DMA2+CMSK),A
0976   D3 7E                OUT    (DMA3+CMSK),A
0978   D3 BE                OUT    (MDMA+CMSK),A    ;CLEAR MASTER MASK BITS
                     ;ENABLE DMA CONTROLLER
097A   3E 40                LD     A,DMAEN
097C   D3 18                OUT    (DMA0+CMD),A
097E   D3 38                OUT    (DMA1+CMD),A
0980   D3 58                OUT    (DMA2+CMD),A
0982   D3 78                OUT    (DMA3+CMD),A
0984   11 1770        DY::  LD     DE,6000           ;ALLOW 40 MSEC.
0987   CD 08C2              CALL   DELAY

;DISABLE 16 TRANSMITTERS
         +           UARTWR UARTBL,16,XMITOF,4

;DISABLE DMA ON 4 CARDS
09A5   3E 44                LD     A,DMADIS
09A7   D3 18                OUT    (DMA0+CMD),A
09A9   D3 38                OUT    (DMA1+CMD),A
09AB   D3 58                OUT    (DMA2+CMD),A
09AD   D3 78                OUT    (DMA3+CMD),A
                     ;CLEAR DMA STATUS REGISTER, TC'S ARE FROM TRANSMISSION,
09AF   DB 18                IN     A,(DMA0+STAT)
09B1   DB 38                IN     A,(DMA1+STAT)
09B3   DB 58                IN     A,(DMA2+STAT)
09B5   DB 78                IN     A,(DMA3+STAT)
                     ;PUT LATEST TIME AND CALENDAR ON THE LCD, UNLESS KEYPAD FLAG IS SET.
                     ;CHECK TIMER FOR DISPLAY HOLD. CHECK FOR DISK 3/4 FULL FLAG.
09B7   21 1462              LD     HL,FLAGS
```

```
09BA   CB 4E          BIT     PADKEY,(HL)
09BC   C0             RET     NZ
09BD   21 1159        LD      HL,DPHOLD       ;GET DISPLAY HOLD TIMER
09C0   AF             XOR     A
09C1   BE             CP      (HL)
09C2   28 02          JR      Z,DTST          ;DISPLAY CHANGE
09C4   35             DEC     (HL)            ;NO DISPLAY CHANGE, YET
09C5   C9             RET

;SECONDS HAVE CHANGED.
                      ;CHECK FOR DISK 3/4 FULL, SEND "sdz" IF YES.
09C6   3A 1073  DTST:: LD     A,(LOCLSEC)
09C9   CB 47          BIT     0,A
09CB   28 1B          JR      Z,DTOD
09CD   3A 11EC        LD      A,(WRTMAR+9)    ;100'S DIGIT
09D0   FE 30          CP      '0'             ;< 100 ?
09D2   28 14          JR      Z,DTOD          ;YES
09D4   3A 11ED        LD      A,(WRTMAR+10)   ;10'S DIGIT
09D7   FE 34          CP      '4'             ;< 140 ?
09D9   38 0D          JR      C,DTOD          ;YES
                      ;DISK DIRECTORY NOW 3/4 FULL
09DB   21 147D        LD      HL,SDMSG        ;POINTER TO "sdz"
09DE   06 03          LD      B,3             ;COUNTER
09E0   CD 02F5        CALL    AUXMTT          ;YELL DOWN THE PC COM LINE
09E3   21 134E        LD      HL,D34FL
09E6   18 1B          JR      DTODD
09E8   3E 2F    DTOD:: LD     A,'/'           ;SEPARATOR FOR YEAR
09EA   11 1A4D        LD      DE,XMTBUF+13
09ED   12             LD      (DE),A
09EE   21 106D        LD      HL,TODBUF       ;GET YEAR
09F1   13             INC     DE
09F2   3E 30          LD      A,30H           ;ASCII IT
09F4   ED 6F          RLD                     ;YEAR 10'S DIGIT
09F6   12             LD      (DE),A
09F7   13             INC     DE
09F8   ED 6F          RLD                     ;YEAR 1'S DIGIT
09FA   12             LD      (DE),A
09FB   ED 6F          RLD
09FD   21 1A40        LD      HL,XMTBUF
0A00   22 1155  DTODD:: LD    (DISPTR),HL
0A03   CD 0859        CALL    SHOW
0A06   C9             RET                     ;END OF TIME ;DISABLE RECEIVERS AND DMA
0A07           RCQUIT::UARTWR  UARTBL,16,RECVOF,4
0A22   3E 44          LD      A,DMADIS
0A24   D3 18          OUT     (DMA0+CMD),A
0A26   D3 38          OUT     (DMA1+CMD),A
0A28   D3 58          OUT     (DMA2+CMD),A
0A2A   D3 78          OUT     (DMA3+CMD),A
0A2C   C9             RET ;DMAREG LOADS 16 DMA CHANNELS WITH A SINGLE MEMORY ADDRESS
                      ;OR 16 WORD COUNT REGISTERS WITH A SINGLE NUMBER.
                      ;ENTER WITH HL = MEMORY ADDRESS OF DATA SOURCE OR WORD COUNT,
                      ;AND THE APPLICABLE PORT IN C.
```

```
0A2D    16 04           DMAREG::LD      D,4                     ;4 CARDS
0A2F    06 04           NXTCRD::LD      B,4                     ;4 CHANNELS PER CARD
0A31    ED 69           WRX::   OUT     (C),L                   ;LOW BYTE
0A33    ED 61                   OUT     (C),H                   ;HIGH BYTE
0A35    0C                      INC     C
0A36    0C                      INC     C
0A37    10 F8                   DJNZ    WRX
0A39    15                      DEC     D
0A3A    C8                      RET     Z                       ;EXIT IF DONE
0A3B    79                      LD      A,C                     ;LAST PORT
0A3C    C6 18                   ADD     A,20H-8                 ;CARD OFFSET
0A3E    4F                      LD      C,A
0A3F    18 EE                   JR      NXTCRD

;INITIALIZE 4 DMA CONTROLLERS IN SINGLE BYTE MODE.
0A41    3E 44           DMAINI::LD      A,DMADIS                ;MEMORY-MEMORY DISABLE, CONTROLLER DISABLE
                                                                ;NORMAL TIMING, FIXED PRIORITY,
                                                                ;LATE WRITE TIMING,
                                                                ;DREQ SENSE = LOW, DACK SENSE = LOW
0A43    D3 18                   OUT     (DMA0+CMD),A            ;CARD #1
0A45    D3 38                   OUT     (DMA1+CMD),A            ;2
0A47    D3 58                   OUT     (DMA2+CMD),A            ;3
0A49    D3 78                   OUT     (DMA3+CMD),A            ;4

;INITIALIZE THE MASTER DMA DEVICE IN CASCADE MODE.
0A4B    D3 BD           MSTDMA::OUT     (MDMA+0DH),A            ;CLEAR ALL
0A4D    06 04                   LD      B,4                     ;4 CHANNELS
0A4F    3E C0                   LD      A,0C0H                  ;CASCADE MODE, CHANNEL 0
0A51    D3 BB           LMDMA:: OUT     (MDMA+MODE),A
0A53    3C                      INC     A
0A54    10 FB                   DJNZ    LMDMA
0A56    3E 40                   LD      A,DMAEN                 ;ENABLE DMA
0A58    D3 B8                   OUT     (MDMA+CMD),A
0A5A    D3 BE                   OUT     (MDMA+CMSK),A           ;CLEAR MASK BITS

;TEST DMA WORD ADDRESS REGISTERS TO DETERMINE WHICH DMA CARDS
                        ;EXIST IN SYSTEM, STORE RESULT OF TEST IN TCBUF (4 REGISTERS).
0A5C    3E 20           DMATST::LD      A,' '
0A5E    11 142B                 LD      DE,CHANMSG+11           ;FILL CHANNEL MESSAGE
0A61    06 15                   LD      B,21
0A63    12              CLRCHN: LD      (DE),A
0A64    13                      INC     DE
0A65    10 FC                   DJNZ    CLRCHN
0A67    D3 1C                   OUT     (DMA0+FLFF),A           ;CLEAR FIRST/LAST F/F
0A69    D3 3C                   OUT     (DMA1+FLFF),A
0A6B    D3 5C                   OUT     (DMA2+FLFF),A
0A6D    D3 7C                   OUT     (DMA3+FLFF),A
                        ;WRITE AN ADDRESS TO THE CHANNEL 0 ADDRESS REGISTER OF EACH DMA DEVICE.
0A6F    21 C596         DMAWRT::LD      HL,TSTADR
0A72    0E 10                   LD      C,DMA0+0                ;1ST CARD
0A74    06 04                   LD      B,4                     ;4 CARDS
0A76    ED 69           DMWRT:: OUT     (C),L                   ;LOW BYTE
0A78    ED 61                   OUT     (C),H                   ;HIGH BYTE
0A7A    3E 20                   LD      A,CRD1-CRD0             ;CARD INTERVAL
0A7C    81                      ADD     A,C                     ;NEXT CARD PORT
0A7D    4F                      LD      C,A                     ;SAVE IT
0A7E    10 F6                   DJNZ    DMWRT
```

```
                            ;READ THE SAME ADDRESS REGISTER, COMPARE TO THE WRITTEN ADDRESS,
                            ;SET BIT 7 IN THE TCBUF IF A MATCH.
0A80  0E 10        DMREAD::LD    C,DMA0+0           ;1ST CARD
0A82  06 04                LD    B,4                ;4 CARDS
0A84  ED 58        DMRD::  IN    E,(C)              ;LOW BYTE
0A86  ED 50                IN    D,(C)              ;HIGH BYTE
0A88  D5                   PUSH  DE                 ;SAVE READ IN STACK
0A89  3E 20                LD    A,CRD1-CRD0
0A8B  81                   ADD   A,C
0A8C  4F                   LD    C,A
0A8D  10 F5                DJNZ  DMRD               ;LAST CARD IS 4TH
0A8F  06 04                LD    B,4
0A91  DD 21 1009           LD    IX,TCBUF+3         ;BASE BUFFER, CARD 3
0A95  21 C596      NXTCAR::LD    HL,TSTADR
0A98  D1                   POP   DE                 ;GET CARD RESULT,
0A99  AF                   XOR   A                  ;START WITH 4TH CARD.
0A9A  DD 77 00             LD    (IX),A             ;CLEAR THE TCBUF
0A9D  ED 52                SBC   HL,DE              ;SHOULD BE SAME DATA
0A9F  20 04                JR    NZ,AGO             ;NOT SAME, CARD NOT PRESENT
0AA1  DD CB 00 FE          SET   7,(IX)             ;DMA CARD IS PRESENT,SET MARKER
0AA5  DD 2B        AGO::   DEC   IX                 ;NEXT TCBUF, DOWNWARD
0AA7  10 EC                DJNZ  NXTCAR
0AA9  AF                   XOR   A
0AAA  06 04                LD    B,4
0AAC  21 1006              LD    HL,TCBUF
0AAF  B6           ORTC::  OR    (HL)               ;LOOK FOR TCBUF MARKER
0AB0  23                   INC   HL                 ;NEXT TCBUF
0AB1  10 FC                DJNZ  ORTC
0AB3  20 09                JR    NZ,CARD1           ;CARD(S) ARE PRESENT
0AB5  11 13FD              LD    DE,NODMA           ;NO CARDS IN SYSTEM,EXIT
0AB8  CD 059D              CALL  MSGPR
0ABB  C3 0000              JP    WBOOT              ;CAN NOT OPERATE

;SEND CHANNELS AVAILABLE MESSAGE TO CONSOLE AND LCD.
0ABE  DD 21 1006   CARD1:  LD    IX,TCBUF
0AC2  DD CB 00 7E          BIT   7,(IX)
0AC6  28 08                JR    Z,CARD2
0AC8  21 1443              LD    HL,M14
0ACB  11 142B              LD    DE,CHANMSG+11
0ACE  01 0005              LD    BC,5
0AD1  ED B0                LDIR
0AD3  DD 23        CARD2:  INC   IX
0AD5  DD CB 00 7E          BIT   7,(IX)
0AD9  28 08                JR    Z,CARD3
0ADB  21 1448              LD    HL,M58
0ADE  11 1430              LD    DE,CHANMSG+16
0AE1  01 0004              LD    BC,4
0AE4  ED B0                LDIR
0AE6  DD 23        CARD3:  INC   IX
0AE8  DD CB 00 7E          BIT   7,(IX)
0AEC  28 08                JR    Z,CARD4
0AEE  21 144C              LD    HL,M912
0AF1  11 1435              LD    DE,CHANMSG+21
0AF4  01 0005              LD    BC,5
0AF7  ED B0                LDIR
0AF9  DD 23        CARD4:  INC   IX
```

```
0AF8   DD CB 00 7E              BIT     7,(IX)
0AFF   28 0B                    JR      Z,DISCRD
0B01   21 1451                  LD      HL,M1316
0B04   11 143B                  LD      DE,CHANMSG+27
0B07   01 0005                  LD      BC,5
0B0A   ED B0                    LDIR
0B0C   11 1420          DISCRD: LD      DE,CHANMSG
0B0F   CD 059D                  CALL    MSGPR
0B12   11 0000                  LD      DE,0            ;DISPLAY TIME
0B15   CD 0BC2                  CALL    DELAY
0B18   CD 0BC2                  CALL    DELAY
0B1B   CD 0BC2                  CALL    DELAY
                        ;LOAD THE DMA MODE REGISTERS OF 16 CHANNELS
0B1E   CD 05CF          DDMA:   CALL    DMADRD
0B21   C9                       RET

;INITIALIZE THE DMA UARTS (DARTS), 2 PER CARD, 4 CARDS.
                        ;INITIALIZE THE AUXILIARY CARD UART (DART).
0B22                  + UINIT:: UARTWR  UARTBL,16,SIOBYT,SIOLEN
                      +         UARTWR  DRTCTA,1,AUXDRT,AUXLEN
0B58   C9                       RET

; ***   END OF DMA OPERATIONS
                        $EJECT
                        ;LCDISPLAY DRIVER AND SUBROUTINES. SHOW IS THE LCD DISPLAY DRIVER.
0B59   2A 1155          SHOW::  LD      HL,(DISPTR)     ;DATA POINTER
0B5C   11 1132                  LD      DE,DISBUF
0B5F   01 0020                  LD      BC,32
0B62   ED B0                    LDIR                    ;FILL BUFFER
0B64   0E 02                    LD      C,DISPHM        ;CLEAR THE DISPLAY
0B66   CD 0B94                  CALL    DISPCMD
0B69   11 0140                  LD      DE,US25*4*2     ;2 MSEC. DELAY
0B6C   CD 0BC2                  CALL    DELAY
0B6F   21 1132                  LD      HL,DISBUF       ;DATA POINTER
0B72   16 02                    LD      D,2             ;LINE COUNTER
0B74   1E 10            NULIN:: LD      E,16            ;CHARACTERS/LINE
0B76   06 02            NXTCHR::LD      B,2             ;2 NIBBLES/CHARACTER
0B78   3E 10                    LD      A,10H           ;DATA WRITE, ENABLE LOW
0B7A   ED 6F            ROT::   RLD                     ;GET LO NIBBLE
0B7C   CD 0BAA                  CALL    DPULSE          ;PULSE THE STROBE
0B7F   10 F9                    DJNZ    ROT             ;GO AROUND FOR SECOND NIBBLE
0B81   ED 6F                    RLD                     ;RESTORE MEMORY
0B83   23                       INC     HL              ;NEXT CHARACTERS
0B84   1D                       DEC     E
0B85   28 02                    JR      Z,LIN           ;THIS LINE DONE ?
0B87   18 ED                    JR      NXTCHR          ;LINE NOT DONE
0B89   15               LIN::   DEC     D               ;LINE COUNTER
0B8A   C8                       RET     Z
0B8B   0E C0                    LD      C,0C0H          ;SEND CURSOR TO SECOND LINE
0B8D   D5                       PUSH    DE
0B8E   CD 0B94                  CALL    DISPCMD
0B91   D1                       POP     DE
0B92   18 E0                    JR      NULIN

;DISPCMD SENDS COMMANDS TO THE LCD DISPLAY. COMMAND WORD MUST
                        ;BE IN C BEFORE THE CALL.
```

```
0894   06 02         DISPCMD:LD    B,2            ;2 NIBBLES
0896   79                    LD    A,C
0897   0F                    RRCA
0898   0F                    RRCA
0899   0F                    RRCA
089A   0F                    RRCA
089B   E6 0F         DSTB::  AND   0FH            ;MASK HI BITS
089D   CD 0BAA               CALL  DPULSE
08A0   79                    LD    A,C
08A1   10 F8                 DJNZ  DSTB
08A3   11 0028               LD    DE,US25
08A6   CD 0BC2               CALL  DELAY
08A9   C9                    RET

;DPULSE GENERATES LCD STROBES
08AA   D3 90         DPULSE::OUT   (DISP),A
08AC   CB F7                 SET   6,A
08AE   D3 90                 OUT   (DISP),A
08B0   CB B7                 RES   6,A
08B2   D3 90                 OUT   (DISP),A
08B4   C9                    RET
                     ;DISSPC CLEARS THE DISPLAY
08B5   3E 20         DISSPC::LD    A,20H          ;INITIALIZE THE DISPLAY BUFFER
08B7   21 1132               LD    HL,DISBUF
08BA   01 0020               LD    BC,32
08BD   77            FLSP::  LD    (HL),A
08BE   23                    INC   HL
08BF   10 FC                 DJNZ  FLSP
08C1   C9                    RET
                     ;END OF DISPLAY DRIVER SUBROUTINES.

;GENERIC TIME DELAY, DE CONTAINS PARAMETER
08C2   1B            DELAY:: DEC   DE
08C3   7A                    LD    A,D
08C4   B3                    OR    E
08C5   20 FB                 JR    NZ,DELAY
08C7   C9                    RET

;INITIALIZE THE AUXILIARY CARD PIO FOR DISPLAY AND KEYBOARD
08C8   3E 0F         DINIT:: LD    A,0FH          ;PIO PORT A =OUTPUT MODE
08CA   D3 92                 OUT   (PIO+CTL+CHNA),A
08CC   3E CF                 LD    A,0CFH         ;PIO PORT B = CONTROL MODE
08CE   D3 93                 OUT   (PIO+CTL+CHNB),A ;FOR KEYBOARD
08D0   3E F0                 LD    A,0F0H         ;B0-B3 IS OUTPUT,B4-B7 IS INPUT
08D2   D3 93                 OUT   (PIO+CTL+CHNB),A
                     ;INITIALIZE THE LCD DEVICE
08D4   11 0C80       LCD::   LD    DE,US25*4*20   ;20 MSEC. DELAY
08D7   CD 0BC2               CALL  DELAY
08DA   06 03                 LD    B,3            ;NIBBLE WRITE IS 3,3,3,2
08DC   3E 03         HIT3::  LD    A,3
08DE   CD 0BAA               CALL  DPULSE
08E1   11 0640               LD    DE,US25*4*10   ;10 MSEC. DELAY
08E4   CD 0BC2               CALL  DELAY
08E7   10 F3                 DJNZ  HIT3
08E9   3E 02                 LD    A,2
08EB   CD 0BAA               CALL  DPULSE
```

```
0BEE    11 0640                 LD      DE,US25*4*10        ;10 MSEC. DELAY
0BF1    CD 0BC2                 CALL    DELAY
0BF4    0E 0C                   LD      C,DISPON            ;DISPLAY AND CURSOR ON
0BF6    CD 0894                 CALL    DISPCMD
0BF9    0E 06                   LD      C,6                 ;ENTRY MODE
0BFB    CD 0894                 CALL    DISPCMD
0BFE    0E 01                   LD      C,DISPCLR           ;CLEAR DISPLAY
0C00    CD 0894                 CALL    DISPCMD
0C03    11 0640                 LD      DE,US25*4*10        ;10 MSEC.DELAY
0C06    CD 0BC2                 CALL    DELAY
0C09    C9                      RET

;CHECK FOR KEYPAD ACTIVITY
                        ;CHECK IF THE CONTROL KEYPAD KEY FLAG IS ON
0C0A    21 1462         KYLP::  LD      HL,FLAGS
0C0D    CB 4E                   BIT     PADKEY,(HL)
0C0F    20 0E                   JR      NZ,WHKEY            ;FLAG IS ALREADY ON
0C11    3E FE                   LD      A,0FEH              ;FLAG NOT ON, LOOK FOR ST KEY
0C13    D3 91                   OUT     (KYBD),A
0C15    DB 91                   IN      A,(KYBD)            ;GET KEYS
0C17    FE 7E                   CP      7EH                 ;ST KEY ?
0C19    C0                      RET     NZ                  ;ST KEY IS NOT ON

;START PAUSE TIMER AND SET KEYPAD FLAG
0C1A    21 1462         NXTKEY::LD      HL,FLAGS
0C1D    CB CE                   SET     PADKEY,(HL)
                        ;IDENTIFY SPECIFIC KEY
0C1F    21 0C53         WHKEY:: LD      HL,KYTABL
0C22    0E FE                   LD      C,0FEH              ;SAVE ROW PATTERN
0C24    79              PAT1::  LD      A,C
0C25    06 04                   LD      B,4                 ;COLUMN COUNTER
0C27    D3 91                   OUT     (KYBD),A
0C29    DB 91                   IN      A,(KYBD)            ;GET KEY
0C2B    17              PAT2::  RLA                         ;ROTATE THROUGH CARRY
0C2C    30 0F                   JR      NC,FOUND            ;GOT KEY
0C2E    23                      INC     HL                  ;NOT THIS KEY
0C2F    23                      INC     HL
0C30    23                      INC     HL
0C31    10 F8                   DJNZ    PAT2                ;TEST NEXT COLUMN
0C33    CB 59                   BIT     3,C                 ;TEST FOR LAST ROW
0C35    CA 0DBB                 JP      Z,TSTMR             ;WAS LAST ROW, KEY NOT FOUND
0C38    37                      SCF
0C39    CB 11                   RL      C                   ;NEW ROW PATTERN
0C3B    18 E7                   JR      PAT1

0C3D    11 0700         FOUND:: LD      DE,2000             ;START TIMER AGAIN
0C40    ED 53 1157              LD      (PASTMR),DE
0C44    E5                      PUSH    HL                  ;SAVE KEY JUMP ADDRESS
0C45    2A 10A6                 LD      HL,(CURPTR)         ;TEST NUMBER OF SHIFTS
0C48    11 1151                 LD      DE,DISBUF+16+15     ;LAST POSITION
0C4B    AF                      XOR     A
0C4C    ED 52                   SBC     HL,DE
0C4E    CA 0D01                 JP      Z,ENTER             ;LOAD NEW TOD
0C51    E1                      POP     HL                  ;GO TO KEY PROCESSING
0C52    E9                      JP      (HL)
```

```
0C53  C3 0CE5    KYTABL::JP   KYST         ;KEYPAD SCANNING ORDER
0C56  C3 0CC9            JP   KY3          ;DESIGNATIONS SUBJECT TO CHANGE
0C59  C3 0CC5            JP   KY2
0C5C  C3 0CC1            JP   KY1          ;KEYPAD ARRANGEMENT:
0C5F  C3 0C9D            JP   KYR          ;   1  2  3  ST
0C62  C3 0CD5            JP   KY6          ;   4  5  6  -
0C65  C3 0CD1            JP   KY5          ;   7  8  9  -
0C68  C3 0CCD            JP   KY4          ;      0     RST
0C6B  C3 0C9D            JP   KYR
0C6E  C3 0CE1            JP   KY9
0C71  C3 0CDD            JP   KY8
0C74  C3 0CD9            JP   KY7
0C77  C3 0C9D            JP   KYR
0C7A  C3 0C9D            JP   KYR
0C7D  C3 0CBD            JP   KY0
0C80  C3 0C9D            JP   KYR

0C83  2A 10A6    KPREX:: LD   HL,(CURPTR)  ;GET CURRENT CURSOR POINTER
0C86  77                 LD   (HL),A       ;PUT KEY CHARACTER IN DISBUF
0C87  21 1132            LD   HL,DISBUF
0C8A  22 1155            LD   (DISPTR),HL
0C8D  CD 0859            CALL SHOW
0C90  2A 10A6    DONA::  LD   HL,(CURPTR)  ;GET CURSOR POINTER
0C93  23                 INC  HL           ;READY FOR NEXT CHARACTER
0C94  22 10A6            LD   (CURPTR),HL
0C97  11 1147            LD   DE,DISBUF+16+5 ;INITIAL CURSOR POSITION
0C9A  2A 10A6            LD   HL,(CURPTR)  ;CURRENT DISPLAY POSITION
0C9D  AF                 XOR  A
0C9E  ED 52              SBC  HL,DE        ;HL-DE-0
0CA0  7D                 LD   A,L          ;L IS NUMBER OF SHIFTS
0CA1  C6 C5              ADD  A,80H OR 40H+5 ;NEW CURSOR ADDRESS
0CA3  4F                 LD   C,A          ;SEND LCD PROPER CURSOR ADDRESS
0CA4  CD 0894            CALL DISPCMD
0CA7  AF         KEYOFF::XOR  A            ;TEST FOR KEY STILL ON
0CA8  D3 91              OUT  (KYBD),A
0CAA  DB 91              IN   A,(KYBD)
0CAC  FE F0              CP   0F0H
0CAE  20 F7              JR   NZ,KEYOFF    ;STILL ON
0CB0  11 0140            LD   DE,US25*4*2  ;2 MSEC. DELAY
0CB3  CD 0BC2            CALL DELAY
0CB6  DB 91              IN   A,(KYBD)
0CB8  FE F0              CP   0F0H
0CBA  20 EB              JR   NZ,KEYOFF    ;STILL ON
0CBC  C9                 RET               ;NOW OFF

;KPR IS A MACRO TO FORM AN ASCII CHARACTER FOR THE DISPLAY
                  ;FROM THE KEY COLUMN AND ROW INTERSECTION.
               +   KPR   MACRO W
               +         LD   A,W          ;FORM ASCII
               +         JR   KPREX
               +         ENDM
0CBD           +   KY0:  KPR  '0'
0CC1           +   KY1:  KPR  '1'
0CC5           +   KY2:  KPR  '2'
0CC9           +   KY3:  KPR  '3'
0CCD           +   KY4:  KPR  '4'
```

```
0CD1                +    KY5:    KPR     '5'
0CD5                +    KY6:    KPR     '6'
0CD9                +    KY7:    KPR     '7'
0CDD                +    KY8:    KPR     '8'
0CE1                +    KY9:    KPR     '9'

;PUT TIME AND CALENDAR SETTING TEXT ON LCD.
0CE5    21 1040         KYST:   LD      HL,SETTM        ;DISPLAY TEXT
0CE8    22 1155                 LD      (DISPTR),HL
0CEB    CD 0859                 CALL    SHOW
0CEE    0E 0F                   LD      C,CURSOR        ;BLINKING CURSOR
0CF0    CD 0894                 CALL    DISPCMD
0CF3    0E C5                   LD      C,80H OR 40H+5  ;CURSOR AT 22ND CHARACTER
0CF5    CD 0894                 CALL    DISPCMD
0CF8    21 1147                 LD      HL,DISBUF+16+5  ;POINT TO FIRST CHARACTER
0CFB    22 10A6                 LD      (CURPTR),HL
0CFE    C3 0CA7                 JP      KEYOFF

;IF CURSOR POINTER HAS SHIFTED FAR ENOUGH, ANY KEY WILL CAUSE
                         ;ENTRY OF NEW TOD DATA.
0D01    E1              ENTER:: POP     HL              ;ADJUST STACK POINTER
0D02    1E 02                   LD      E,2             ;2 PASSES AROUND THIS LOOP
0D04    FD 21 1060              LD      IY,TODBUF       ;DATA DESTINATION
0D08    06 03                   LD      B,3             ;YEAR, MONTH AND DATE ON 1ST PASS
0D0A    21 1147                 LD      HL,DISBUF+16+5  ;KEYBOARD DATA STORED HERE
0D0D    AF              PACK::  XOR     A
0D0E    ED 67                   RRD                     ;GET NIBBLE FROM MEMORY
0D10    07                      RLCA
0D11    07                      RLCA
0D12    07                      RLCA
0D13    07                      RLCA
0D14    4F                      LD      C,A             ;SAVE HI NIBBLE
0D15    23                      INC     HL
0D16    AF                      XOR     A
0D17    ED 67                   RRD                     ;GET LO NIBBLE
0D19    B1                      OR      C               ;COMBINE NIBBLES
0D1A    FD 77 00                LD      (IY),A          ;STORE PACKED BCD
0D1D    FD 23                   INC     IY
0D1F    23                      INC     HL
0D20    10 EB                   DJNZ    PACK
0D22    1D                      DEC     E               ;DONE ?
0D23    28 0B                   JR      Z,TODCHK
0D25    FD 36 00 01             LD      (IY),1          ;LOAD ANY NUMBER IN DAY OF WEEK
0D29    06 02                   LD      B,2             ;HOUR AND MINUTE ON 2ND PASS
0D2B    FD 23                   INC     IY
0D2D    C3 0D0D                 JP      PACK

;MAKE SURE NEW TOD/CALENDAR DATA IS LEGAL.
0D30    21 106E         TODCHK::LD     HL,TODBUF+1     ;POINT TO MONTH
0D33    3E 12                   LD      A,12H
0D35    BE                      CP      (HL)
0D36    38 76                   JR      C,ENTERR        ; 12 = BAD ENTRY
0D38    AF                      XOR     A               ;0 NOT LEGAL
0D39    BE                      CP      (HL)
0D3A    28 72                   JR      Z,ENTERR
```

```
003C  3A 106E            LD    A,(TODBUF+1)    ;GET MONTH ENTRY
003F  FE 02              CP    2               ;FEBRUARY ?
0041  20 16              JR    NZ,NFEBB        ;NOT FEBRUARY 0043  3A 106F    FEBR:   LD    A,(TODBUF+2)    ;GET CURRENT DATE
0046  FE 29              CP    29H
0048  20 0F              JR    NZ,NFEBB        ;NOT FEB. 29
004A  3A 106D            LD    A,(TODBUF)      ;IS FEB. 29, GET CURRENT YEAR
004D  21 1075            LD    HL,YTABL        ;LEAP YEAR ?
0050  01 0019            LD    BC,25
0053  ED B1              CPIR
0055  20 57              JR    NZ,ENTERR       ;NOT LEAP YEAR, 29 DAYS ILLEGAL
0057  18 18              JR    HHR 0059  3A 106E    NFEBB:  LD    A,(TODBUF+1)    ;GET CURRENT MONTH
005C  21 108E            LD    HL,DTABL        ;MONTH AND DAYS LIST
005F  01 0018            LD    BC,24
0062  ED B1              CPIR                  ;SEARCH FOR NUMBER OF DAYS, THIS MONTH
0064  3A 106F            LD    A,(TODBUF+2)    ;GET CURRENT DATE
0067  47                 LD    B,A
0068  7E                 LD    A,(HL)
0069  B8                 CP    B               ;TABLE VALUE IS MAX. ALLOWED
006A  38 42              JR    C,ENTERR        ;IF TOO LARGE
006C  78                 LD    A,B
006D  FE 00              CP    0               ;0 NOT ALLOWED
006F  28 3D              JR    Z,ENTERR 0071  21 1071    HHR:    LD    HL,TODBUF+4     ;POINT TO HOUR
0074  3E 23              LD    A,23H           ;MAX. HOUR
0076  BE                 CP    (HL)
0077  38 35              JR    C,ENTERR        ;> 23 = BAD ENTRY
0079  23                 INC   HL              ;POINT TO MINUTE
007A  3E 59              LD    A,59H
007C  BE                 CP    (HL)
007D  38 2F              JR    C,ENTERR        ;> 59 = BAD ENTRY

;WRITE NEW TOD AND CALENDAR INTO RTC. CHECK IF LEAP YEAR FIRST.
007F  3A 106D    RTCWR:: LD    A,(TODBUF)      ;GET YEAR
0082  01 0019            LD    BC,25           ;TABLE LENGTH
0085  21 1075            LD    HL,YTABL        ;POINT TO TABLE
0088  ED B1              CPIR                  ;SEARCH FOR YEAR, SET Z FLAG IF FOUND
008A  21 106F            LD    HL,TODBUF+2     ;POINT TO DATE BYTE
008D  CB B6              RES   6,(HL)          ;NOT LEAP YEAR
008F  20 02              JR    NZ,NTLPYR       ;NOT FOUND, NOT LEAP YEAR
                ;CURRENT YEAR IS IN LEAP YEAR TABLE.
0091  CB F6              SET   6,(HL)          ;TO AGREE WITH RTC SPECIFICATIONS
0093  11 106D    NTLPYR: LD    DE,TODBUF
0096  06 02              LD    B,SETTOD        ;EXT BDOS TIME SETTING FUNCTION
0098  0E FF              LD    C,0FFH          ;EXT BDOS
009A  CD 0005            CALL  BDOS
009D  21 1462    KIRI:   LD    HL,FLAGS
00A0  CB BE              RES   PADKEY,(HL)
00A2  21 1152            LD    HL,DISBUF+32    ;CURSOR OUT OF SIGHT
00A5  22 10A6            LD    (CURPTR),HL
00A8  0E 0C              LD    C,DISPON
00AA  CD 0894            CALL  DISPCMD
```

```
0DAD   C9                       RET                    ;TIME SETTING EXIT

;NEW TOD/CALENDAR DATA IS ILLEGAL, SEND MESSAGE AND KEEP OLD TOD/CAL.
0DAE   11 1213         ENTERR::LD    DE,ERRSIN
0DB1   CD 0590                 CALL  MSGPR
0DB4   3E 04                   LD    A,4
0DB6   32 1159                 LD    (OPHOLD),A
0DB9   18 E2                   JR    KYR

0DBB   ED 5B 1157     TSTMR:: LD    DE,(PASTMR)    ;TEST TIMER
0DBF   1B                     DEC   DE
0DC0   7A                     LD    A,D
0DC1   B3                     OR    E
0DC2   ED 53 1157             LD    (PASTMR),DE
0DC6   C0                     RET   NZ             ;NO KEY,NO TIME OUT
                      ;TIMER DONE, RESET KEY PAD FLAG
0DC7   21 1462                LD    HL,FLAGS
0DCA   CB 8E                  RES   PADKEY,(HL)
0DCC   C9                     RET
                      ;THIS IS A UTILITY SELECTED BY A SERVICE SWITCH BIT, NOT NORMALLY USED.
                      ;PRINT PROCESSES THE DATA IN A RECEIVER BUFFER FOR PRINTING ON
                      ;BROTHER M-1509 AND MANNESMANN-TALLY 180L PRINTERS, ON 8.5 x 11 IN.
                      ;PAPER, AND INCLUDES COMMANDS FOR COMPRESSED PRINTING.
                      ;TEMPORARY STORAGE IS IN PTBF. A SPACE CHARACTER IN THE ACTUAL DATA
                      ;IS REPLACED WITH A '_', 5FH. EACH RING OR SUFFIX COVERS A LINE.
                      ;HEADING CONTAINS THE TIME OF PRINTING.

;FILL PRINT BUFFER WITH SPACES.
0DCD   21 2260        PRINT:: LD    HL,RDBF        ;SET FIRST ADDRESS
0DD0   22 11E1                LD    (PRNPTR),HL
                      ;PRINTER COMMANDS,FILENAME AND TOD.
0DD3   06 05                  LD    B,PTBF-PRTCMD  ;PRINTER FORMAT COMMANDS
0DD5   21 115A                LD    HL,PRTCMD
0DD8   CD 0EB6                CALL  PRNT
0DDB   06 04                  LD    B,4
0DDD   21 110D                LD    HL,SPCS
0DE0   CD 0EB6                CALL  PRNT
0DE3   06 0B                  LD    B,11           ;PRINT FILE NAME
0DE5   21 0050                LD    HL,FCB+1
0DE8   CD 0EB6                CALL  PRNT
0DEB   06 05                  LD    B,5            ;INSERT A COMMA AND SPACES
0DED   21 110C                LD    HL,COMMA
0DF0   CD 0EB6                CALL  PRNT
0DF3   06 20                  LD    B,32           ;PRINT TOD DISPLAY
0DF5   21 1112                LD    HL,CALBUF      ;ONLY TIME/DATE IN THIS
0DF8   CD 0EB6                CALL  PRNT
0DFB   06 02         CRLFX2::LD    B,2            ;CARRIAGE AND LINE FEED
0DFD   21 1108                LD    HL,CRLF
0E00   CD 0EB6                CALL  PRNT

;PREPARE THE PRINT BUFFER
0E03   3E 20         FIXRP:: LD    A,' '          ;FILL PRINT BUFFER WITH SPACES
0E05   06 79                  LD    B,CRLF-PTBF    ;LENGTH OF PRINT STRING
0E07   11 115F                LD    DE,PTBF
0E0A   12            FILL::  LD    (DE),A
0E0B   13                    INC   DE
```

```
0E0C   10 FC                DJNZ   FILL
                     ;PROCESS BYTE 0, CHECK FOR SUFFIX RING FIRST
0E0E   2A 11E1       CHAR0:: LD    HL,(PRNPTR)   ;DATA SOURCE POINTER
0E11   3E 1A                LD     A,EOF
0E13   BE                   CP     (HL)
0E14   CA 0E5D              JP     Z,FIXSUF      ;IF SUFFIX RING
0E17   11 115F              LD     DE,PTBF       ;DESTINATION
0E1A   3E 20                LD     A,' '
0E1C   BE                   CP     (HL)          ;CHECK CHARACTER 0
0E1D   28 03                JR     Z,C0          ;IS A SPACE
0E1F   7E                   LD     A,(HL)        ;NOT A SPACE, USE EXISTING CHARACTER
0E20   18 02                JR     C0LD
0E22   3E 5F         C0::   LD     A,'_'         ;SIMULATE A SPACE WITH SFH
0E24   12            C0LD:: LD     (DE),A
0E25   23                   INC    HL
0E26   13                   INC    DE
0E27   13                   INC    DE
0E28   06 03                LD     B,3
0E2A   7E            STALD:: LD    A,(HL)        ;STORE THE STATION #
0E2B   12                   LD     (DE),A
0E2C   23                   INC    HL
0E2D   13                   INC    DE
0E2E   10 FA                DJNZ   STALD
0E30   13                   INC    DE
0E31   0E 05                LD     C,5
0E33   06 02         BRLD:: LD     B,2
0E35   7E            TODLD:: LD    A,(HL)        ;STORE THE TOD, TWICE
0E36   12                   LD     (DE),A
0E37   23                   INC    HL
0E38   13                   INC    DE
0E39   10 FA                DJNZ   TODLD
0E3B   13                   INC    DE
0E3C   0D                   DEC    C             ;GROUP COUNTER
0E3D   20 F4                JR     NZ,BRLD
0E3F   06 30         FLDLD:: LD    B,48          ;CHARACTER COUNT OF FUNCTION FIELDS
0E41   3E 20         CRN::  LD     A,' '         ;TEST FOR SPACE
0E43   BE                   CP     (HL)
0E44   28 03                JR     Z,NCHR
0E46   7E                   LD     A,(HL)        ;NOT SPACE, USE CHARACTER
0E47   18 02                JR     CHRSPC
0E49   3E 5F         NCHR:: LD     A,'_'         ;SIMULATE A SPACE
0E4B   12            CHRSPC::LD    (DE),A
0E4C   23                   INC    HL
0E4D   13                   INC    DE
0E4E   13                   INC    DE
0E4F   10 F0                DJNZ   CRN

0E51   7E            CRLK:: LD     A,(HL)        ;GET 2 BYTES OF LRC
0E52   12                   LD     (DE),A
0E53   23                   INC    HL
0E54   13                   INC    DE
0E55   7E                   LD     A,(HL)
0E56   12                   LD     (DE),A
0E57   CD 0EA7              CALL   STOP1         ;TO PRINTER
0E5A   C3 0E03              JP     FIXRP
```

```
                        ;PROCESS THE SUFFIX RING INTO THE PRINTER BUFFER
0E50    11 115F     FIXSUF:: LD    DE,PTBF
0E60    06 02               LD    B,2
0E62    3E 31       LD1A::  LD    A,'1'           ;STORE '1A' TWICE
0E64    12                  LD    (DE),A
0E65    13                  INC   DE
0E66    3E 41               LD    A,'A'
0E68    12                  LD    (DE),A
0E69    13                  INC   DE
0E6A    13                  INC   DE
0E6B    10 F5               DJNZ  LD1A

0E6D    2A 11E1             LD    HL,(PRNPTR)     ;GET POINTER
0E70    01 0002             LD    BC,2            ;OFFSET TO YR10
0E73    09                  ADD   HL,BC
0E74    0E 0A               LD    C,10            ;CHARACTERS IN TOD
0E76    06 02       BBRLD:: LD    B,2             ;2 CHARACTER GROUPS
0E78    7E          TDLD::  LD    A,(HL)
0E79    12                  LD    (DE),A
0E7A    23                  INC   HL
0E7B    13                  INC   DE
0E7C    10 FA               DJNZ  TDLD
0E7E    13                  INC   DE
0E7F    0D                  DEC   C
0E80    20 F4               JR    NZ,BBRLD
0E82    0E 02               LD    C,2             ;2 CHARACTER GROUPS
0E84    06 03       BFNLD:: LD    B,3
0E86    7E          FNLD::  LD    A,(HL)          ;STORE FILE NUMBER AND RING COUNT
0E87    12                  LD    (DE),A
0E88    23                  INC   HL
0E89    13                  INC   DE
0E8A    10 FA               DJNZ  FNLD
0E8C    13                  INC   DE
0E8D    0D                  DEC   C
0E8E    20 F4               JR    NZ,BFNLD
0E90    7E          STLD::  LD    A,(HL)          ;STORE STATION #
0E91    12                  LD    (DE),A
0E92    23                  INC   HL
0E93    13                  INC   DE
0E94    13                  INC   DE
0E95    7E                  LD    A,(HL)          ;STORE LRC, 2 BYTES
0E96    12                  LD    (DE),A
0E97    23                  INC   HL
0E98    13                  INC   DE
0E99    7E                  LD    A,(HL)
0E9A    12                  LD    (DE),A
0E9B    CD 0EA7             CALL  STOP1
0E9E    DB A0               IN    A,(AUXBB)       ;READ STATION SWITCH
0EA0    CB 4F               BIT   1,A             ;USE TO PREVENT FORM FEED
0EA2    C8                  RET   Z
0EA3    CD 0EC5             CALL  FORMFD
0EA6    C9                  RET

;PRINTER DRIVER, SELECT STOP1 OR PRNT.
                        ;STOP1 PRINTS THE RING AT PTBF.
0EA7    2A 11E1     STOP1:: LD    HL,(PRNPTR)
```

```
0EAA  11 0040              LD    DE,64           ;BUMP TO NEXT RING
0EAD  19                   ADD   HL,DE
0EAE  22 11E1              LD    (PRNPTR),HL
0EB1  06 7B                LD    B,CRLF-PTBF+2   ;LENGTH OF PRINTER STRING
0EB3  21 115F              LD    HL,PTBF         ;DATA AND COMMANDS
                           ;ENTER AT PRNT WITH STRING LENGTH IN B, DATA AT (HL).
0EB6  0E 05         PRNT:: LD    C,LIST          ;BDOS PRINT COMMAND
0EB8  7E            PRNT0::LD    A,(HL)
0EB9  23                   INC   HL
0EBA  E5                   PUSH  HL
0EBB  C5                   PUSH  BC
0EBC  5F                   LD    E,A
0EBD  CD 0005              CALL  BDOS
0EC0  C1                   POP   BC
0EC1  E1                   POP   HL
0EC2  10 F4                DJNZ  PRNT0
0EC4  C9                   RET
0EC5  1E 0C         FRMFD::LD    E,0CH           ;FORM FEED
0EC7  0E 05                LD    C,LIST
0EC9  CD 0005              CALL  BDOS
0ECC  C9                   RET

;GENERATE A RINGFILE TABLE FROM A COPY OF THE DIRECTORY TRACK (2)
                           ;ON THE DISK.
0ECD  01 0000       DIREC::LD    BC,0
0ED0  ED 43 1463           LD    (SECTOR),BC     ;INITIAL SECTOR
0ED4  21 2260              LD    HL,RDBF         ;DISK READ DESTINATION,MAY EXCEED
                                                 ;SIZE ALLOCATED IN OS DECLARATION
0ED7  22 145F              LD    (DMAPTR),HL
0EDA  0E 02                LD    C,2             ;SET TRACK = 2, PHYSICAL
0EDC  CD F21E              CALL  SETTRK

0EDF  ED 4B 1463    SSEC:: LD    BC,(SECTOR)     ;SET SECTOR
0EE3  CD F221              CALL  SETSEC
0EE6  ED 4B 145F           LD    BC,(DMAPTR)     ;SET DATA POINTER
0EEA  CD F224              CALL  STBDMA
0EED  CD F227              CALL  BIREAD
0EF0  21 1463              LD    HL,SECTOR       ;GET CURRENT SECTOR
0EF3  34                   INC   (HL)
0EF4  7E                   LD    A,(HL)
0EF5  FE 30                CP    DIRSZE          ;IF = 48, DIRECTORY COPY COMPLETE
0EF7  CA 0F06              JP    Z,BLDTBL
0EFA  11 0080              LD    DE,128          ;SECTOR SIZE
0EFD  2A 145F              LD    HL,(DMAPTR)     ;GET LAST MEMORY POINTER
0F00  19                   ADD   HL,DE
0F01  22 145F              LD    (DMAPTR),HL     ;NEXT DESTINATION
0F04  18 D9                JR    SSEC

;BUILD THE FILENAME TABLE FROM THE DISK DIRECTORY TRACK
0F06  3E C0         BLDTBL::LD   A,192           ;# OF POSSIBLE DIRECTORY ENTRIES
0F08  32 1468              LD    (DIRCTR),A
                           ;CLEAR RINGFILE TABLE AREA
0F0B  1E 00                LD    E,INACT         ;TABLE MARKER FOR INACTIVE FILES
0F0D  21 1490              LD    HL,FNTBL
0F10  01 01A0              LD    BC,FNTBND-FNTBL
0F13  73            CLRBF::LD    (HL),E
```

```
0F14   23              INC    HL
0F15   0B              DEC    BC
0F16   78              LD     A,B
0F17   81              OR     C
0F18   20 F9           JR     NZ,CLDRBF
                ;INITIALIZE TABLE AND DIRECTORY COPY POINTERS
0F1A   21 1490         LD     HL,FNTBL
0F1D   22 1467         LD     (TBLPTR),HL
0F20   21 2260         LD     HL,RDBF
0F23   22 1466         LD     (DIRPTR),HL       ;1ST BYTE OF DIRECTORY COPY
                ;TEST FIRST BYTE TO SEE IF FILE IS ACTIVE. ONLY 00H IS 'ACTIVE'.
0F26   AF      TSTACT::XOR    A                 ;TEST FOR ACTIVE FILE
0F27   BE              CP     (HL)
0F28   C2 0F3C         JP     NZ,NXTBLK         ;NOT ACTIVE, KEEP LOOKING
                ;FILE IS ACTIVE, CHECK FOR A NUMBER IN EXTENSION
0F2B   11 0009 THISFL::LD     DE,EXT            ;OFFSET TO MSD OF EXTENSION
0F2E   19              ADD    HL,DE
0F2F   7E              LD     A,(HL)
0F30   E6 F0           AND    0F0H              ;MASK BOTTOM
0F32   FE 30           CP     30H               ;ASCII NUMBER ?
0F34   20 06           JR     NZ,NXTBLK         ;NO, CONTINUE THROUGH LOOKING
0F36   CD 0F51         CALL   EXTCNV
0F39   3E FF           LD     A,ACTIVE          ;SET FILENAME REFERENCE TO "ACTIVE"
0F3B   77              LD     (HL),A            ;(HL) = FNTBL ADDRESS
0F3C   3A 1468 NXTBLK::LD     A,(DIRCTR)        ;KEEP GOING ?
0F3F   3D              DEC    A
0F40   32 1468         LD     (DIRCTR),A
0F43   C8              RET    Z                 ;ALL DIRECTORY BLOCKS DONE
0F44   11 0020         LD     DE,32             ;NEXT LOCATION OFFSET
0F47   2A 1466         LD     HL,(DIRPTR)       ;GET CURRENT LOCATION
0F4A   19              ADD    HL,DE
0F4B   22 1466         LD     (DIRPTR),HL       ;SAVE NEXT
0F4E   C3 0F26         JP     TSTACT                              ;TSTES

;CONVERT FILENAME EXTENSION INTO TABLE ADDRESS
                ;ENTER WITH HL POINTING TO DIRECTORY COPY BUFFER, EXTENSION BYTE 0.
                ;EXIT WITH HL = FNTBL ADDRESS FOR SPECIFIC RINGFILE.
0F51   7E      EXTCNV::LD     A,(HL)            ;GET MSD OF EXTENSION
0F52   E6 0F           AND    0FH               ;UN-ASCII
0F54   57              LD     D,A
0F55   23              INC    HL
0F56   7E              LD     A,(HL)            ;GET 10'S DIGIT
0F57   07              RLCA
0F58   07              RLCA
0F59   07              RLCA
0F5A   07              RLCA
0F5B   E6 F0           AND    0F0H
0F5D   5F              LD     E,A
0F5E   23              INC    HL                ;GET 1'S DIGIT
0F5F   7E              LD     A,(HL)
0F60   E6 0F           AND    0FH               ;UN-ASCII
0F62   B3              OR     E                 ;COMBINE 10'S AND 1'S DIGITS
0F63   5F              LD     E,A
0F64   21 1490         LD     HL,FNTBL          ;GET BASE ADDRESS
```

```
0F67    19                          ADD     HL,DE
0F68    C9                          RET

;END OF INSTRUCTION CODE
                                    $EJECT
                                    ;MESSAGES, TEXT DEFINITIONS, AND MEMORY STORAGE LOCATIONS

0F69    20 20 20 20     TMSIGN1:DB  '                '
0F6D    20 20 20 20
0F71    20 20 20 20
0F75    20 20 20 20
0F79    20 54 49 4D             DB  ' TIME   :    M '
0F7D    45 20 20 20
0F81    20 3A 20 20
0F85    20 20 4D 20
0F89    20 20 20 20     TMSIGN2:DB  '                '
0F8D    20 20 20 20
0F91    20 20 20 20
0F95    20 20 20 20
0F99    20 54 49 4D             DB  ' TIME        M '
0F9D    45 20 20 20
0FA1    20 20 20 20
0FA5    20 20 4D 20
0FA9    20 20 4A 41     MNTAB:  DB  '  JANUARY  '          ;11 CHARACTERS EACH
0FAD    4E 55 41 52
0FB1    59 20 20
0FB4    20 46 45 42             DB  ' FEBRUARY  '
0FB8    52 55 41 52
0FBC    59 20 20
0FBF    20 20 20 4D             DB  '   MARCH   '
0FC3    41 52 43 48
0FC7    20 20 20
0FCA    20 20 20 41             DB  '   APRIL   '
0FCE    50 52 49 4C
0FD2    20 20 20
0FD5    20 20 20 20             DB  '    MAY    '
0FD9    20 4D 41 59
0FDD    20 20 20
0FE0    20 20 20 20             DB  '   JUNE    '
0FE4    4A 55 4E 45
0FE8    20 20 20
0FEB    20 20 20 20             DB  '   JULY    '
0FEF    4A 55 4C 59
0FF3    20 20 20
0FF6    20 20 20 41             DB  '  AUGUST   '
0FFA    55 47 55 53
0FFE    54 20 20
1001    20 53 45 50             DB  ' SEPTEMBER '
1005    54 45 4D 42
1009    45 52 20
100C    20 20 4F 43             DB  '  OCTOBER  '
1010    54 4F 42 45
1014    52 20 20
1017    20 4E 4F 56             DB  ' NOVEMBER  '
101B    45 4D 42 45
101F    52 20 20
```

```
1022  20 44 45 43           DB      ' DECEMBER '
1026  45 4D 42 45
102A  52 20 20

102D              STKEND: DS      2*16            ;NOMINAL STACK LENGTH
1040              STACK:

;SETTM IS THE TOD AND CALENDAR SETTING DISPLAY TEXT
1040  53 45 54 2D SETTM:: DB      'SET-/YrMoDyHrMn '      ;TOD SETTING TEXT
1051  3E 59 72 4D
1055  6F 44 79 48
1059  72 4D 6E 20
105D  20 20 20 20         DB      '             *'
1061  20 20 20 20
1065  20 20 20 20
1069  20 20 20 2A

;TODBUF FORMAT IS AS FOLLOWS:
                  ;TODBUF +   0    1    2    3    4    5
                  ;          YR  MON DATE DAY   HR  MIN
106D              TODBUF::DS      6
1073              LOCLSEC:DS      1               ;LATEST SECONDS READING
1074              PREVSEC:DS      1               ;PREVIOUS SECONDS READING

;TABLE OF YEARS THAT ARE LEAP.
1075  00 04 08 12 YTABL:  DB      0,4,8,12H,16H,20H,24H,28H,32H,36H,40H
1079  16 20 24 28
107D  32 36 40
1080  44 48 52 56         DB      44H,48H,52H,56H,60H,64H,68H,72H,76H,80H
1084  60 64 68 72
1088  76 80
108A  84 88 92 96         DB      84H,88H,92H,96H
                  ;TABLE OF MONTHS AND NUMBER OF DAYS.
108E  01 31 02 28 DTABL:  DB      1,31H,2,28H,3,31H,4,30H,5,31H,6,30H
1092  03 31 04 30
1096  05 31 06 30
109A  07 31 08 31         DB      7,31H,8,31H,9,30H,10H,31H,11H,30H,21H,31H
109E  09 30 10 31
10A2  11 30 21 31

10A6              CURPTR::DS      2               ;LCD CURSOR POINTER
                  ;0FEH IS THE MARKER TO INDICATE AN ACCEPTABLE MESSAGE
10A8  FE 43 41 52 CRDACC: DB      0FEH,'CARD ACCEPTED '
10AC  44 20 41 43
10B0  43 45 50 54
10B4  45 44 20 20
10B8  42 41 44 47         DB      'BADGE#'
10BC  45 23
10BE  0D 0A 07 24         DB      CR,LF,7,'$'     ;FOR BDOS STRING COMMAND
10C2              RLRCP:  DS      1               ;CALCULATED LRC PARITY BIT
10C3              RLRC:   DS      1               ;CALCULATED RECEIVE LRC

;INITIALIZE STRING FOR DMA CARDS.
10C4  18          SIOBYT: DB      CHNRST          ;CHANNEL RESET
10C5  04 47               DB      4,47H           ;WRITE REG 4, 1X MODE, 1 STOP BIT
                                                  ;EVEN PARITY ENABLED.
10C7  03 C0               DB      3,RXD10         ;WRITE REG 3, 8 BITS, RECEIVER OFF
```

```
10C7   05 E0                    DB      5,TXDIS         ;WRITE REG 5, 8 BITS, XMITR OFF,DTR+ - RECV
10CB   01 00                    DB      1,NOREADY       ;WRITE REG 1, INTERRUPTS DISABLED.
                                                        ;BOTH READY PINS DISABLED
0009              SIOLEN EQU    $-SIOBYT

;INITIALIZE STRING FOR AUXILIARY DART AND INFORMER TERMINAL.
10CD   18         AUXDRT::DB    CHNRST          ;CHANNEL RESET
10CE   04 44             DB     4,44H           ;WRITE REG 4, 16X MODE, 1 STOP BIT,
                                                ;NO PARITY
10D0   03 C1             DB     3,RXEN          ;WRITE REG 3, 8 BITS, RECEIVER ENABLED
10D2   05 E0             DB     5,TXDIS         ;WRITE REG 5, 8 BITS, XMITR OFF
10D4   01 00             DB     1,NOREADY       ;WRITE REG 1, INTERRUPTS DISABLED,
0009              AUXLEN EQU    $-AUXDRT        ;BOTH READIES DISABLED

;TABLES AND POINTERS FOR DMA AND RINGBUFFER CONTROL.
10D6              TCBUF:: DS    4,0             ;DMA TERMINAL COUNT REGISTER BUFFERS
10DA   10 30 50 70 DMATBL::DB   CRD0+DMA,CRD1+DMA,CRD2+DMA,CRD3+DMA   ;DMA BASE PORTS

;SEQUENCE OF UART PORT ADDRESSES FOR 16 CHANNELS
10DE   02 03 06 07 UARTBL::DB   2,3,6,7,22H,23H,26H,27H,42H,43H,46H,47H,62H,63H,66H,67H
10E2   22 23 26 27
10E6   42 43 46 47
10EA   62 63 66 67

10EE   00 01 02 03 CHNTBL::DB   0,1,2,3         ;DMA CHANNEL NUMBERS
10F2              TCBFPTR::DS   2               ;CARD TCBUF IN USE
10F4              DMAPT:: DS    2               ;DMA TABLE POINTER
10F6              UARPTR::DS    2               ;UART PORT TABLE POINTER
10F8              CHNPTR::DS    2               ;DMA CHANNEL POINTER
10FA              RCBFPTR:DS    2               ;RECEIVER BUFFER POINTER

;UART COMMAND STRINGS
10FC   05 68 01 C0 XMITON::DB   5,TXEN,1,TREADY         ;TRANSMITTER AND READY, ON
1100   05 E0 01 00 XMITOF::DB   5,TXDIS,1,NOREADY       ;SAME, OFF
1104   03 C1 01 E0 RECVON::DB   3,RXEN,1,RREADY         ;RECEIVER AND READY, ON
1108   03 C0 01 00 RECVOF::DB   3,RXDIS,1,NOREADY       ;SAME, OFF
110C              PORTCTR:DS    1
110D   82         DRTCTA::DB    DRT+CHNA+CTL    ;AUX CARD DART

110E              PORPTR::DS    2               ;POINTS TO PORT NUMBER IN TABLE
1110              RECCTR::DS    2               ;RECEIVER LOOP COUNTER
1112              CALBUF::DS    32              ;PRINTER TIME BUFFER
1132              DISBUF::DS    32              ;DISPLAY DATA SOURCE
1152   0A 0D 24   BDOSTP::DB    LF,CR,'$'       ;BDOS CONSOLE STRING STOPPER
1155              DISPTR::DS    2               ;DISPLAY DATA POINTER
1157              PASTMR::DS    2               ;KEYPAD WAITING TIMER COUNTER
1159              DPHOLD::DS    1               ;DISPLAY HOLD TIMER COUNTER

;PRINTER COMMAND STRING: COMPRESSED PRINT
115A   1B 58 36 77 PRTCMD::DB   ESC,'X6w'       ;FOR MANNESMANN-TALLY 180
115E   0F                DB     15              ;FOR BROTHER M-1509
115F              PTBF::  DS    121
11D8   0D 0A 0D 0A CRLF:: DB    CR,LF,CR,LF
11DC   2C         COMMA:: DB    ','             ;A COMMA
11DD   20 20 20 20 SPCS:: DB    '    '          ;4 SPACES
11E1              PRNPTR::DS    2               ;PRINT ROUTINE RING POINTER

;TEXT AND SPACE FOR MANIPULATION OF THE FCB, INITIAL NUMBER SHOWN.
                  ;ALWAYS DRIVE 0.
```

```
11E3    00 52 49 4E         WRTNAM::DB      0,'RINGFILE000',0,0,0,0
11E7    47 46 49 4C
11EB    45 30 30 30
11EF    00 00 00 00
11F3    00 52 49 4E         RDNAM:: DB      0,'RINGFILE000',0,0,0,0
11F7    47 46 49 4C
11FB    45 30 30 30
11FF    00 00 00 00
1203    00 52 49 4E         ERSNAM: DB      0,'RINGFILE???',0,0,0,0         ;FOR ERASING ALL FILES
1207    47 46 49 4C
120B    45 3F 3F 3F
120F    00 00 00 00

;TEXT MESSAGES TO BE USED ON THE LCD ARE 32 CHARACTERS LONG.
                            ;CR,LF AND '$' ARE NEEDED FOR CONSOLE.
1213    20 20 20 20         ERRSIN::DB      '   ILLEGAL     '
1217    49 4C 4C 45
121B    47 41 4C 20
121F    20 20 20 20
1223    20 54 49 4D                 DB      ' TIME AND DATE! ',CR,LF,'$'
1227    45 20 41 4E
122B    44 20 44 41
122F    54 45 21 20
1233    0D 0A 24
1236    20 57 52 49         WRITPRB:DB      ' WRITE PROBLEM '
123A    54 45 20 50
123E    52 4F 42 4C
1242    45 4D 20 20
1246    20 20 43 41                 DB      ' CAUSED STOP! ',CR,LF,'$'
124A    55 53 45 44
124E    20 53 54 4F
1252    50 21 20 20
1256    0D 0A 24
1259    20 20 46 49         CLOSPRB:DB      ' FILE CLOSING '
125D    4C 45 20 43
1261    4C 4F 53 49
1265    4E 47 20 20
1269    20 20 50 52                 DB      ' PROBLEM!      ',CR,LF,'$'
126D    4F 42 4C 45
1271    4D 21 20 20
1275    20 20 20 20
1279    0D 0A 24
127C    20 43 4F 4E         CONSTP: DB      ' CONSOLE OUTPUT '
1280    53 4F 4C 45
1284    20 4F 55 54
1288    50 55 54 20
128C    20 20 43 41                 DB      ' CAUSED STOP! ',CR,LF,'$'
1290    55 53 45 44
1294    20 53 54 4F
1298    50 21 20 20
129C    0D 0A 24
129F    20 20 46 49         NOFILE: DB      ' FILE MISSING! '
12A3    4C 45 20 4D
12A7    49 53 53 49
12AB    4E 47 21 20
12AF                                DS      16,20H
```

```
128F   00 0A 24                    DB     CR,LF,'$'
12C2   20 20 20 44    READPR::DB   '   DISK  READ  '
12C6   49 53 48 20
12CA   20 52 45 41
12CE   44 20 20 20
12D2   20 20 20 20                 DB     '  PROBLEM!  ',CR,LF,'$'
12D6   50 52 4F 42
12DA   4C 45 4D 21
12DE   20 20 20 20
12E2   0D 0A 24
12E5   20 20 52 45    SUFPRB::DB   '  READ PROBLEM '
12E9   41 44 20 50
12ED   52 4F 42 4C
12F1   45 4D 20 20
12F5   20 20 53 55                 DB     '  SUFFIX ERROR ',CR,LF,'$'
12F9   46 46 49 58
12FD   20 45 52 52
1301   4F 52 20 20
1305   0D 0A 24
1308   46 49 4C 45    FILDR: DB    'FILE WRITTEN WAS'
130C   20 57 52 49
1310   54 54 45 4E
1314   20 57 41 53
1318                              DS     16,' '
1328   0D 0A 24                   DB     CR,LF,'$'
132B   20 20 44 49    DISKFUL:DB   '  DISK IS FULL '
132F   53 4B 20 49
1333   53 20 46 55
1337   4C 4C 20 20
133B   43 41 4C 4C                DB     'CALL SUPERVISOR ',CR,LF,'$'
133F   20 53 55 50
1343   45 52 56 49
1347   53 4F 52 20
134B   0D 0A 24
134E   20 44 49 53    D34FL::DB   ' DISK 3/4 FULL '
1352   4B 20 33 2F
1356   34 20 46 55
135A   4C 4C 20 20
135E   43 41 4C 4C                DB     'CALL SUPERVISOR ',CR,LF,'$'
1362   20 53 55 50
1366   45 52 56 49
136A   53 4F 52 20
136E   0D 0A 24
1371   20 22 53 45    FINISH::DB  ' "SERVICE" on, '
1375   52 56 49 43
1379   45 22 20 6F
137D   6E 2C 20 20
1381   20 46 69 6E                DB     ' Finishing Disk ',CR,LF,'$'
1385   69 73 68 69
1389   6E 67 20 44
138D   69 73 68 20
1391   0D 0A 24
1394   20 20 52 65    REPDSK::DB  '  Replace Disk, '
1398   70 6C 61 63
139C   65 20 44 69
13A0   73 6B 2C 20
```

```
13A4  20 53 77 69            DB      ' Switch to "RUN"',CR,LF,'$'
13A8  74 63 68 20
13AC  74 6F 20 22
13B0  52 55 4E 22
13B4  0D 0A 24
13B7  20 4C 4F 41   SYSTRT::DB      ' LOADING SYSTEM '
13BB  44 49 4E 47
13BF  20 53 59 53
13C3  54 45 4D 20
13C7  20 20 50 6C            DB      ' Please Wait! ',CR,LF,'$'
13CB  65 61 73 65
13CF  20 57 61 69
13D3  74 21 20 20
13D7  0D 0A 24
13DA  20 45 52 41   ERSMSG: DB      ' ERASING FILES '
13DE  53 49 4E 47
13E2  20 46 49 4C
13E6  45 53 20 20
13EA  20 20 50 6C            DB      ' Please Wait! ',CR,LF,'$'
13EE  65 61 73 65
13F2  20 57 61 69
13F6  74 21 20 20
13FA  0D 0A 24
13FD  20 2A 20 57   NODMA:: DB      ' * WARNING * '
1401  41 52 4E 49
1405  4E 47 20 2A
1409  20 20 20 20
140D  20 4E 4F 20            DB      ' NO DMA CARDS! ',CR,LF,'$'
1411  44 4D 41 20
1415  43 41 52 44
1419  53 21 20 20
141D  0D 0A 24
1420  43 48 41 4E   CHANMSG:DB      'CHANNELS:'
1424  4E 45 4C 53
1428  3A 20 20 20
142C  20 20 20 20
1430                        DS      16,' '
1440  0D 0A 24              DB      CR,LF,'$'
1443  31 2D 34 2C   M14:    DB      '1-4, '
1447  20
1448  35 2D 38 2C   M58:    DB      '5-8, '
144C  39 2D 31 32   M912:   DB      '9-12,'
1450  2C
1451  31 33 2D 31   M1316:  DB      '13-16'
1455  36

;DISK ITEMS STORED HERE.
145C                RNGCTR::DS      7        ;RING COUNTER AND BUFFER
145D                RNGPTR::DS      2        ;NEXT LOCATION IN DISK WRITE BUFFER
145F                DMAPTR::DS      2        ;NEXT DISK MEMORY ADDRESS
1461                RDCTR:: DS      1        ;DISK READ REPEAT COUNTER
1462                FLAGS:: DS      1        ;CONSOLE KEYBOARD AND KEYPAD FLAGS

;DISK DIRECTORY AND FILENAME TABLE BUFFERS
1463                SECTOR::DS      2        ;CURRENT SECTOR NUMBER
1465                BLKCTR::DS      1        ;DIRECTORY COPY BLOCK COUNTER
```

```
1466                    DIRPTR::DS    2           ;POINTER TO DIRECTORY BUFFER
1468                    DIRCTR::DS    1           ;COUNTER FOR TABLE BLOCKS
1469                    TBLPTR::DS    2           ;POINTER TO RINGFILE STATUS TABLE

;AUXILIARY COMMUNICATION ITEMS
146B                    ACMPTR::DS    2           ;DISK READ BUFFER POINTER
146D                    ACMCTR::DS    1           ;AUX COM BLOCK COUNTER
146E                    AUXBF:: DS    8           ;STORE INCOMING PC CHARACTERS
1476                    FNUM0:: DS    2           ;SAVE FILE NAME NUMBER
1478                    FNUM1:: DS    2           ;SAME AS ABOVE
147A   6E 61 7A         NAMSG:: DB    'naz'       ;AUX COM RESPONSE IF NO FILES TO SEND
147D   73 64 7A         SDMSG:: DB    'sdz'       ;AUX COM 'SEND DATA REQUEST'

;FILE NAME TABLE IS PSEUDO-DIRECTORY FOR NON-OP/SYSTEM CONTROL.
                                ORG   $/16*16+16
1490                    FNTBL:: DS    416         ;RINGFILE STATUS TABLE IS DECIMAL
1630                    FNTBND::                  ;STRUCTURE IN A HEX FIELD

;STORAGE FOR COMMUNICATION AND DISPLAY
                                ORG   $/16*16+16  ;ON 16 BYTE BOUNDARY
                        ;MESSAGE BUFFERS
1640                    RCBF::  DS    RNGLEN*16   ;RING LENGTH X # OF CHANNELS
1A40                    XMTBUF::DS    32

;DISK OPERATION BUFFERS
1A60                    WRTBF:: DS    (BUNCH+1)*64
2260                    RDBF::  DS    (BUNCH+1)*64

END

Macros:
KPR             UARTWR

Symbols:
085D    ..0000      095D    ..0001      0992    ..0002
0A0F    ..0003      0B2A    ..0004      0B45    ..0005
06E6I   ACCMSG      146DI   ACMCTR      146BI   ACMPTR
00FF    ACTIVE      04E2I   ADD7        0AA5I   AGO
0000    ALLSENT     00A0    AUXBB       146EI   AUXBF
10CDI   AUXDRT      019AI   AUXIN       0009    AUXLEN
02F2I   AUXMIT      02F5    AUXMTT      01ACI   AUXOUT
0E76I   BBRLD       0005    BDOS        1152I   BDOSTP
0EB4I   BFNLD       F200    BIOS        F227    BIREAD
05FEI   BITA        0F06I   BLDTBL      1465I   BLKCTR
0E33I   BRLD        01BEI   BUFCHK      06DDI   BUFLRC
001F    BUNCH       0729I   BY          03F4I   BYT
0E22I   C0          0E24I   COLD        1112I   CALBUF
0623I   CALPTR      0ABE    CARD1       0AD3    CARD2
0AE6    CARD3       0AF9    CARD4       043BI   CFNM
0219I   CH2         1420    CHANMSG     0E0EI   CHAR0
0000    CHNA        0001    CHNB        10F8I   CHNPTR
0018    CHNRST      10EEI   CHNTBL      0E48I   CHRSPC
01E3I   CKF         01EAI   CKFF        01D4I   CK0
0706I   CLOK        0F13I   CLDRBF      0565I   CLOSE
0010    CLOSEF      1259    CLOSPRB     0204I   CLRBUF
0A63    CLRCHN      0798    CLRMK0      0814    CLRMK1
0424I   CLS         0008    CMD         000E    CMSK
```

| | | | | | |
|---|---|---|---|---|---|
| 0080 | COMBLK | 0193I | COMIN | 11DCI | COMMA |
| 0162I | COMP | 0000 | CONKEY | 0002 | CONOUT |
| 0008 | CONST | 127C | CONSTP | 000D | CR |
| 0000 | CRD0 | 0020 | CRD1 | 0040 | CRD2 |
| 0060 | CRD3 | 10A8 | CRDACC | 1108I | CRLF |
| 0DFBI | CRLFX2 | 0E51I | CRLR | 0E41I | CRN |
| 0002 | CTL | 10A6I | CURPTR | 000F | CURSOR |
| 134EI | D34FL | 0B1E | DDMA | 0BC2I | DELAY |
| 0013 | DELETF | 0BC8I | DINIT | 1468I | DIRCTR |
| 0ECDI | DIREC | 0006 | DIRIO | 1466I | DIRPTR |
| 0030 | DIRSZE | 1132I | DISBUF | 080C | DISCRD |
| 132B | DISKFUL | 023BI | DISKRD | 0371I | DISKWR |
| 0090 | DISP | 0001 | DISPCLR | 0894 | DISPCMD |
| 0002 | DISPMM | 000C | DISPON | 1155I | DISPTR |
| 0BB5I | DISSPC | 0594I | DISTMR | 0010 | DMA |
| 0010 | DMA0 | 0030 | DMA1 | 0050 | DMA2 |
| 0070 | DMA3 | 0044 | DMADIS | 05CFI | DMADRD |
| 05E3I | DMADWR | 0040 | DMAEN | 0A41I | DMAINI |
| 0415I | DMAP | 10F4I | DMAPT | 145FI | DMAPTR |
| 0A2DI | DMAREG | 10DAI | DMATBL | 0A5CI | DMATST |
| 0A6FI | DMAWRT | 0824I | DMR | 0A84I | DMRD |
| 0A80I | DMREAD | 0A76I | DMWRT | 04C9I | DNCMD |
| 0491I | DNSRCH | 0C90I | DONA | 1159I | DPHOLD |
| 0BAAI | DPULSE | 0048 | DRD | 0080 | DRT |
| 110DI | DRTCTA | 000C | DRTOFF | 031EI | DSKCNG |
| 0329I | DSKR | 000D | DSKRST | 0002 | DSKWARN |
| 036CI | DSKWR | 0898I | DSTB | 0000 | DT |
| 108E | DTABL | 08CA | DTEN | 09E8I | DTOD |
| 0A00I | DTOCD | 09C6I | DTST | 0044 | DWR |
| 0002 | DWTOFF | 07A8I | DX1 | 0984I | DY |
| 0D01I | ENTER | 0DAEI | ENTERR | 077EI | ENTR0 |
| 07FAI | ENTR1 | 001A | EOF | 038DI | EOFFL |
| 051C | ERASE | 1213I | ERRSIN | 13DA | ERSMSG |
| 1203 | ERSNAM | 001B | ESC | 0009 | EXT |
| 0F51I | EXTCNV | 005C | FCB | 007C | FCBCR |
| 006B | FCBRC | 0D43 | FEBR | 1308 | FILDR |
| 0E0AI | FILL | 01F3I | FINFL | 1371I | FINISH |
| 0E03I | FIXRP | 0E5DI | FIXSUF | 0432I | FIXTBL |
| 1462I | FLAGS | 0E3FI | FLDLD | 000C | FLFF |
| 0B8DI | FLSP | 0276I | FNDSUF | 0E86I | FNLD |
| 0570I | FNMSG | 0016 | FNOFF | 1490I | FNTBL |
| 1630I | FNTBND | 1476I | FNUM0 | 1478I | FNUM1 |
| 0EC5I | FORMFD | 0C3DI | FOUND | 05AAI | FULL |
| 0001 | GETTOD | 014CI | GKY | 0709I | GM |
| 0149I | GTOD | 0294I | GTSUF | 01A0I | GXON |
| 0D71 | HHR | 0BDCI | HIT3 | 08D5I | HOURS |
| 08FEI | HRSASC | 0908I | HRTEN | 0000 | INACT |
| 060EI | INSTA | 0607I | INSTAT | 0619I | INSTB |
| 03E2I | KEEP | 016FI | KEYIN | 0CA7I | KEYOFF |
| 018AI | KEYS | 0C83I | KPREX | 0CBD | KY0 |
| 0CC1 | KY1 | 0CC5 | KY2 | 0CC9 | KY3 |
| 0CCD | KY4 | 0CD1 | KY5 | 0CD5 | KY6 |
| 0CD9 | KY7 | 0CDD | KY8 | 0CE1 | KY9 |
| 0091 | KYBD | 0C0AI | KYLP | 0D9DI | KYR |
| 0CE5 | KYST | 0C53I | KYTABL | 0308I | LAST |
| 08D4I | LCD | 0E62I | LD1A | 000A | LF |

| | | | | | |
|---|---|---|---|---|---|
| 0B89I | LIN | 0005 | LIST | 01BAI | LKZ |
| 0A51I | LNDMA | 0007 | LOCKRST | 0006 | LOCKSRV |
| 1073 | LOCLSEC | 0471I | LOOP0 | 0460I | LOOP1 |
| 046BI | LOOP2 | 04A6I | LOOP3 | 04A2I | LOOP4 |
| 04A0I | LOOP5 | 03B8I | LP1 | 03C7I | LP2 |
| 070CI | LRCALC | 06C0 | LRCCHK | 001D | LRCOFF |
| 020CI | LSTFL | 08EDI | LT12 | 1451 | M1316 |
| 1443 | M14 | 1448 | M58 | 144C | M912 |
| 0546I | MAKE | 0016 | MAKEF | 0080 | MDMA |
| 0516 | MINS | 0FA9 | MNTAB | 000B | MODE |
| 08AA | MRMON | 05D1 | MRK | 05E5 | MRW |
| 059DI | MSGPR | 000F | MSK | 0A4BI | MSTDMA |
| 02A3I | MULT | 08B2 | MVIT | 147AI | NAMSG |
| 0E49I | NCHR | 04E6I | NEWCMD | 0D59 | NFEBB |
| 0480I | NFND | 02E9I | NGACT | 13F0I | NODMA |
| 129F | NOFILE | 0000 | NOREADY | 0457I | NOSRCH |
| 0133I | NOTFUL | 020CI | NOTZ | 08BAI | NOW |
| 0672I | NROT | 0D93 | NTLPYR | 0B74I | NULIN |
| 0727I | NUM | 03F2I | NUMB | 0F3CI | NXTBLK |
| 0A95I | NXTCAR | 0B76I | NXTCHR | 0A2FI | NXTCRD |
| 0C1AI | NXTKEY | 053BI | OPEN | 000F | OPENF |
| 0AAFI | ORTC | 0D0DI | PACK | 0001 | PADKEY |
| 06B4 | PARCHK | 06B0 | PAREVN | 1157I | PASTRM |
| 0C24I | PAT1 | 0C2BI | PAT2 | 0090 | PIO |
| 110EI | PORPTR | 110C | PORTCTR | 03F5I | PRCIR |
| 06D3I | PREF | 1074 | PREVSEC | 0DCDI | PRINT |
| 11E1I | PRNPTR | 0EB6I | PRNT | 0EB8I | PRNT0 |
| 0005 | PRNTON | 0225I | PRPCOM | 115AI | PRTCRD |
| 0009 | PSTRING | 115FI | PTBF | 0760I | PUTE |
| 1640I | RCBF | 16FA | RCBFPTR | 0A07I | RCQUIT |
| 0284I | RCS | 0019 | RCTOFF | 2260I | RDBF |
| 1461I | RDCTR | 02C9I | RDEC | 11F3I | RDNAM |
| 025DI | RDOK | 0072 | RDPROB | 0252I | RDSEC |
| 055BI | READ | 0014 | READF | 12C2I | READPR |
| 07D0I | RECCHN | 1110I | RECCTR | 0698I | RECLRC |
| 0663I | RECP | 0683I | RECPR | 1108I | RECVOF |
| 1104I | RECVON | 0825I | RECVR | 033CI | REDSK |
| 1394I | REPDSK | 0004 | REPEAT | 071CI | RLO |
| 069EI | RLR | 10C3 | RLRC | 06C7I | RLRCNG |
| 10C2 | RLRCP | 1456I | RNGCTR | 03ACI | RNGFL |
| 0040 | RNGLEN | 1450I | RNGPTR | 0180I | RNGWT |
| 0B7AI | ROT | 066CI | ROTA | 00E0 | RREADY |
| 007FI | RTCWR | 00C0 | RXDIS | 00C1 | RXEN |
| 0000 | RXRDY | 147DI | SDMSG | 1463I | SECTOR |
| F21B | SELDSK | 06FDI | SEND | 004F | SENTOK |
| 0050 | SENTPRB | 08F6I | SETAM | 001A | SETDMA |
| 08FBI | SETPM | F221 | SETSEC | 1040I | SETTM |
| 0002 | SETTOD | F21E | SETTRK | 0B59I | SHOW |
| 10C4 | SIOBYT | 0009 | SIOLEN | 000A | SMSK |
| 11DDI | SPCS | 0736I | SPRD | 072FI | SPRED |
| 0011 | SRCHF | 0012 | SRCHN | 0EDFI | SSEC |
| 104D | STACK | 0E2AI | STALD | 001C | STAOFF |
| 0100I | START | 03E4I | STAST | 0008 | STAT |
| 0612I | STATRD | 05F7I | STATUS | F224 | STBDMA |
| 102D | STKEND | 0E90I | STLD | 0EA7I | STOF1 |
| 02FFI | STUF | 029CI | SUFL | 12E5I | SUFPRB |

| | | | | | |
|---|---|---|---|---|---|
| 0695I | SUM | 0531I | SUPDMA | 050FI | SUPFCB |
| 0342I | SWON | 13B7I | SYSTRT | 1469I | TBLPTR |
| 0000 | TC0 | 0001 | TC1 | 0002 | TC2 |
| 0003 | TC3 | 10F2I | TCBFPTR | 063CI | TCBTST |
| 1006I | TCBUF | 0E78I | TDLD | 0408I | TEND |
| 0F2BI | THISFL | 0893I | TIM1 | 0896I | TIM2 |
| 0887I | TIME | 0F69 | TMSIGN1 | 0F89 | TMSIGN2 |
| 1060I | TODBUF | 0D30I | TODCHK | 089EI | TODEXP |
| 0E35I | TODLD | 00C0 | TREADY | 0F24I | TSTACT |
| C596 | TSTADR | 0DBBI | TSTMR | 0300I | TX |
| 00E0 | TXDIS | 0002 | TXENT | 0068 | TXEN |
| 0009 | TXON | 10F6I | UARPTR | 0000 | UART0 |
| 0004 | UART1 | 10DEI | UARTBL | 07BCI | UARTOF |
| 0B22I | UINIT | 07C4 | UOFF | 078A | UON0 |
| 0606 | UON1 | 0462I | UPSRCH | 0028 | US25 |
| 0000 | WBOOT | 0660I | WHEND | 0C1FI | WHKEY |
| 0838 | WR2 | 083A | WR3 | 0840 | WR4 |
| 03F9I | WREDY | 0386I | WRGO | 0551I | WRITE |
| 001E | WRITEF | 1236 | WRITPRB | 0407I | WROK |
| 0505 | WRR | 1A60I | WRTBF | 11E3I | WRTNAM |
| 05E9 | WRW | 0A31I | WRX | 1100I | XMITOF |
| 10FCI | XMITON | 1A40I | XMTBUF | 0752I | XMTCHN |
| 0013 | XOFF | 0011 | XON | 05B0 | YELL |
| 1075 | YTABL | | | | |

No Fatal error(s)

APPENDIX B

```
TITLE  "PCLK"   = CYBORG TIME-CLOCK PROGRAM
SUBTTL  REV.15,  3/17/86
.COMMENT*
CONTENTS:
        LC DISPLAY AND KEYBOARD FUNCTIONS,
        UNBUFFERED CARD READER, REGULAR AND SUPERVISOR CARDS
        WITH INVERTED CARD READER DATA,
        STATION SWITCH READER, SWITCH # 8 CONTROLS THE ALARM,
        BAUD RATE GENERATOR, RS-422 TRANSMITTER AND RECEIVER,
        2 LEDS AND ALARM.
        WATCH DOG TRIGGER PULSE AT PORT 70H.
        SECURITY LOCK DRIVE FROM AUX PORT, BIT 7, ACTIVE LOW.

EPROM IDENTIFIER: PCLK@n   (n DEFINES THE SOCKET AND ADDRESS)
        @0 = X3, (000-7FFH);   [ MSI BOARD = U7 ]
        @1 = X4, (800-FFFH);   [ MSI BOARD = U8 ]
```

| REV. DATE | REV. # | EXPLANATION AND COMPATIBILITY |
|---|---|---|
| 12/27/85 | 8 | 2ND RELEASE, CHANGE @0 & @1. |
| 1/12/86 | 9 | STATION SW # 8 MASKED, 000-127. CHANGE @0 ONLY, @1 R.8 OK. |
| 1/19/86 | 10 | DISPLAY BLINK ELIMINATED. CHANGE @1 ONLY, @0 R.7, R.8 & R.9 OK. |

| 1/25/86 | 11 | WATCH DOG TRIGGER ADDED. @0 AND @1 CHANGED, NO RETROACTIVE COMPATIBILITY. |
|---|---|---|
| 2/ 2/86 | 12 | DISPLAY REINITIALIZATIONS ADDED, EVERY MINUTE AND ALTER/RESET KEYS. @0 CHANGED; @1, REV. 11 OK. |
| 2/13/86 | 13 | SECURITY LOCK ENABLE ADDED, ALL CARDS, FIRST CHARACTER, FIELD 1. @0 CHANGED; @1, REV. 11 OK. |
| 2/19/86 | 14 | ALTER FIELD 2 CHANGED TO 'BADGE' @0 REV.13 OK, @1 CHANGED. |
| 3/ 6/86 | 15 | SECURITY LOCK OFF IF COM-LINE BREAK. @0 CHANGED; @1, REV.14 OK. |

```
$EJECT
.COMMENT~
CONTENTS:
    LC DISPLAY AND KEYBOARD FUNCTIONS,
    UNBUFFERED CARD READER, REGULAR AND SUPERVISOR CARDS
    WITH INVERTED CARD READER DATA,
    STATION SWITCH READER, SWITCH # 8 CONTROLS THE ALARM,
    BAUD RATE GENERATOR, RS-422 TRANSMITTER AND RECEIVER,
    2 LEDS AND ALARM.
    WATCH DOG TRIGGER PULSE AT PORT 70H.
    SECURITY LOCK DRIVE FROM AUX PORT, BIT 7, ACTIVE LOW.

EPROM IDENTIFIER: PCLK@n  (n DEFINES THE SOCKET AND ADDRESS)
    @0 = X3, (000-7FFH);  [ MSI BOARD = U7 ]
    @1 = X4, (800-FFFH);  [ MSI BOARD = U8 ]
```

| REV. DATE | REV. # | EXPLANATION AND COMPATIBILITY |
|---|---|---|
| 12/27/85 | 8 | 2ND RELEASE, CHANGE @0 & @1. |
| 1/12/86 | 9 | STATION SW # 8 MASKED, @0-127. CHANGE @0 ONLY, @1 R.8 OK. |
| 1/19/86 | 10 | DISPLAY BLINK ELIMINATED. CHANGE @1 ONLY, @0 R.7, R.8 & R.9 OK. |
| 1/25/86 | 11 | WATCH DOG TRIGGER ADDED. @0 AND @1 CHANGED, NO RETROACTIVE COMPATIBILITY. |
| 2/ 2/86 | 12 | DISPLAY REINITIALIZATIONS ADDED, EVERY MINUTE AND ALTER/RESET KEYS. @0 CHANGED; @1, REV. 11 OK. |
| 2/13/86 | 13 | SECURITY LOCK ENABLE ADDED, ALL |

```
                              CARDS, FIRST CHARACTER, FIELD 1.
                              00 CHANGED; 01, REV. 11 OK.

2/19/86      14               ALTER FIELD 2 CHANGED TO 'BADGE'
                              00 REV. 13 OK, 01 CHANGED.

3/ 6/86      15               SECURITY LOCK OFF IF COM-LINE
                              BREAK.
                              00 CHANGED; 01, REV. 14 OK.

$EJECT

;               HARDWARE AND PROGRAM PARAMETERS

.Z80
1000            RAM     EQU     1000H           ;IC AT X5, PRODUCTION CLOCK
1800            STACK   EQU     RAM+2048        ;FOR 6116 RAM
103F            XLRC    EQU     XMTBUF+63
00E1            STABW   EQU     BASE+1          ;NSC810 PORT A
00E0            BASE    EQU     0E0H            ;NSC810(U13) ADDR.,PORTS A,B,C
0090            DISP    EQU     90H             ;82PC12(U12) ADDRESS,PORT D
00E0            KYBD    EQU     BASE+0          ;NSC810 PORT A DATA
0000            RECRD   EQU     0               ;RECEIVER READ PORT STROBE
0010            SFEN    EQU     10H             ;UART STATUS FLAG ENABLE
0020            TBRL    EQU     20H             ;UART XMIT BUF REGISTER LOAD
0030            OUTPT   EQU     30H             ;OUTPUT PORT STROBE
0040            INPT    EQU     40H             ;INPUT PORT STROBE
0001            US225   EQU     1               ;225 uSEC. DELAY PARAMETER
002A            MS      EQU     42              ;1 mSEC.
0008            DISPOF  EQU     8               ;DISPLAY & CURSOR OFF
000C            DISPON  EQU     0CH             ;DISPLAY ON, CURSOR OFF
000F            CURSOR  EQU     0FH             ;DISPLAY ON, CURSOR BLINKING
0001            DISPCLR EQU     1               ;DISPLAY IS FILLED W/SPACES
0002            DISPHM  EQU     2               ;RESET CURSOR POSITION (R.10)
0005            LCINPT  EQU     5               ;FIRST POSITION FOR NUMBERS
0004            ENRSTB  EQU     4               ;ENABLE INTERRUPT RSTB* ONLY
0002            ENRSTC  EQU     2               ;ENABLE INTERRUPT RSTC* ONLY
00C0            RTCBSE  EQU     0C0H
00E2            INTCR   EQU     11H+0D1H        ;RTC INTERRUPT CONTROL REG.
0050            RSTFF   EQU     50H             ;STROBE FLIP/FLOP RESET
0000            RECFL   EQU     0               ;RECEIVER FLAG
0001            BDCDFL  EQU     1               ;BAD CARD-READ FLAG
0002            OKCDFL  EQU     2               ;GOOD CARD-READ FLAG
0003            BEEPFL  EQU     3               ;ALARM FLAG
0004            FLD8FL  EQU     4               ;FIELD 8 "ILLEGAL" FLAG
0000            SECLOCK EQU     0               ;SECURITY LOCK FLAG BIT
0008            CMRETRY EQU     8               ;NUMBER OF COM REPEATS $EJECT

;               UTILITY MACROS

.SALL                       ;SUPPRESS MACRO LISTINGS
+           TIMER   MACRO   TPARM               ;GENERIC TIME DELAY
+                   PUSH    DE
+                   LD      DE,TPARM
```

```
+              LD      (TDADD),DE      ;TEMP FOR PARAMETER
+              CALL    DELAY           ;CONTAINS WATCH DOG TRIGGER
+              POP     DE
               ENDM

+      SAVE    MACRO                   ;SAVE REGISTERS
+              PUSH    AF
+              PUSH    BC
+              PUSH    DE
+              PUSH    HL
+              PUSH    IX
+              PUSH    IY
               ENDM

+      RESTORE MACRO                   ;RESTORE REGISTERS
+              POP     IY
+              POP     IX
+              POP     HL
+              POP     DE
+              POP     BC
+              POP     AF
               ENDM

+      WDOG    MACRO                   ;WATCH DOG TRIGGER PULSE
+              OUT     (70H),A
               ENDM
       $EJECT

0000'                          ASEG
                               ORG     0
0000   31 1800        START:   LD      SP,STACK
               +               WDOG                    ;WATCH DOG TIMER TRIGGER
0005   3E 95                   LD      A,10010101B     ;DISABLE XMIT DRIVER, GREEN LED ON,
0007   D3 30                   OUT     (OUTPT),A       ;RED, SECURITY LOCK & ALARM OFF.
0009   D3 50                   OUT     (RSTFF),A       ;CLEAR THE CARD READER F/F
000B   AF                      XOR     A
000C   32 100C                 LD      (LOCK),A        ;CLEAR SECURITY LOCK FLAG
000F   CD 08D3                 CALL    PTINIT          ;INITIALIZE NSC810 PORTS

0012   C3 003F                 JP      STRT            ;TO MAIN POLLING LOOP

0015                           DS      2CH-$,0FFH      ;FILL WITH RESTART 38H
                               ORG     2CH
002C   C3 051B        INTSRC:  JP      CRECV           ;RECEIVER
002F                           DS      34H-$,0FFH
                               ORG     34H
0034   C3 0573        INTSRB:  JP      UBUFRD          ;UNBUFFERED CARD READER
0037   FF                      RST     38H
                               ORG     38H
0038   C3 0000        INTSRV:  JP      START           ;FALSE RESTART, INTR* PIN
003B   FF                      RST     38H
                               ORG     3CH
003C   C3 0000        INTSRA:  JP      START

003F   CD 090E        STRT:    CALL    DINIT           ;INITIALIZE LCD DISPLAY
0042   CD 08A2                 CALL    DISSPC          ;CLEAR DISPLAY BUFFER AND LCD
0045   11 0020                 LD      DE,20H
```

```
0048   ED 53 1000              LD      (DPHOLD),DE       ;START DISPLAY HOLD COUNTER
004C   CD 01F7                 CALL    CLEAN             ;CLEAR TRANSMIT BUFFER,
                                                         ;CLEAR CONTRY COUNTER,
                                                         ;START COMLINE BREAK COUNTER,
                                                         ;GREEN LED ON
004F   3E 06                   LD      A,ENRSTB+ENRSTC   ;ENABLE RSTB# AND C#
0051   D3 BB                   OUT     (0BBH),A          ;INTERRUPT CONTROL PORT
0053   FB                      EI                        ;ENABLE CPU INTERRUPTS

;FOKEY IS MAIN POLLING LOOP.
                       ;TESTS: ALTER KEY, ALL FLAGS, COM LINE ACTIVITY,
                       ;SUPERVISOR CARD BYTE, OTHER STUFF.
0054                 + FOKEY:  WDOG                      ;WATCH DOG TRIGGER PULSE
0056   21 10DB                 LD      HL,INTFLG         ;GET GOOD-READ FLAG
0059   CB 56                   BIT     OKCDFL,(HL)
005B   20 13                   JR      NZ,DPCT           ;STAY OUT OF FKEY, NOW
005D   3A 1000                 LD      A,(XMTBUF)        ;GET SUPERVISOR BYTE
0060   FE 20                   CP      20H               ;IF NOT SUPER
0062   C2 0223                 JP      NZ,FKEY
0065   3E FE                   LD      A,0FEH            ;LOOK FOR ALTER KEY
0067   D3 E0                   OUT     (KYBD),A
0069   DB E0                   IN      A,(KYBD)
006B   FE 7E                   CP      7EH
006D   CA 0223                 JP      Z,FKEY            ;ALTER KEY IS ON
0070   ED 5B 1000      DPCT:   LD      DE,(DPHOLD)       ;GET DISPLAY HOLD COUNTER
0074   7A                      LD      A,D
0075   B3                      OR      E
0076   28 05                   JR      Z,RECRDY          ;KEEP AT 0
0078   1B                      DEC     DE
0079   ED 53 1000              LD      (DPHOLD),DE       ;SAVE COUNTER
007D   21 10DB         RECRDY: LD      HL,INTFLG         ;GET FLAGS
0080   CB 46                   BIT     RECFL,(HL)        ;TEST RECEIVER FLAG
0082   C2 018A                 JP      NZ,MSGPR          ;FLAG IS SET

0085   ED 5B 10DF      COMTST: LD      DE,(COMCTR)       ;TEST COM LINE COUNTER
0089   1B                      DEC     DE
008A   7A                      LD      A,D
008B   B3                      OR      E
008C   CA 014E                 JP      Z,NOCOM           ;COM MISSING
008F   ED 53 10DF              LD      (COMCTR),DE       ;COM LINE OK
0093   21 10DB                 LD      HL,INTFLG
0096   CB 66                   BIT     FLD8FL,(HL)       ;TEST FIELD 8 FLAG
0098   C2 035F                 JP      NZ,KY8
009B   CB 56                   BIT     OKCDFL,(HL)       ;TEST GOOD CARD-READ FLAG
009D   28 0E                   JR      Z,BDFL
                       ;GOOD CARD-READ FLAG PENDING
009F   ED 5B 10E8      WAITST: LD      DE,(WAITMR)
00A3   7A                      LD      A,D
00A4   B3                      OR      E
00A5   CA 0125                 JP      Z,RPTXMT
00A8   1B                      DEC     DE
00A9   ED 53 10E8              LD      (WAITMR),DE       ;PUT BACK IF WAS NOT = 0
00AD   CB 4E           BDFL:   BIT     BDCDFL,(HL)       ;TEST BAD CARD-READ FLAG
00AF   C2 00EA                 JP      NZ,BCRF           ;IS SET
00B2   CB 5E           BPFLG:  BIT     BEEPFL,(HL)       ;BEEP FLAG?
00B4   CA 0054                 JP      Z,FKEY            ;NO BEEP FLAG
```

```
00B7   3A 10DE              LD      A,(DPHOLD+1)    ;GET HI BYTE
00BA   CB 47                BIT     0,A
00BC   28 08                JR      Z,BEEPF
00BE   06 89                LD      B,89H
00C0   CD 00D6              CALL    LEDALR          ;RED AND ALARM (?) ON, GRN OFF
00C3   C3 0054              JP      FOKEY

00C6   3A 10DC      BEEPF:  LD      A,(LOCK)        ;GET FLAGS
00C9   CB 47                BIT     SECLOCK,A       ;SECURITY LOCK FLAG ?
00CB   3E 9D                LD      A,10011101B     ;LOCK OFF, OTHERS OFF
00CD   28 02                JR      Z,SOFF          ;FLAG IS OFF
00CF   3E 1D                LD      A,00011101B     ;LOCK ON, OTHERS OFF
00D1   D3 30        SOFF:   OUT     (OUTPT),A
00D3   C3 0054              JP      FOKEY

;CALL TO TURN GREEN LED OFF, RED LED ON.
                    ;TEST SECURITY LOCK FLAG, TURN ON LOCK BIT IF FLAG IS ON.
                    ;ALARM ON IF STATION SWITCH # 8 IS ON AND PATTERN IN B RESETS BIT 4.

00D6   3A 10DC      LEDALR: LD      A,(LOCK)        ;TEST SECURITY LOCK FLAG
00D9   CB 47                BIT     SECLOCK,A
00DB   28 02                JR      Z,LDALR         ;FLAG OFF, LOCK BIT OFF
00DD   CB B8                RES     7,B             ;FLAG ON, LOCK BIT ON
00DF   DB E1        LDALR:  IN      A,(STASW)       ;GET STATION SWITCH
00E1   1F                   RRA
00E2   1F                   RRA
00E3   1F                   RRA                     ;MOVE SW # 8 TO ALARM BIT
00E4   E6 10                AND     00010000B       ;MASK OTHER SWITCHES
00E6   B0                   OR      B
00E7   D3 30                OUT     (OUTPT),A
00E9   C9                   RET

00EA              + BCRF:   WDOG                    ;WATCH DOG TIMER TRIGGER
00EC   21 10DB              LD      HL,INTFLG
00EF   CB 8E                RES     BDCDFL,(HL)     ;RESET BAD CARD-READ FLAG
00F1   3E 06                LD      A,ENRSTB+ENRSTC ;ENABLE RECEIVER AND CARD RDR
00F3   D3 B8                OUT     (0B8H),A
00F5   FB                   EI
00F6   11 2000              LD      DE,2000H        ;START DISPLAY HOLD COUNTER
00F9   ED 53 10DD           LD      (DPHOLD),DE
00FD   06 89                LD      B,89H
00FF   CD 00D6              CALL    LEDALR          ;GRN LED OFF, RED & ALARM ON (?)
0102   18 1B                JR      BCR

0104   CD 01F7      DISREC: CALL    CLEAN           ;CLEAR XMTBUF & COMTRY CTR
0107   AF                   XOR     A
0108   32 10DC              LD      (LOCK),A        ;CLEAR LOCK FLAG
010B   FB                   EI                      ;ENABLE INT'RUPTS
010C   21 1040              LD      HL,RECBUF       ;GET READY FOR SHOW
010F   22 1002              LD      (DISPTR),HL
0112   21 10F0              LD      HL,PREVMN       ;GET PREVIOUS MINUTE 1'S DIGIT
0115   3A 105B              LD      A,(RECBUF+27)   ;EQUIVALENT NEW 1'S DIGIT
0118   BE                   CP      (HL)            ;CHANGED ?
0119   28 04                JR      Z,BCR           ;NO CHANGE
011B   77                   LD      (HL),A          ;CHANGED, SAVE NEW
011C   CD 090E              CALL    DINIT           ;REINITIALIZE DISPLAY
```

```
011F  CD 083A         BCR:    CALL    SHOW
0122  C3 0054                 JP      FOKEY           ;GO AROUND AGAIN

;IF NO RESPONSE, AND COMTRY COUNTER IS NOT = 0,
                              ;REPEAT THE TRANSMISSION
0125  21 10E7         RPTXMT: LD      HL,COMTRY       ;CHECK RETRY COUNTER
0128  AF                      XOR     A
0129  BE                      CP      (HL)
012A  CA 014E                 JP      Z,NOCOM
012D  3E 05                   LD      A,5             ;ALARM DELAY
012F  BE                      CP      (HL)
0130  C2 0143                 JP      NZ,ANMSG        ;TRY TRANSMITTING AGAIN
0133  21 0A73                 LD      HL,SDYMSG       ;SYSTEM DELAY MESSAGE
0136  22 1002                 LD      (DISPTR),HL
0139  CD 083A                 CALL    SHOW
013C  11 2000                 LD      DE,2000H        ;LOAD DISPLAY HOLD COUNTER
013F  ED 53 100D              LD      (DPHOLD),DE     ;FOR BEEP TOGGLE
0143  CD 06E3         ANMSG:  CALL    TRANS           ;RELOAD WAITMR, DECR COMTRY
0146  21 100B                 LD      HL,INTFLG
0149  CB DE                   SET     BEEPFL,(HL)     ;BEEP FLAG
014B  C3 0082                 JP      BPFLG

;COM LINE COUNTER HAS REACHED 0, MEANING COM LINE INTERRUPTION
014E  3E 02           NOCOM:  LD      A,ENRSTC        ;ALLOW RECEIVER ONLY,
0150  D3 BB                   OUT     (0BBH),A        ;NOT CARD READER
0152  AF                      XOR     A
0153  32 100C                 LD      (LOCK),A        ;CLEAR LOCK FLAG
0156  21 0A53                 LD      HL,NOCOMSG
0159  22 1002                 LD      (DISPTR),HL
015C  CD 083A                 CALL    SHOW
015F  06 89                   LD      B,89H           ;RED ON, ALARM ON (?)
0161  CD 0006                 CALL    LEDALR
0164  CD 0175                 CALL    COMFLG          ;TEST RECEIVER FLAG
0167  0E 01                   LD      C,DISPCLR
0169  CD 097C                 CALL    DISPCMD
016C  3E 99                   LD      A,10011001B     ;GRN OFF,RED ON,ALARM OFF
016E  D3 30                   OUT     (OUTPT),A
0170  CD 0175                 CALL    COMFLG
0173  18 D9                   JR      NOCOM

0175              +   COMFLG: TIMER   MG+400
0181  21 100B                 LD      HL,INTFLG
0184  CB 46                   BIT     RECFL,(HL)      ;TEST RECEIVER FLAG
0186  C2 0000                 JP      NZ,START        ;COM IS BACK,START OVER AGAIN
0189  C9                      RET

;GOT HERE BECAUSE RECEIVER FLAG IS SET
018A  21 100B         MSGPR:  LD      HL,INTFLG
018D  CB 86                   RES     RECFL,(HL)      ;RESET RECEIVER FLAG
018F  3A 1040                 LD      A,(RECBUF)      ;CHECK FOR ACK MSG
0192  FE FE                   CP      0FEH            ;0FEH MEANS MSG ACCEPTED
0194  28 17                   JR      Z,ACKOK
0196  3A 10E7                 LD      A,(COMTRY)      ;GET RETRY COUNTER
0199  FE 00                   CP      0
019B  CA 01A1                 JP      Z,THLD          ;ENOUGH TRIES
019E  C3 0054                 JP      FOKEY
```

```
01A1   ED 5B 100D      THLD:    LD      DE,(DPHOLD)     ;TEST DISPLAY HOLD COUNTER
01A5   7A                       LD      A,D
01A6   B3                       OR      E
01A7   C2 0054                  JP      NZ,FOKEY        ;STILL HOLDING
01AA   C3 0104                  JP      DISREC

01AD   F3              ACKOK:   DI
01AE   3E A0                    LD      A,0A0H          ;RESET ACK MARKER
01B0   32 1040                  LD      (RECBUF),A

01B3   21 100C                  LD      HL,LOCK         ;POINT TO SECURITY LOCK FLAG
01B6   CB 86                    RES     SECLOCK,(HL)    ;RESET SECURITY LOCK FLAG
01B8   3A 1010                  LD      A,(XMTBUF+16)   ;POINT TO FIRST CHARACTER, FIELD 1
01BB   FE 20                    CP      ' '             ;SPACE ?
01BD   28 02                    JR      Z,STHOLD        ;IS A SPACE, LEAVE SECURITY LOCK BIT RESET
01BF   CB C6                    SET     SECLOCK,(HL)    ;NOT A SPACE, SET SECURITY LOCK BIT

01C1   11 2000         STHOLD:  LD      DE,2000H
01C4   ED 53 100D               LD      (DPHOLD),DE     ;START DISPLAY HOLD COUNTER
01C8   CD 01F7                  CALL    CLEAN
01CB   06 85                    LD      B,85H           ;GRN ON, ALARM (?)
01CD   CD 0006                  CALL    LEDALR
01D0   21 1040                  LD      HL,RECBUF
01D3   22 10D2                  LD      (DISPTR),HL     ;DISPLAY ACK MESSAGE
01D6   CD 083A                  CALL    SHOW
01D9   F3                       DI
              +                 TIMER   MS*400
01E6   3A 100C                  LD      A,(LOCK)        ;TEST SECURITY LOCK FLAG
01E9   CB 47                    BIT     SECLOCK,A
01EB   3E 95                    LD      A,10010101B     ;LOCK OFF
01ED   28 02                    JR      Z,STHH          ;FLAG IS OFF
01EF   3E 15                    LD      A,00010101B     ;LOCK & GRN ON, RED & ALARM OFF
01F1   D3 30           STHH:    OUT     (OUTPT),A
01F3   FB                       EI
01F4   C3 0054                  JP      FOKEY

;CLEARS: INTERRUPT FLAGS, COUNTRY COUNTER, TRANSMIT BUFFER.
                       ;STARTS COM LINE COUNTER, TURNS THE LCD CURSOR OFF,
                       ;TESTS SECURITY LOCK FLAG.
01F7   AF              CLEAN:   XOR     A
01F8   32 10DB                  LD      (INTFLG),A
01FB   32 10E7                  LD      (CONTRY),A
01FE   11 3000                  LD      DE,3000H        ;START COM LINE COUNTER
0201   ED 53 100F               LD      (COMCTR),DE
0205   3E 20                    LD      A,' '
0207   21 1000                  LD      HL,XMTBUF
020A   06 40                    LD      B,64
020C   77              CLRXMT:  LD      (HL),A
020D   23                       INC     HL
020E   10 FC                    DJNZ    CLRXMT
0210   0E 0C                    LD      C,DISPON
0212   CD 097C                  CALL    DISPCMD
0215   3A 100C                  LD      A,(LOCK)        ;TEST SECURITY LOCK FLAG
0218   CB 47                    BIT     SECLOCK,A
021A   3E 95                    LD      A,10010101B     ;GRN ON, EVERYTHING ELSE OFF
021C   28 02                    JR      Z,CLRXX         ;FLAG IS OFF, LOCK IS OFF
```

```
021E  3E 15                   LD      A,00010101B     ;FLAG IS ON, LOCK IS ON
0220  D3 30       CLRXX:      OUT     (OUTPT),A
0222  C9                      RET

;ALTER KEY PROCESS IS FIELD SELECTION 0223  3E 04       FKEY:       LD      A,ENRSTB        ;CARD READER ONLY
0225  D3 BB                   OUT     (0BBH),A
0227  AF                      XOR     A               ;CLEAR LOCK FLAG
0228  32 100C                 LD      (LOCK),A
022B  06 8D                   LD      B,10001101B     ;ALARM (?), GRN OFF
022D  CD 0006                 CALL    LEDALR
            +                 TIMER   MS*20
023C  3E 9D                   LD      A,10011101B     ;ALARM OFF, GRN OFF
023E  D3 30                   OUT     (OUTPT),A
0240  3E 04       FUNKEY: LD  A,ENRSTB                ;CARD READER ONLY
0242  D3 BB                   OUT     (0BBH),A
0244  21 0A9A                 LD      HL,ALTMSG       ;ALTER KEY IS ON OR SUPER-CARD
0247  22 1002                 LD      (DISPTR),HL
024A  CD 083A                 CALL    SHOW
024D  21 109C                 LD      HL,DISBUF+16+12 ;FORM CURSOR POSITION
0250  22 1007                 LD      (CURPTR),HL
0253  0E 0F                   LD      C,CURSOR        ;TURN CURSOR ON
0255  CD 097C                 CALL    DISPCMD
0258  3E CC                   LD      A,80H OR 40H+12 ;LCD CURSOR ADDRESS
025A  4F                      LD      C,A
025B  CD 097C                 CALL    DISPCMD
025E  21 020F                 LD      HL,FOTABL       ;GET FIELD NUMBER
0261  CD 04FD                 CALL    KYGONE

;LOOK FOR ANY KEY, AND TEST INTERRUPT FLAGS.
                              ;HL HAS TABLE BASE ADDRESS.
0264  11 C000     LPING:  LD  DE,0C000H               ;START LPING COUNTER
0267  ED 53 10E3              LD      (LPGCTR),DE
026B              +  LOOP:    WDOG                    ;WATCH DOG TIMER TRIGGER
026D  AF                      XOR     A
026E  D3 E0                   OUT     (KYBD),A        ;SET COLUMNS LOW
0270  DB E0                   IN      A,(KYBD)        ;GET KEYBOARD INPUTS
0272  FE F0                   CP      0F0H            ;ANY KEYS ON ?
0274  20 32                   JR      NZ,KEYON        ;KEY ON
0276  11 10D8                 LD      DE,INTFLG       ;GET INTERRUPT FLAGS
0279  EB                      EX      DE,HL           ;SAVE TABLE BASE
027A  CB 56                   BIT     OKCDFL,(HL)     ;TEST GOOD CARD-READ FLAG
027C  C2 0380                 JP      NZ,ENREC        ;FLAG IS SET
027F  CB 4E                   BIT     BDCDFL,(HL)     ;TEST BAD CARD-READ FLAG
0281  C2 00EA                 JP      NZ,BCRF         ;FLAG IS SET
0284  CB 66                   BIT     FLD8FL,(HL)     ;TEST FLD 8 FLAG
0286  C2 035F                 JP      NZ,KY8          ;FIELD 8 IS ILLEGAL
0289  EB                      EX      DE,HL           ;TABLE BASE BACK
028A  ED 5B 10E3              LD      DE,(LPGCTR)     ;GET LPING COUNTER
028E  1B                      DEC     DE
028F  7A                      LD      A,D
0290  B3                      OR      E
0291  CA 003F                 JP      Z,STRT          ;EXIT IF TIME-OUT
0294  ED 53 10E3              LD      (LPGCTR),DE     ;PUT BACK
0298  CB 52                   BIT     2,D
029A  28 06                   JR      Z,GLEDON
029C  3E 9D                   LD      A,10011101B     ;GRN OFF
```

```
029E  D3 30                 OUT     (OUTPT),A
02A0  18 C9                 JR      LOOP          ;TIME-OUT NOT DONE
02A2  3E 95      GLEDON: LD A,10010101B           ;GRN ON
02A4  D3 30                 OUT     (OUTPT),A
02A6  18 C3                 JR      LOOP          ;TIME-OUT NOT DONE
02A8  06 85      KEYON:  LD B,10000101B           ;GRN ON, ALARM ON (?)
02AA  CD 0006               CALL    LEDALR
                            TIMER   MS+20         ;20 MSEC. BOUNCE DELAY
02B9  DB E0                 IN      A,(KYBD)      ;KEY STILL ON ?
02BB  FE F0                 CP      0F0H
02BD  28 AC                 JR      Z,LOOP        ;KEY IS RELEASED
02BF  CD 02C7               CALL    FNDKEY
02C2  3E 95                 LD      A,10010101B   ;GRN ON, RED & ALARM OFF
02C4  D3 30                 OUT     (OUTPT),A
02C6  E9                    JP      (HL)          ;GO PROCESS KEY

;IDENTIFY SPECIFIC KEY, EXIT WITH KEY TABLE ADDRESS IN HL.
02C7  0E FE      FNDKEY: LD C,0FEH                ;SAVE ROW PATTERN
02C9  79         PAT1:   LD A,C
02CA  06 04                 LD      B,4           ;COLUMN COUNTER
02CC  D3 E0                 OUT     (KYBD),A
02CE  DB E0                 IN      A,(KYBD)      ;GET KEY
02D0  17         PAT2:   RLA                      ;ROTATE THROUGH CARRY
02D1  D0                    RET     NC            ;GOT KEY, EXIT
02D2  23                    INC     HL            ;NOT THIS KEY
02D3  23                    INC     HL
02D4  23                    INC     HL
02D5  10 F9                 DJNZ    PAT2          ;TEST NEXT COLUMN
02D7  CB 59                 BIT     3,C           ;TEST FOR LAST ROW
02D9  C8                    RET     Z             ;SHOULD NOT GET HERE
02DA  37                    SCF
02DB  CB 11                 RL      C             ;NEW ROW PATTERN
02DD  18 EA                 JR      PAT1

;TABLE SCANNING ORDER FOR PRODUCTION MEMBRANE KEYPAD IS:
                    ;   ALTER, 3, 2, 1, RESET, 6, 5, 4,
                    ;   SEND, 9, 8, 7, SPACE, CLEAR, 0, UNUSED

;FOTABL IS USED WHEN FIELD IS OPENED
02DF  C3 036F    FOTABL: JP KYALT                 ;ALTER KEY
02E2  C3 0337               JP      KY3
02E5  C3 0327               JP      KY2
02E8  C3 0317               JP      KY1
02EB  C3 003F               JP      STRT          ;RESET
02EE  C3 034F               JP      KY6
02F1  C3 0347               JP      KY5
02F4  C3 033F               JP      KY4
02F7  C3 0372               JP      KYSNDF        ;SEND, NORMALLY NOT USED HERE
02FA  C3 0367               JP      KY9
02FD  C3 035F               JP      KY8
0300  C3 0357               JP      KY7
0303  C3 0240               JP      FUNKEY        ;SPACE, NOT USED HERE
0306  C3 0240               JP      FUNKEY        ;CLEAR ENTRY, NORMALLY NOT USED HERE
0309  C3 030F               JP      KY0
030C  C3 0240               JP      FUNKEY        ;UNUSED
```

```
                +   KYFLD   MACRO   W,V             ;LOADS FIELD NUMBER AND DISPLAY MESSAGE
                +           LD      A,W
                +           LD      HL,V
                +           JP      FLDPR
                            ENDM
030F            +   KY0:    KYFLD   0,USER
0317  3A 1000       KY1:    LD      A,(XMTBUF)      ;PROTECTED FIELD
031A  FE 20                 CP      20H             ;TEST FOR SUPERVISOR CARD
031C  CA 0240               JP      Z,FUNKEY
                +           KYFLD   1,COMCDE
0327  3A 1000       KY2:    LD      A,(XMTBUF)      ;PROTECTED FIELD
032A  FE 20                 CP      20H
032C  CA 0240               JP      Z,FUNKEY
                +           KYFLD   2,BADGE
0337            +   KY3:    KYFLD   3,CONT3
033F            +   KY4:    KYFLD   4,CONT4
0347            +   KY5:    KYFLD   5,CONT5
034F            +   KY6:    KYFLD   6,CONT6
0357            +   KY7:    KYFLD   7,FNCTN
035F            +   KY8:    KYFLD   8,ERNCDE
0367            +   KY9:    KYFLD   9,SHFCDE
036F  C3 0240       KYALT:  JP      FUNKEY          ;ALTER KEY
0372  CD 04FD       KYSNDF: CALL    KYGONE
0375  3A 1000               LD      A,(XMTBUF)      ;TEST SUPER CARD BYTE
0378  FE 20                 CP      20H
037A  CA 0240               JP      Z,FUNKEY        ;NOT SUPER
037D  CD 06E3       SUPSND: CALL    TRANS
0380  3E 06         ENREC:  LD      A,ENRSTB+ENRSTC ;ENABLE INTERRUPTS
0382  D3 88                 OUT     (088H),A
0384  FB                    EI
0385  C3 0070               JP      DPCT            ;GO WATCH FOR MSG

;FLDPR SETS UP DISPLAY AND TRANSMIT BUFFER FOR ENTRY OF CODES
                            ;HL CONTAINS ADDRESS OF DISPLAY MESSAGE
0388  32 1009       FLDPR:  LD      (FIELD),A       ;SAVE FIELD NUMBER
038B  11 1080               LD      DE,DISBUF       ;MESSAGE TEXT
038E  01 0010               LD      BC,16           ;FIRST LINE
0391  ED B0                 LDIR                    ;GET FIELD MESSAGE
0393  3E 20         SECLN:  LD      A,20H           ;FILL SECOND LINE
0395  21 1090               LD      HL,DISBUF+16
0398  06 10                 LD      B,16
039A  77            FLSPC:  LD      (HL),A
039B  23                    INC     HL
039C  10 FC                 DJNZ    FLSPC
                            ;PUT FIELD NUMBER IN DISPLAY BUFFER
039E  3A 1009               LD      A,(FIELD)       ;GET FIELD NUMBER
03A1  F6 30                 OR      30H             ;MAKE ASCII
03A3  32 1081               LD      (DISBUF+1),A    ;SECOND CHARACTER POSITION
                            ;LOAD DISPLAY BUFFER WITH CONTENTS OF TRANSMIT BUFFER
03A6  CD 04F1               CALL    FLDLIM          ;GET FIELD LENGTH
03A9  4F                    LD      C,A             ;SAVE LIMIT
03AA  06 00                 LD      B,0
03AC  CD 03FB               CALL    XBPT            ;GET XMTBUF POINTER
03AF  11 1095               LD      DE,DISBUF+16+5  ;FIRST CHARACTER POSITION
03B2  ED B0                 LDIR
03B4  21 100B               LD      HL,INTFLG       ;TEST FIELD 8 FLAG
03B7  CB 66                 BIT     FLD8FL,(HL)
```

```
0389  28 08              JR     Z,DL           ;FLAG NOT SET
038B  21 0A93            LD     HL,ILLEG       ;FLAG SET, GET MSG
038E  11 1099            LD     DE,DISBUF+16+9
03C1  01 0007            LD     BC,7
03C4  ED B0              LDIR
                         ;SEND DISPLAY BUFFER TO LCD
03C6  21 1080     DL:    LD     HL,DISBUF
03C9  22 10D2            LD     (DISPTR),HL
03CC  CD 083A            CALL   SHOW
03CF  21 10DB            LD     HL,INTFLG      ;TEST FIELD 8 FLAG
03D2  CB 66              BIT    FLD8FL,(HL)
03D4  CB A6              RES    FLD8FL,(HL)
03D6  C4 076E            CALL   NZ,SQEK
                         ;COMPUTE POINTERS
03D9  21 1095            LD     HL,DISBUF+16+5 ;FOR CODE ENTRY,EQUIVALENT TO
                                               ;INITIAL LCD POSITION
03DC  22 10D7            LD     (CURPTR),HL
03DF  3E 05              LD     A,LCINPT       ;INITIAL LCD CURSOR ADDRESS
03E1  32 10DA            LD     (LCDPTR),A     ;SAVE INITIAL POINTER
03E4  C6 C0              ADD    A,80H OR 40H   ;FORM THE COMMAND
03E6  4F                 LD     C,A            ;PUT LCD CURSOR IN PLACE
03E7  CD 097C            CALL   DISPCMD
03EA  CD 03FB            CALL   XBPT           ;TRANSMIT BUFFER POINTER
03ED  0E 0F       KYUN:  LD     C,CURSOR       ;TURN ON CURSOR
03EF  CD 097C            CALL   DISPCMD
03F2  21 040F            LD     HL,NMTABL      ;SET UP FOR NUMBER ENTRY
03F5  CD 04FD            CALL   KYGONE
03F8  C3 0264            JP     LPING

;XBPT CALCULATES THE POSITION IN THE TRANSMIT BUFFER OF THE
                         ;FIRST CHARACTER IN THE FIELD SELECTED
03FB  21 0A09     XBPT:  LD     HL,XBIAS       ;GET TRANSMIT BUFFER INITIAL
03FE  16 00              LD     D,0            ;POSITION AND CALCULATE THE
0400  3A 1009            LD     A,(FIELD)      ;CORRECT POSITION BASED ON
0403  5F                 LD     E,A            ;FIELD NUMBER SELECTION
0404  19                 ADD    HL,DE
0405  7E                 LD     A,(HL)
0406  21 1000            LD     HL,XMTBUF
0409  85                 ADD    A,L
040A  6F                 LD     L,A
040B  22 10E1            LD     (XDTPTR),HL    ;SAVE XMTBUF POINTER
040E  C9                 RET

;NMTABL IS USED AFTER FIELD HAS BEEN SELECTED
040F  C3 0471     NMTABL: JP    KF             ;ALTER KEY
0412  C3 0449            JP     K3
0415  C3 0444            JP     K2
0418  C3 043F            JP     K1
041B  C3 003F            JP     STRT           ;RESET
041E  C3 0458            JP     K6
0421  C3 0453            JP     K5
0424  C3 044E            JP     K4
0427  C3 0479            JP     KYSNDN         ;SEND
042A  C3 0467            JP     K9
042D  C3 0462            JP     K8
0430  C3 045D            JP     K7
```

```
0433  C3 0474              JP      KS              ;SPACE
0436  C3 04E1              JP      CLRENT          ;CLEAR ENTRY
0439  C3 046C              JP      K0
043C  C3 0474              JP      KS              ;SPACE
              +     KEYNUM  MACRO   X              ;LOADS ASCII
              +             LD      B,X
              +             JP      NUMPR
                            ENDM
043F          +     K1:     KEYNUM  '1'
0444          +     K2:     KEYNUM  '2'
0449          +     K3:     KEYNUM  '3'
044E          +     K4:     KEYNUM  '4'
0453          +     K5:     KEYNUM  '5'
0458          +     K6:     KEYNUM  '6'
045D          +     K7:     KEYNUM  '7'
0462          +     K8:     KEYNUM  '8'
0467          +     K9:     KEYNUM  '9'
046C          +     K0:     KEYNUM  '0'
0471  C3 0240       KF:     JP      FUNKEY
0474          +     KS:     KEYNUM  ' '            ;SPACE
0479  CD 04FD       KYSNDN: CALL    KYGONE
047C  3A 1000               LD      A,(XMTBUF)     ;TEST SUPER CARD BYTE
047F  FE 20                 CP      20H
0481  CA 03ED               JP      Z,KYUN         ;NOT SUPER
0484  C3 037D               JP      SUPSND         ;SEND MSG

;NUMPR PROCESSES NUMBER INTO FIELDS.
                            ;ENTER WITH KEY NUMBER IN ASCII IN REGISTER B.
0487  CD 04F1       NUMPR:  CALL    FLDLIM         ;CALCULATE FIELD LIMIT, PASS IN A
048A  C6 05                 ADD     A,LCINPT       ;INITIAL LCD POSITION
048C  21 10DA               LD      HL,LCDPTR      ;CURRENT LCD CURSOR POSITION
048F  BE                    CP      (HL)           ;AT LIMIT ?
0490  CA 049F               JP      Z,NMFL         ;YES, AT LIMIT
0493  08                    EX      AF,AF'         ;SAVE LIMIT
0494  CD 04B6       KEYWR:  CALL    KEYIT          ;NOT 8
0497  28 06                 JR      Z,NMFL         ;AT LIMIT ?
0499  CD 0402               CALL    CURWR          ;NOT AT LIMIT
049C  C3 03ED               JP      KYUN

;FIELD LIMIT HAS BEEN REACHED, PREVENTS ADDITIONAL ENTRIES.
049F  21 085A       NMFL:   LD      HL,FULL        ;GET "FULL" MESSAGE
04A2  11 1090               LD      DE,DISBUF+16
04A5  01 0004               LD      BC,4
04A8  ED B0                 LDIR
04AA  21 1080               LD      HL,DISBUF
04AD  22 10D2               LD      (DISPTR),HL
04B0  CD 083A               CALL    SHOW
04B3  C3 03ED               JP      KYUN

;LOADS KEY VALUE INTO FIELD AND ADJUSTS POINTERS.
                            ;ENTER WITH ASCII KEY NUMBER IN REGISTER B.
04B6  2A 10D7       KEYIT:  LD      HL,(CURPTR)    ;PUT KEY VALUE IN DISBUF
04B9  70                    LD      (HL),B
04BA  2A 10E1               LD      HL,(XDTPTR)    ;GET XMTBUF POINTER
04BD  70                    LD      (HL),B         ;PUT KEY CHARACTER
04BE  21 10E1               LD      HL,XDTPTR      ;NEXT POSITION
04C1  34                    INC     (HL)
```

```
04C2  21 1008         LD    HL,DISBUF
04C5  22 10D2         LD    (DISPTR),HL
04C8  CD 083A         CALL  SHOW
04CB  21 10DA         LD    HL,LCDPTR    ;GET LCD CHARACTER POINTER
04CE  34              INC   (HL)         ;NEXT CHARACTER POSITION
04CF  08              EX    AF,AF'       ;GET FIELD LIMIT
04D0  BE              CP    (HL)         ;A HAS FIELD LIMIT
04D1  C9              RET                ;Z = 1 MEANS AT LIMIT

;HL CONTAINS CURRENT LCDPTR
04D2  7E       CURWR: LD    A,(HL)       ;GET CURRENT POSITION
04D3  C6 C0           ADD   A,80H OR 40H ;FORM COMMAND
04D5  4F              LD    C,A
04D6  CD 097C         CALL  DISPCMD
04D9  2A 10D7         LD    HL,(CURPTR)  ;GET DISPLAY POINTER
04DC  23              INC   HL           ;NEXT POSITION
04DD  22 10D7         LD    (CURPTR),HL
04E0  C9              RET

;CLRENT WILL CLEAR THE CURRENT SPECIFIC FIELD IN
                      ;THE TRANSMIT BUFFER.
04E1  CD 04F1  CLRENT: CALL FLDLIM       ;LIMIT IS IN A
04E4  47              LD    B,A
04E5  CD 03FB         CALL  XBPT         ;GET FIRST CHARACTER POSITION
04E8  3E 20           LD    A,' '
04EA  77       STFSP: LD    (HL),A
04EB  23              INC   HL
04EC  10 FC           DJNZ  STFSP
04EE  C3 0393         JP    SECLN

;FLDLIM CALCULATES THE FIELD SIZE FOR THE
                      ;CURRENT FIELD SELECTION, LEAVES ACTUAL LIMIT IN A.
04F1  21 09FF  FLDLIM: LD   HL,FLDSZE    ;FIELD SIZE TABLE
04F4  16 00           LD    D,0
04F6  3A 10D9         LD    A,(FIELD)    ;GET FIELD NUMBER
04F9  5F              LD    E,A
04FA  19              ADD   HL,DE        ;FIELD OFFSET
04FB  7E              LD    A,(HL)       ;GET ACTUAL LIMIT
04FC  C9              RET

;KYGONE TESTS FOR KEY(S) OFF
04FD           + KYGONE: WDOG            ;WATCH DOG TIMER TRIGGER
04FF  AF              XOR   A            ;TEST FOR KEY STILL ON
0500  D3 E0           OUT   (KYBD),A
0502  DB E0           IN    A,(KYBD)
0504  FE F0           CP    0F0H
0506  20 F5           JR    NZ,KYGONE    ;STILL ON
               +      TIMER MS*20        ;BOUNCE DELAY
0514  DB E0           IN    A,(KYBD)
0516  FE F0           CP    0F0H         ;CHECK AGAIN
0518  20 E3           JR    NZ,KYGONE    ;STILL ON
051A  C9              RET

;CRECV IS UART RECEIVER PROCESSOR, LOWEST PRIORITY INTERRUPT
051B           + CRECV: WDOG             ;WATCH DOG TIMER TRIGGER
               +      SAVE               ;SAVE REGISTERS
```

```
0525  21 1040              LD    HL,RECBUF      ;MESSAGE STORAGE
0528  DB 00                IN    A,(RECRD)      ;CLEAR DATA READY
052A  06 20                LD    B,32           ;EXACT CHARACTER COUNT
052C  0E FF        ENTPL:  LD    C,0FFH         ;LOAD BREAK COUNTER
052E             +POLLDR:  WDOG                 ;WATCH DOG TIMER TRIGGER
0530  0D                   DEC   C
0531  CA 0541              JP    Z,RECEX        ;NO MORE INCOMING DATA
0534  DB 10                IN    A,(SFEN)       ;READ UART STATUS FLAGS
0536  CB 67                BIT   4,A            ;TEST DATA READY
0538  28 F4                JR    Z,POLLDR       ;DR FALSE, NO DATA YET
053A  DB 00                IN    A,(RECRD)      ;DR TRUE,READ RECEIVER DATA
053C  77                   LD    (HL),A         ;PUT IN MEMORY
053D  23                   INC   HL             ;NEXT REGISTER
053E  05                   DEC   B              ;CHARACTER COUNTER
053F  18 EB                JR    ENTPL
0541  AF           RECEX:  XOR   A
0542  B8                   CP    B              ;SHOULD BE 32 CHARACTERS
0543  C2 0558              JP    NZ,NOYZ
0546  21 1040              LD    HL,RECBUF      ;POINT DISPLAY TO
0549  22 1002              LD    (DISPTR),HL    ;RECEIVED TEXT
054C  21 10DB              LD    HL,INTFLG
054F  CB C6                SET   RECFL,(HL)     ;RECEIVER FLAG
0551  11 3000              LD    DE,3000H       ;START COM LINE COUNTER
0554  ED 53 10DF           LD    (COMCTR),DE
0558  3A 10DC      NOYZ:   LD    A,(LOCK)       ;TEST SECURITY LOCK FLAG
055B  CB 47                BIT   SECLOCK,A
055D  3E 97                LD    A,10010111B
055F  28 02                JR    Z,NOYZ1        ;FLAG IS OFF, LOCK BIT IS OFF
0561  3E 17                LD    A,00010111B    ;PULSE XEN ON, LOCK BIT IS ON
0563  D3 30        NOYZ1:  OUT   (OUTPT),A
0565  CB 8F                RES   1,A            ;XEN OFF
0567  D3 30                OUT   (OUTPT),A
             +             RESTORE              ;RESTORE REGISTERS
0571  FB                   EI
0572  C9                   RET

;INTERRUPT SERVICE FOR UNBUFFERED CARD READER, HIGHEST PRIORITY.
                 ;** NOTE: DATA IS INVERTED. **
0573         +   UBUFRD:   SAVE                 ;SAVE REGISTERS
057B  AF                   XOR   A              ;CLEAR LOCK FLAG
057C  32 10DC              LD    (LOCK),A
057F  3E 9D                LD    A,10011101B    ;ALL OFF
0581  D3 30                OUT   (OUTPT),A
0583  21 10A0              LD    HL,CRDBUF      ;CARD DATA BUFFER
0586  0E 00                LD    C,0            ;CLEAR FIRST LOCATION
0588  71                   LD    (HL),C
0589  06 07                LD    B,7            ;BIT COUNTER FOR ASCII
058B  11 2000      ZLP0:   LD    DE,2000H       ;TIME-OUT COUNTER
058E         +   ZLP:      WDOG                 ;WATCH DOG TIMER TRIGGER
0590  1B                   DEC   DE
0591  7A                   LD    A,D
0592  B3                   OR    E
0593  CA 06C2              JP    Z,BADPTR
0596  DB 40                IN    A,(INPT)       ;READ INPUTS
0598  CB 77                BIT   6,A            ;STROBE ?
059A  28 F2                JR    Z,ZLP          ;NO STROBE
```

```
059C  D3 50              OUT    (RSTFF),A    ;GOT A STROBE,CLEAR THE F/F
059E  2F                 CPL                 ;DATA IS INVERTED
059F  CB 7F              BIT    7,A          ;TEST FOR 1 BIT
05A1  28 E8              JR     Z,ZLP0       ;NOT YET

;FOUND A ONE BIT, START PROCESSING CHARACTERS. LSB IS THE
                         ;FIRST BIT RECEIVED, SHIFTING IS TO THE RIGHT.
05A3  CB F6       SETBIT: SET   6,(HL)       ;SET MEMORY BIT AT (HL)
05A5              + SHFTST: WDOG              ;WATCH DOG TIMER TRIGGER
05A7  11 2000            LD     DE,2000H
05AA  10 15              DJNZ   SHF          ;IS THIS THE 7TH BIT ?
05AC  7E                 LD     A,(HL)       ;CHARACTER DONE
05AD  FE 1F              CP     1FH          ;END SENTINEL?
05AF  20 0A              JR     NZ,NXTCR     ;NOT END SENTINEL
05B1  22 1004            LD     (ENDSENT),HL ;SAVE LOCATION OF ES
05B4  06 07              LD     B,7          ;RELOAD BIT COUNTER
05B6  23                 INC    HL           ;NEXT LOCATION
05B7  71                 LD     (HL),C       ;CLEAR IT
05B8  C3 05DC            JP     ONEMOR
05BB  06 07       NXTCR: LD     B,7          ;RELOAD BIT COUNTER
05BD  23                 INC    HL           ;POINT TO NEXT LOCATION
05BE  71                 LD     (HL),C       ;CLEAR IT
05BF  18 02              JR     STR1
05C1  CB 3E       SHF:   SRL    (HL)         ;MOVE TO NEXT BIT
05C3              + STR1: WDOG                ;WATCH DOG TIMER TRIGGER
05C5  1B                 DEC    DE
05C6  7A                 LD     A,D
05C7  83                 OR     E
05C8  CA 06C2            JP     Z,BADPTR
05CB  DB 40              IN     A,(INPT)     ;READ INPUTS
05CD  CB 77              BIT    6,A          ;STROBE ?
05CF  28 F2              JR     Z,STR1       ;NO STROBE
05D1  D3 50              OUT    (RSTFF),A    ;RESET F/F
05D3  2F                 CPL                 ;DATA IS INVERTED
05D4  CB 7F              BIT    7,A          ;READ THE DATA BIT
05D6  28 CD              JR     Z,SHFTST     ;DATA IS 0
05D8  18 C9              JR     SETBIT       ;DATA IS 1
                         ;END SENTINEL FOUND, ACCEPT ONLY ONE MORE CHARACTER
05DA  CB 3E       SHIF:  SRL    (HL)         ;MOVE BITS IN MEMORY
05DC  11 2000     ONEMOR: LD    DE,2000H
05DF              + GTLRC: WDOG               ;WATCH DOG TIMER TRIGGER
05E1  1B                 DEC    DE
05E2  7A                 LD     A,D
05E3  83                 OR     E
05E4  28 11              JR     Z,ENDIT
05E6  DB 40       STR2:  IN     A,(INPT)
05E8  CB 77              BIT    6,A          ;STROBE ?
05EA  28 F3              JR     Z,GTLRC      ;NO
05EC  D3 50              OUT    (RSTFF),A    ;RESET STROBE FLAG F/F
05EE  2F                 CPL                 ;DATA IS INVERTED
05EF  CB 7F              BIT    7,A          ;LOOK AT DATA BIT
05F1  28 02              JR     Z,SHFTS      ;BIT = 0
05F3  CB F6       SETBT: SET    6,(HL)       ;BIT = 1
05F5  10 E3       SHFTS: DJNZ   SHIF         ;MORE BITS
                         ;GOT ALL CHARACTERS, WAIT UNTIL NO MORE STROBES
05F7  11 1000     ENDIT: LD     DE,1000H
```

```
05FA              +   FINSH:  WDOG                    ;WATCH DOG TIMER TRIGGER
05FC    1B                    DEC     DE
05FD    7A                    LD      A,D
05FE    B3                    OR      E
05FF    28 0A                 JR      Z,SSTST
0601    DB 40                 IN      A,(INPT)
0603    CB 77                 BIT     6,A             ;STROBE ?
0605    28 F3                 JR      Z,FINSH         ;NO
0607    D3 50                 OUT     (RSTFF),A       ;RESET STROBE FLAG F/F
0609    18 EC                 JR      ENDIT           ;STROBES STILL PRESENT
                              ;NO MORE STROBES, START ANALYSIS FOR VALIDATION OF CARD DATA
060B    3A 10A0       SSTST:  LD      A,(CRDBUF)      ;GET START SENTINEL
060E    FE 45                 CP      45H             ;SHOULD BE SPECIAL %
0610    28 03                 JR      Z,ESTST         ;OK
0612    C3 06C2               JP      BADPTR          ;BAD READ
0615    ED 5B 1004    ESTST:  LD      DE,(ENDSENT)    ;SS OK, LOCATION OF ES
0619    1A                    LD      A,(DE)          ;GET ES
061A    FE 1F                 CP      1FH             ;IS IT ES?
061C    28 03                 JR      Z,LRCTST        ;OK
061E    C3 06C2               JP      BADPTR          ;IF NOT ES
0621    2A 1004       LRCTST: LD      HL,(ENDSENT)    ;COMPUTE # OF CHARACTERS
0624    11 10A0               LD      DE,CRDBUF       ;INCLUDE SS
0627    AF                    XOR     A
0628    ED 52                 SBC     HL,DE
062A    45                    LD      B,L
062B    04                    INC     B               ;INCLUDE ES
062C    21 10E5               LD      HL,CHRCNT       ;REG CARD IS 18 CHARACTERS
062F    70                    LD      (HL),B          ;SAVE CHARACTER COUNT
0630    21 10A0               LD      HL,CRDBUF       ;FIRST CHARACTER
0633    AF                    XOR     A
0634    AE            COMP:   XOR     (HL)
0635    23                    INC     HL              ;NEXT CHARACTER
0636    10 FC                 DJNZ    COMP            ;UNTIL DONE
0638    F6 40                 OR      40H             ;SET PARITY BIT
063A    E2 063F               JP      PO,PARTST       ;PARITY OK, NOW
063D    CB B7                 RES     6,A             ;PARITY WRONG, ADJUST IT
063F    32 1006       PARTST: LD      (CLRC),A        ;SAVE IT
0642    2A 1004               LD      HL,(ENDSENT)    ;GET END SENTINEL LOCATION
0645    23                    INC     HL              ;NEXT LOCATION HAS LRC
0646    BE                    CP      (HL)            ;COMPARE TO COMPUTED LRC
0647    28 03                 JR      Z,CHNG          ;LRC OK, CARD DATA ACCEPTED
0649    C3 06C2               JP      BADPTR          ;BAD LRC

;CHNG CONVERTS SPECIAL MAG CARD CHARACTERS TO NORMAL ASCII
                              ;AND PUTS THEM IN TRANSMIT BUFFER.
                              ;CARD DATA AT CRDBUF IS NOT MODIFIED.
                              ;S ATION SWITCH IS CONVERTED TO ASCII AND LOADED INTO TRANSMIT BUFFER.
064C    DB E1         Ch.6:   IN      A,(STASW)       ;GET STATION NUMBER
064E    2F                    CPL                     ;INVERTED DATA
064F    E6 7F                 AND     7FH             ;MASK ALARM ON/OFF SWITCH FROM STATION
0651    32 10EA               LD      (SWBUF),A       ;NUMBER IN MESSAGE.  (R.9)
                              ;CONVERT STATION SWITCH DATA TO 3 ASCII CHARACTERS.
0654    06 08                 LD      B,8             ;8 BITS TO PROCESS
0656    AF                    XOR     A
0657    21 10EB               LD      HL,SWBUF+1
065A    77                    LD      (HL),A          ;CLEAR INITIAL RESULT LOCATIONS
```

```
065B   23                            INC      HL
065C   77                            LD       (HL),A
065D              +      LOOP1:      WDOG                      ;WATCH DOG TIMER TRIGGER
065F   AF                            XOR      A
0660   21 10EA                       LD       HL,SWBUF
0663   7E                            LD       A,(HL)
0664   8F                            ADC      A,A
0665   77                            LD       (HL),A
0666   21 10EC                       LD       HL,SWBUF+2
0669   0E 02                         LD       C,2
066B   7E           LOOP2:           LD       A,(HL)
066C   8F                            ADC      A,A
066D   27                            DAA
066E   77                            LD       (HL),A
066F   2B                            DEC      HL
0670   0D                            DEC      C
0671   C2 066B                       JP       NZ,LOOP2
0674   10 E7                         DJNZ     LOOP1
                           ;BINARY NUMBER HAS BEEN CONVERTED TO 2 PACKED BCD BYTES,
                           ;EXPAND TO ASCII AND STORE IN XMTBUF.
0676   3A 10EB                       LD       A,(SWBUF+1)
0679   F6 30                         OR       30H
067B   32 1001                       LD       (XMTBUF+1),A     ;100'S BYTE
067E   21 10EC                       LD       HL,SWBUF+2
0681   ED 6F                         RLD                       ;10'S NIBBLE
0683   32 1002                       LD       (XMTBUF+2),A
0686   ED 6F                         RLD                       ;1'S NIBBLE
0688   32 1003                       LD       (XMTBUF+3),A
                           ;CHECK FOR EMPTY CARD BUFFER.
068B   2A 1004                       LD       HL,(ENDSENT)     ;CALCULATE # OF CHARACTERS
068E   11 10A1                       LD       DE,CRDBUF+1
0691   AF                            XOR      A                ;CLEAR CARRY
0692   ED 52                         SBC      HL,DE            ;NUMBER OF CHARACTERS
0694   CA 06BA                       JP       Z,NODT           ;NO CHARACTERS ENCODED
0697   06 10                         LD       B,16             ;CHARACTER COUNTER
0699   21 10A1                       LD       HL,CRDBUF+1      ;SOURCE OF CARD DATA
069C   11 1010                       LD       DE,XMTBUF+16     ;TRANSMIT BUFFER
069F   CD 0800                       CALL     CONVRT           ;DO 16 CHARACTERS
                  +                  WDOG                      ;WATCH DOG TIMER TRIGGER
06A4   21 10E5                       LD       HL,CHRCNT        ;TEST FOR SUPERVISOR CARD
06A7   7E                            LD       A,(HL)
06A8   FE 13                         CP       19               ;SUPER CARD IS 19
06AA   20 23                         JR       NZ,TRGO          ;IF NOT SUPER CARD
06AC   2A 1004                       LD       HL,(ENDSENT)     ;GET SUPER-CARD CHARACTER
06AF   2B                            DEC      HL               ;CONVERT THE CHARACTER
06B0   11 1000                       LD       DE,XMTBUF        ;BYTE 0
06B3   06 01                         LD       B,1
06B5   CD 0800                       CALL     CONVRT
06B8   18 18                         JR       CRDX
06BA   21 0A33      NODT:            LD       HL,ERRND         ;NO DATA ON CARD
06BD   22 1002                       LD       (DISPTR),HL
06C0   18 06                         JR       BADRD
                           ;BADPTR IS EXIT FOR "BAD" CARD READS
06C2   21 0A13      BADPTR: LD                HL,CRDRPT        ;GET REPEAT MESSAGE
06C5   22 1002                       LD       (DISPTR),HL
                           ;BADRD IS EXIT FOR "NO-DATA" CARD READS
06C8   3E 0A        BADRD:  LD                A,0AH            ;SET BAD CARD-READ AND ERROR
```

```
06CA   32 10DB              LD     (INTFLG),A        ;BEEP FLAGS, NO TRANSMIT
06CD   18 00                JR     CRDEX
                    ;TRGO IS EXIT FOR "GOOD" EMPLOYEE CARD READS AND REPEAT TRANSMISSIONS
06CF   CD 06E3      TRGO:   CALL   TRANS             ;SEND TO CONCENTRATOR
                    ;CRDX IS EXIT FOR "GOOD" SUPER CARD READS
06D2   3E 08        CRDX:   LD     A,CMRETRY         ;NUMBER OF COM RETRIES ALLOWED
06D4   32 10E7              LD     (COMTRY),A        ;NO TRANSMIT YET
                    ;CRDEX IS EXIT FOR ALL CARD READS
06D7               + CRDEX: WDOG                     ;WATCH DOG TIMER TRIGGER
                   +        RESTORE                  ;RESTORE REGISTERS
06E1   FB                   EI
06E2   C9                   RET

;TRANSMITTER DRIVER. IF THE LINE DRIVER IS ENABLED,
                    ;TRANSMISSION WILL BEGIN WHEN THE TBRL PIN IS STROBED.
                    ;FIELD 8 IS CHECKED FOR LEGAL CONTENT: ALL SPACES OR
                    ;NUMBER BETWEEN 001 AND 500.
06E3   21 103A      TRANS:  LD     HL,XMTBUF+58      ;FIELD 8
06E6   46                   LD     B,(HL)            ;1ST CHARACTER
06E7   23                   INC    HL
06E8   4E                   LD     C,(HL)            ;2ND CHARACTER
06E9   23                   INC    HL
06EA   56                   LD     D,(HL)            ;3RD CHARACTER
06EB   78                   LD     A,B
06EC   81                   ADD    A,C
06ED   82                   ADD    A,D
06EE   FE 60                CP     ' '+' '+' '       ;ALL SPACES ?
06F0   28 28                JR     Z,LEGAL           ;ALL SPACES IS OK
06F2   3E 20                LD     A,' '             ;LOOK FOR SINGLE SPACES
06F4   B8                   CP     B
06F5   28 6A                JR     Z,NTLEG
06F7   B9                   CP     C
06F8   28 67                JR     Z,NTLEG
06FA   BA                   CP     D
06FB   28 64                JR     Z,NTLEG
06FD   3E 35                LD     A,'5'             ;NO SPACES, 1ST CHAR > 5?
06FF   B8                   CP     B
0700   FA 0761              JP     M,NTLEG           ;1ST CHAR = 6,7,8,OR 9
0703   28 0D                JR     Z,LK500           ;1ST CHAR = 5
0705   3E 30                LD     A,'0'             ;1ST CHAR = 0 ?
0707   B8                   CP     B
0708   20 10                JR     NZ,LEGAL
070A   B9                   CP     C
070B   20 0D                JR     NZ,LEGAL
070D   BA                   CP     D
070E   20 0A                JR     NZ,LEGAL
0710   18 4F                JR     NTLEG
0712   3E 30        LK500:  LD     A,'0'             ;TEST FOR 500 MAX.
0714   B9                   CP     C
0715   20 4A                JR     NZ,NTLEG
0717   BA                   CP     D
0718   20 47                JR     NZ,NTLEG
071A   21 10DB      LEGAL:  LD     HL,INTFLG
071D   CB D6                SET    OKCDFL,(HL)       ;SET GOOD CARD-READ FLAG
```

```
                        ;WAITMR IS TIME BETWEEN REPEAT TRANSMISSIONS.
071F  11 0300           LD    DE,300H
0722  ED 53 10E8        LD    (WAITMR),DE
0726  21 10E7           LD    HL,COMTRY      ;DECREMENT COM TRY COUNTER
0729  35                DEC   (HL)
072A  CD 0795           CALL  XMTLRC         ;GENERATE TRANSMIT LRC
072D  21 1000           LD    HL,XMTBUF      ;SOURCE BUFFER FOR DATA
0730  06 40             LD    B,64           ;BYTE COUNTER
0732  3E 9D             LD    A,10011101B    ;RESET UART
0734  D3 30             OUT   (OUTPT),A      ;PULSE MR
0736  CB EF             SET   5,A            ;D5 IS UART MR
0738  D3 30             OUT   (OUTPT),A
073A  CB AF             RES   5,A
073C  D3 30             OUT   (OUTPT),A
073E  CB CF             SET   1,A            ;ENABLE LINE DRIVER
0740  D3 30             OUT   (OUTPT),A
0742  DB 10      POLLT: IN    A,(SFEN)       ;POLL UART TRANSMITTER
0744  CB 5F             BIT   3,A            ;BUFFER REG EMPTY FLAG.
0746  28 FA             JR    Z,POLLT        ;TRANSMIT BUFFER NOT EMPTY
0748  7E                LD    A,(HL)         ;NOW EMPTY, GET CHARACTER
0749  D3 20             OUT   (TBRL),A       ;LOAD TRANSMIT BUFFER
                 +      WDOG                 ;WATCH DOG TIMER TRIGGER
074D  23                INC   HL             ;NEXT CHARACTER
074E  10 F2             DJNZ  POLLT          ;MORE?
                 +      TIMER MS*10
075C  3E 9D             LD    A,10011101B    ;NO, DISABLE LINE DRIVER
075E  D3 30             OUT   (OUTPT),A
0760  C9                RET 0761  21 100B    NTLE8: LD    HL,INTFLG      ;SET FIELD 8 FLAG
0764  CB E6             SET   FLD8FL,(HL)
0766  11 2000           LD    DE,2000H       ;START DISPLAY HOLD COUNTER
0769  ED 53 10DD        LD    (DPHOLD),DE
076D  C9                RET

;BUZZ THE ALARM
076E  0E 0A      SQEK:  LD    C,10
0770  06 89      BEEPM: LD    B,89H
0772  CD 0006           CALL  LEDALR         ;ALARM ON (?), RED LED ON
                 +      TIMER MS*30
0781  3E 9D             LD    A,10011101B    ;ALL OFF
0783  D3 30             OUT   (OUTPT),A
                 +      TIMER MS*30
0791  0D                DEC   C
0792  20 DC             JR    NZ,BEEPM
0794  C9                RET

;THIS ROUTINE GENERATES THE TRANSMIT LRC. 62 CHARACTERS
                        ;IN THE BUFFER ARE INCLUDED, THE 64TH IS THE LRC.
                        ;PARITY IS BIT 0, CHARACTER 62. PARITY IS EVEN.
0795  21 1000    XMTLRC:LD    HL,XMTBUF      ;FIRST CHARACTER
0798  06 3E             LD    B,62           ;DO NOT INCLUDE LRC
079A  AF                XOR   A
079B  AE         XLR:   XOR   (HL)
079C  23                INC   HL
079D  10 FC             DJNZ  XLR            ;DO 62 CHARACTERS
079F  32 103F           LD    (XLRC),A       ;STORE LRC
```

```
07A2  87                    OR      A           ;PARITY ?
07A3  EA 07AC               JP      PE,PAROK    ;IF EVEN
07A6  3E 01                 LD      A,1         ;SET PARITY BIT
07A8  32 103E               LD      (XLRC-1),A  ;STORE PARITY BIT
07AB  C9                    RET
07AC  AF           PAROK:   XOR     A           ;PARITY BIT = 0
07AD  32 103E               LD      (XLRC-1),A
07B0  C9                    RET

+              REPT    800H-$      ;FILL WITH RESTART TO 38H
             +              RST     38H
             +              ENDM

;;;;;;;;;;;;;;;;;;;;;;;;;;;;;;;;;;;;;;;;;;;;;;;;;;;;;;;;;;;;;;;

;SECOND PROM STARTS HERE, CONTAINS UTILITIES AND TEXT BLOCKS
                ORG     800H
;CONVERTS RAW CARD DATA IN CRDBUF TO STANDARD ASCII.
;SOURCE MUST BE IN HL, DESTINATION IN DE, CHARACTER
;COUNT IN B.
0800  0E 00        CONVRT:  LD      C,0         ;FIRST CARD COLUMN NIBBLE
0802  7E           FNDCOL:  LD      A,(HL)      ;GET CARD CHARACTER
0803  E6 30                 AND     30H         ;LEAVE BITS 4,5
0805  B9                    CP      C           ;A = C?
0806  28 06                 JR      Z,COMPL     ;FOUND COLUMN
0808  79                    LD      A,C         ;NEXT COLUMN
0809  C6 10                 ADD     A,10H
080B  4F                    LD      C,A
080C  18 F4                 JR      FNDCOL
080E  7E           COMPL:   LD      A,(HL)      ;GET CHARACTER
080F  E6 0F                 AND     0FH         ;STRIP HI BITS
0811  81                    ADD     A,C         ;GET ASCII COLUMN
0812  C6 20                 ADD     A,20H       ;ASCII OFFSET
0814  12                    LD      (DE),A      ;PUT ASCII CHARACTER IN BUFFER
0815  23                    INC     HL          ;NEXT CHARACTER
0816  13                    INC     DE          ;NEXT STORAGE LOCATION
0817  10 E7                 DJNZ    CONVRT      ;MORE CHARACTERS?
0819  C9                    RET

+              REPT    32          ;FILL
             +              RST     38H
             +              ENDM

;SHOW IS THE LCD DRIVER. DISPTR POINTS TO THE FIRST CHARACTER.
;DATA MUST BE TRANSFERRED TO DISBUF (RAM).
083A  F3           SHOW:    DI
083B  2A 1002               LD      HL,(DISPTR) ;DATA LOCATION
083E  01 0020               LD      BC,32       ;LENGTH OF DISPLAY RAM
0841  11 1000               LD      DE,DISBUF   ;DESTINATION
0844  ED B0                 LDIR
0846  0E 02                 LD      C,DISPHM    ;CURSOR TO HOME POSITION  (R.10)
0848  CD 097C               CALL   DISPCMD
             +              TIMER   MS*2
0857  21 1000               LD      HL,DISBUF   ;DISPLAY BUFFER
085A  16 02                 LD      D,2         ;DISPLAY LINE COUNTER
085C  1E 10        NULIN:   LD      E,16        ;CHARACTERS/LINE
```

```
085E  06 02        NXTCHR: LD    B,2              ;TWO NIBBLES FOR CHARACTER
0860  3E 10                LD    A,10H            ;DATA WRITE,ENABLE LOW
0862  ED 6F        ROT:    RLD                    ;PUT NIBBLE IN A, D0-D3
0864  CD 098B              CALL  DPULSE
0867  10 F9                DJNZ  ROT              ;GO AROUND FOR SECOND NIBBLE
0869  ED 6F                RLD                    ;RESTORE CHARACTER MEMORY
086B  23                   INC   HL               ;NEXT CHARACTER LOCATION
086C  1D                   DEC   E                ;CHARACTER/LINE COUNTER
086D  28 02                JR    Z,LIN            ;THIS LINE DONE?
086F  18 ED                JR    NXTCHR           ;LINE NOT DONE
0871                LIN:   WDOG                   ;WATCH DOG TIMER TRIGGER
0873  15                   DEC   D                ;LINE COUNTER
0874  28 0A                JR    Z,ENEI           ;NO MORE,EXIT
0876  0E C0                LD    C,0C0H           ;SEND CURSOR TO SECOND LINE
0878  D5                   PUSH  DE               ;SAVE LINE COUNTER
0879  CD 097C              CALL  DISPCMD
087C  D1                   POP   DE
087D  C3 085C              JP    NULIN            ;DO SECOND LINE
0880  FB           ENEI:   EI
0881  C9                   RET
                   +       REPT  32               ;FILL
                   +       RST   38H
                   +       ENDM

;FILL THE DISPLAY BUFFER WITH SPACES AND CLEAR THE DISPLAY
08A2  3E 20        DISSPC: LD    A,' '
08A4  21 1000              LD    HL,DISBUF
08A7  06 20                LD    B,32
08A9  77           FLSP:   LD    (HL),A
08AA  23                   INC   HL
08AB  10 FC                DJNZ  FLSP
08AD  0E 01                LD    C,DISPCLR
08AF  CD 097C              CALL  DISPCMD
08B2  C9                   RET

+       REPT  32               ;FILL
                   +       RST   38H
                   +       ENDM

;NSC810 INITIALIZATION: PORTS AND BAUD RATE GENERATOR.
08B3  3E 00        PTINIT: LD    A,0              ;BASIC I/O FOR KEYBOARD
08B5  D3 E7                OUT   (BASE+7),A       ;PORT A MODE DEFINITION
                                                  ;REGISTER (MDR)
08B7  3E 0F                LD    A,00001111B      ;0 = INPUT(HORIZONTAL ROWS)
                                                  ;1 = OUTPUT(VERTICAL COLUMNS)
08B9  D3 E4                OUT   (BASE+4),A       ;PORT A DATA DIRECTION
08BB  3E 00        PORTB:  LD    A,0              ;PORT B IS ALL INPUTS FOR
08BD  D3 E5                OUT   (BASE+5),A       ;8 BIT CLOCK ADDRESS SWITCH
                   ;NSC810 TIMER T1 IS USED TO GENERATE THE UART BAUD RATE CLOCK
                   ;FROM THE MASTER OSCILLATOR. CRYSTAL IS 1.8432 MHz.
                   ;MODE 5 IS SQUARE WAVE OUTPUT.
                   ;TIMER OUTPUT TOGGLES EACH TIME THE COUNTER REACHES 0.
                   ;COUNT OF 2 GIVES 9,600 BAUD. (153,600 Hz.)
08BF  3E 25        PORTC:  LD    A,25H            ;MODE 5,SINGLE BYTE
08C1  D3 F9                OUT   (BASE+19H),A
08C3  3E 23                LD    A,23H            ;PORT C DDR, BITS 0,1 & 5
08C5  D3 E6                OUT   (BASE+6),A       ;= OUTPUT
```

```
08E7   3E 02          TMR1:   LD      A,2             ;TIMER T1 LSB, MODULUS =
08E9   D3 F2                  OUT     (BASE+12H),A    ;COUNT - 1
08EB   D3 F7                  OUT     (BASE+17H),A    ;ANY WRITE TO START TIMER
08ED   C9                     RET

+              REPT    32              ;FILL
              +              RST     38H
              +              ENDM

;INITIALIZATION FOR LCD DISPLAY, (HITACHI LSI SET)
090E          +      DINIT:  TIMER   MS*20           ;STABILIZATION TIME
091A   06 03                  LD      B,3             ;NIBBLE WRITE IS 3,3,3,2
091C   3E 03          HIT3:   LD      A,3
091E   CD 09B8                CALL    DPULSE
              +              TIMER   MS*10
092D   10 ED                  DJNZ    HIT3
092F   3E 02                  LD      A,2
0931   CD 09B8                CALL    DPULSE
              +              TIMER   MS*10
0940   0E 0C                  LD      C,DISPON        ;DISPLAY ON, CURSOR OFF [0CH]
0942   CD 097C                CALL    DISPCMD
0945   0E 06                  LD      C,6             ;ENTRY MODE [0,6]
0947   CD 097C                CALL    DISPCMD
094A   0E 01                  LD      C,DISPCLR       ;CLEAR THE DISPLAY [01]
094C   CD 097C                CALL    DISPCMD
              +              TIMER   MS*10           ;MEDIUM DELAY
095B   C9                     RET

+              REPT    32              ;FILL
              +              RST     38H
              +              ENDM

;DISPCMD SENDS COMMANDS TO THE LCD. COMMAND WORD MUST BE
                      ;IN REGISTER C BEFORE CALL.
097C   06 02          DISPCMD:LD     B,2              ;ALL COMMANDS ARE 2 NIBBLES
097E   79                     LD      A,C             ;GET COMMAND BYTE
097F   0F                     RRCA                    ;MOVE TO PUT MSN IN D0-D3
0980   0F                     RRCA
0981   0F                     RRCA
0982   0F                     RRCA
0983   E6 0F          DSTB:   AND     0FH             ;MASK HI BITS
0985   CD 09B8                CALL    DPULSE
0988   79                     LD      A,C             ;GET COMMAND
0989   10 F8                  DJNZ    DSTB            ;GO BACK FOR LSN
              +              TIMER   US225
0997   C9                     RET

+              REPT    32              ;FILL
              +              RST     38H
              +              ENDM

;WRITE STROBE FOR LCD.
09B8   D3 90          DPULSE: OUT    (DISP),A
09BA   CB F7                  SET     6,A
09BC   D3 90                  OUT     (DISP),A
09BE   CB B7                  RES     6,A
09C0   D3 90                  OUT     (DISP),A
```

```
09C2    C9                              RET

+               REPT    32              ;FILL
                        +               RST     38H
                        +               ENDM

;GENERIC TIME DELAY ROUTINE, PARAMETER IS IN TDADD.
09E3                    +       DELAY:  SAVE
09EB    ED 5B 1000                      LD      DE,(TDADD)      ;GET TIME DELAY PARAMETER
09EF                    +       DLYLP:  WDOG                    ;WATCH DOG TIMER TRIGGER
09F1    1B                              DEC     DE
09F2    7A                              LD      A,D
09F3    B3                              OR      E
09F4    20 F9                           JR      NZ,DLYLP
                        +               RESTORE                 ;RESTORE REGISTERS
09FE    C9                              RET

;               END OF INSTRUCTION CODE.

$EJECT

;       REFERENCES, TEXT BLOCKS, TABLES AND MESSAGES.

;ORGANIZATION OF RING MESSAGE:
                                ;ALL CHARACTERS ARE ASCII UNLESS INDICATED OTHERWISE.
                                ;
                                ;BYTE   0       SPACE(20H) OR SUPERVISOR CHARACTER
                                ;       1-3     STATION SWITCH, MSD IS 1
                                ;       4-13    BLANKS FOR TIME/CALENDAR INSERTION
                                ;       14-15   USER FIELD 0
                                ;       16-21   COMPANY CODE, 1
                                ;       22-31   EMPLOYEE CODE, 2
                                ;       32-35   CONTROL 3
                                ;       36-39   CONTROL 4
                                ;       40-43   CONTROL 5
                                ;       44-47   CONTROL 6
                                ;       48-57   FUNCTION, 7
                                ;       58-60   EARNINGS CODE, 8
                                ;       61      SHIFT CODE, 9
                                ;       62      PARITY OF LRC, EVEN, BINARY
                                ;       63      LRC OF CHARACTERS 0-61, BINARY

;SIZE OF KEY FIELDS ARRANGED IN ORDER
09FF    02 06 0A 04             FLDSZE: DB      2,6,10,4,4,4,4,10,3,1
0A03    04 04 04 0A
0A07    03 01

;XBIAS IS STARTING LOCATION OF EACH DATA FIELD IN THE TRANSMIT BUFFER
0A09    0E 10 16 20             XBIAS:  DB      14,16,22,32,36,40,44,48,58,61
0A0D    24 28 2C 30
0A11    3A 3D

;DISPLAY TEXT BLOCKS.
0A13    20 45 52 52             CRDRPT: DB      ' ERROR) BAD READ'
0A17    4F 52 3E 20
0A1B    42 41 44 20
```

```
0A1F   52 45 41 44
0A23   52 65 70 65              DB      'Repeat Card Pass'
0A27   61 74 20 43
0A2B   61 72 64 20
0A2F   50 61 73 73
0A33   20 45 52 52     ERRND:   DB      ' ERROR) NO DATA'
0A37   4F 52 3E 20
0A3B   20 4E 4F 20
0A3F   44 41 54 41
0A43   52 65 70 65              DB      'Repeat Card Pass'
0A47   61 74 20 43
0A4B   61 72 64 20
0A4F   50 61 73 73
0A53   53 59 53 54     NOCOMSG: DB      'SYSTEM OFF-LINE!'
0A57   45 4D 20 4F
0A5B   46 46 2D 4C
0A5F   49 4E 45 21
0A63   20 20 50 4C              DB      ' PLEASE WAIT   '
0A67   45 41 53 45
0A6B   20 57 41 49
0A6F   54 20 20 20
0A73   2A 20 53 59     SDYMSG:  DB      '* SYSTEM DELAY *'
0A77   53 54 45 4D
0A7B   20 44 45 4C
0A7F   41 59 20 2A
0A83   20 20 50 6C              DB      ' Please wait!  '
0A87   65 61 73 65
0A8B   20 77 61 69
0A8F   74 21 20 20
0A93   49 4C 4C 45     ILLEG:   DB      'ILLEGAL'
0A97   47 41 4C
0A9A   20 20 41 4C     ALTMSG:  DB      ' ALTER         '
0A9E   54 45 52 20
0AA2   20 20 20 20
0AA6   20 20 20 20
0AAA   46 55 4E 43              DB      'FUNCTION F ?   '
0AAE   54 49 4F 4E
0AB2   20 20 46 20
0AB6   3F 20 20 20
0ABA   46 20 3A 55     USER:    DB      'F :USER        '   ;FIELD 0
0ABE   53 45 52 20
0AC2   20 20 20 20
0AC6   20 20 20 20
0ACA   46 20 3A 43     COMCDE:  DB      'F :COMPANY CODE '  ;1
0ACE   4F 4D 50 41
0AD2   4E 59 20 43
0AD6   4F 44 45 20
0ADA   46 20 3A 42     BADGE:   DB      'F :BADGE NUMBER '  ;2
0ADE   41 44 47 45
0AE2   20 4E 55 4D
0AE6   42 45 52 20
0AEA   46 20 3A 43     CONT3:   DB      'F :CONTROL 3    '  ;3
0AEE   4F 4E 54 52
0AF2   4F 4C 20 33
0AF6   20 20 20 20
0AFA   46 20 3A 43     CONT4:   DB      'F :CONTROL 4    '  ;4
0AFE   4F 4E 54 52
```

```
0802   4F 4C 20 34
0806   20 20 20 20
080A   46 20 3A 43           CONT5:   DB      'F :CONTROL 5   '       ;5
080E   4F 4E 54 52
0812   4F 4C 20 35
0816   20 20 20 20
081A   46 20 3A 43           CONT6:   DB      'F :CONTROL 6   '       ;6
081E   4F 4E 54 52
0822   4F 4C 20 36
0826   20 20 20 20
082A   46 20 3A 46           FNCTN:   DB      'F :FUNCTION    '       ;7
082E   55 4E 43 54
0832   49 4F 4E 20
0836   20 20 20 20
083A   46 20 3A 45           ERNCDE:  DB      'F :EARNINGS CODE'      ;8
083E   41 52 4E 49
0842   4E 47 53 20
0846   43 4F 44 45
084A   46 20 3A 53           SHFCDE:  DB      'F :SHIFT CODE  '       ;9
084E   48 49 46 54
0852   20 43 4F 44
0856   45 20 20 20
085A   46 55 4C 4C           FULL:    DB      'FULL'

+                              REPT    0FFFH-$         ;FILL TO END OF PROM
       +                              RST     38H             ;WITH RESTART 38H
       +                              ENDM

;BUFFERS AND STORAGE LOCATIONS FOR WORKING PARAMETERS
                                      .PHASE  RAM
1000                         XMTBUF:  DS      64              ;TRANSMITTER BUFFER
1040                         RECBUF:  DS      64              ;RECEIVER BUFFER
1080                         DISBUF:  DS      32              ;DISPLAY BUFFER
10A0                         CRDBUF:  DS      48              ;MAG CARD READER BUFFER
10D0                         TDADD:   DS      2               ;TIME DELAY PARAMETER
10D2                         DISPTR:  DS      2               ;DISPLAY MESSAGE POINTER
10D4                         ENDSENT: DS      2               ;END SENTINEL POINTER
10D6                         CLRC:    DS      1               ;COMPUTED MAG CARD DATA LRC
10D7                         CURPTR:  DS      2               ;DISPLAY BUFFER CURSOR POINTER
10D9                         FIELD:   DS      1               ;FUNCTION OVERRIDE FIELD NUMBER
10DA                         LCDPTR:  DS      1               ;LCD POINTER FOR CURSOR
10DB                         INTFLG:  DS      1               ;RECEIVER, MAG CARD-READ FLAGS
10DC                         LOCK:    DS      1               ;SECURITY LOCK FLAG BYTE
10DD                         DPHOLD:  DS      2               ;DISPLAY HOLD COUNTER (TIMER)
10DF                         COMCTR:  DS      2               ;COM-LINE BREAK COUNTER (TIMER)
10E1                         XDTPTR:  DS      2               ;TRANSMIT BUFFER DATA POINTER
10E3                         LPGCTR:  DS      2               ;MAIN LOOP COUNTER (TIMER)
10E5                         CHRCNT:  DS      1               ;NUMBER OF CARD CHARACTERS
10E6                         TIMDIG:  DS      1               ;STORE LATEST TOD MSG MINUTES
10E7                         COMTRY:  DS      1               ;NUMBER OF COM REPEATS
10E8                         WAITMR:  DS      2               ;TIME BETWEEN REPEAT TRANSMISSIONS
10EA                         SWBUF:   DS      6               ;SPACE TO EXPAND STATION SWITCH
10F0                         PREVMN:  DS      1               ;PREVIOUS TOD MINUTE 1'S DIGIT
                                      .DEPHASE
                                      END
```

Macros:

| KEYNUM | KYFLD | RESTORE | SAVE | TIMER |
| --- | --- | --- | --- | --- |
| WDOG | | | | |

Symbols:

| 01A0 | ACKOK | 0A9A | ALTMSG | 0143 | ANMSG |
| --- | --- | --- | --- | --- | --- |
| 0ADA | BADGE | 06C2 | BADPTR | 06C8 | BADRD |
| 00E0 | BASE | 011F | BCR | 00EA | BCRF |
| 0001 | BDCDFL | 00AD | BDFL | 00C6 | BEEPF |
| 0003 | BEEPFL | 0770 | BEEPM | 0002 | BPFLG |
| 064C | CHNG | 10E5 | CHRCNT | 01F7 | CLEAN |
| 10D6 | CLRC | 04E1 | CLRENT | 020C | CLRXMT |
| 0220 | CLRXX | 0008 | CMRETRY | 0ACA | COMCDE |
| 10DF | COMCTR | 0175 | COMFLG | 0634 | COMP |
| 080E | COMPL | 10E7 | CONTRY | 0085 | CONTST |
| 0AEA | CONT3 | 0AFA | CONT4 | 080A | CONT5 |
| 081A | CONT6 | 0000 | CONVRT | 1000 | CRDBUF |
| 06D7 | CRDEX | 0A13 | CRDRPT | 06D2 | CRDX |
| 051B | CRECV | 1007 | CURPTR | 000F | CURSOR |
| 0AD2 | CURWR | 09E3 | DELAY | 090E | DINIT |
| 1000 | DISBUF | 0090 | DISP | 0001 | DISPCLR |
| 097C | DISPCMD | 0002 | DISPHM | 0008 | DISPOF |
| 000C | DISPON | 1002 | DISPTR | 0104 | DISREC |
| 08A2 | DISSPC | 03C6 | DL | 09EF | DLYLP |
| 0070 | DPCT | 100D | DPHOLD | 0988 | DPULSE |
| 0983 | DSTB | 05F7 | ENDIT | 1004 | ENDSENT |
| 0800 | ENEI | 0380 | ENREC | 0004 | ENRSTB |
| 0002 | ENRSTC | 052C | ENTPL | 083A | ERNCDE |
| 0A33 | ERRND | 0615 | ESTST | 10D9 | FIELD |
| 05FA | FINSH | 0223 | FKEY | 0004 | FLDBFL |
| 04F1 | FLDLIM | 0388 | FLDPR | 09FF | FLDSZE |
| 08A9 | FLSP | 039A | FLSPC | 082A | FNCTN |
| 0002 | FNDCOL | 02C7 | FNDKEY | 0054 | FOKEY |
| 02DF | FOTABL | 085A | FULL | 0240 | FUNKEY |
| 02A2 | GLEDON | 05DF | GTLRC | 091C | HIT3 |
| 0A93 | ILLEG | 0040 | INPT | 00E2 | INTCR |
| 10DB | INTFLG | 003C | INTSRA | 0034 | INTSRB |
| 002C | INTSRC | 0038 | INTSRV | 046C | K0 |
| 043F | K1 | 0444 | K2 | 0449 | K3 |
| 044E | K4 | 0453 | K5 | 0458 | K6 |
| 045D | K7 | 0462 | K8 | 0467 | K9 |
| 0486 | KEYIT | 02A8 | KEYON | 0494 | KEYWR |
| 0471 | KF | 0474 | KS | 030F | KY0 |
| 0317 | KY1 | 0327 | KY2 | 0337 | KY3 |
| 033F | KY4 | 0347 | KY5 | 034F | KY6 |
| 0357 | KY7 | 035F | KY8 | 0367 | KY9 |
| 036F | KYALT | 00E0 | KYBD | 04FD | KYGONE |
| 0372 | KYSNDF | 0479 | KYSNDN | 03ED | KYUN |
| 10DA | LCDPTR | 0005 | LCINPT | 00DF | LDALR |
| 00D6 | LEDALR | 071A | LEGAL | 0871 | LIN |
| 0712 | LK500 | 10DC | LOCK | 026B | LOOP |
| 065D | LOOP1 | 066B | LOOP2 | 10E3 | LPGCTR |
| 0264 | LPING | 0621 | LRCTST | 002A | MS |
| 018A | MSGPR | 040F | NMTABL | 014E | NOCOM |
| 0A53 | NOCOMSG | 06BA | NODT | 0558 | NOYZ |
| 0563 | NOYZ1 | 0761 | NTLEG | 085C | NULIN |

| | | | | | |
|---|---|---|---|---|---|
| 0487 | NUMPR | 049F | NWFL | 085E | NXTCHR |
| 05BB | NXTCR | 0002 | OKCDFL | 05DC | ONEMOR |
| 0030 | OUTPT | 07AC | PAROK | 063F | PARTST |
| 02C9 | PAT1 | 02D0 | PAT2 | 052E | POLLDR |
| 0742 | POLLT | 080B | PORTB | 08DF | PORTC |
| 10F0 | PREVMN | 0803 | PTINIT | 1000 | RAM |
| 1040 | RECBUF | 0541 | RECEX | 0000 | RECFL |
| 0000 | RECRD | 007D | RECRDY | 0062 | ROT |
| 0125 | RPTXMT | 0050 | RSTFF | 00C8 | RTCBSE |
| 0A73 | SDYMSG | 0393 | SECLN | 0000 | SECLOCK |
| 05A3 | SETBIT | 85F3 | SETBT | 0010 | SFEN |
| 05C1 | SHF | 0B4A | SHFCDE | 05F5 | SHFTS |
| 05A5 | SHFTST | 05DA | SHIF | 083A | SHOW |
| 00D1 | SOFF | 076E | SQEK | 060B | SSTST |
| 1800 | STACK | 0000 | START | 00E1 | STASW |
| 04EA | STFSP | 01F1 | STHH | 01C1 | STHOLD |
| 05C3 | STR1 | 05E6 | STR2 | 003F | STRT |
| 037D | SUPSND | 10EA | SWBUF | 0020 | TBRL |
| 10D0 | TDADD | 01A1 | THLD | 10E6 | TIMDIG |
| 08E7 | TMR1 | 06E3 | TRANS | 06CF | TRG0 |
| 0573 | UBUFRD | 0001 | US225 | 0ABA | USER |
| 10E8 | WAITMR | 009F | WAITST | 0A09 | XBIAS |
| 03FB | XBPT | 10E1 | XDTPTR | 079B | XLR |
| 103F | XLRC | 1000 | XMTBUF | 0795 | XMTLRC |
| 058E | ZLP | 058B | ZLP0 | | |

No fatal error(s)

The invention claimed is:

1. An attendance recording system comprising:
a plurality of satellite devices, each adapted to register information concerning the respective arrival and departure times of a plurality of individuals, and having means for storing said information temporarily;
at least one central device having storage means capable of writing to and reading from a non-volatile storage medium adapted to permanently store said information for a substantial plurality of said individuals, processing means, data communication means responsive to said processing means, first communications channel means linking said communications means to said satellite devices, and program means arranged to direct said processing means to cause said data communications means to periodically read out of said temporary storage means of said satellite devices and transmit over said communications channel means and write to said non-voltile storage medium of said storage means of said central device information relating to said substantial plurality of individuals;
and means for communicating the information stored by said non-volatile storage medium to a general purpose programmable computer;
said means for communicating with said general purpose programmable computer including additional communications channel means capable of connection to said general purpose programmable computer;
said program means being arranged to direct said processing means to cause said data communications means to read out said information from said non-volatile storage means and transmit it over said additional communications channel means.

2. In a system of the type adapted to record arrival and departure times of employees;
said system being designed for use with a plurality of machine-readable identification documents adapted to be given to respective employees and at least one supervisor, said documents containing information for identifying the recipients thereof;
the identification document of any such supervisor containing information which distinguishes a supervisor from non supervisors;
said system having at least one time clock station including document reading means adapted to read said identification documents, alterable storage means for storing information read from said identification documents, user-operated means for altering the currently stored information, processing means, and program means for directing said processing means;
the improvement wherein said program means is arranged to cause said processing means to prevent said user-operated altering means from altering at least one reserved field comprising less than all of the information read from said identification documents and stored in said alterable storage means, but to permit said reserved field to be altered thereby when said supervisor identifying information is detected.

3. A system according to claim 2 in which said reserved field includes said information for identifying the recipients of said identification documents, whereby said supervisor may operate said time clock station on behalf of an employee who is not in possession of the latter's identification document.

4. A system according to claim 2 in which:

said program means is arranged to prevent alteration of said reserved field in said alterable storage means by anyone prior to reading of said identification document, to register an unaltered attendance message immediately upon reading of said identification document if no supervisor identifying information is detected, and to withhold registering said attendance message upon detecting said supevisor identifying information so that it may be altered prior to registration;

and further comprising means for manually registering said attendance message at a selected time after said supervisor identifying information is detected and alterations, if any, have been made.

5. A system as in claim 4, further comprising:

a remote data collection device having storage means to permanently store information read from said documents by said time clock station;

and communication means responsive to said processing means for linking said data collection device to said time clock station;

and wherein said program means is arranged to register an attendance message by directing said data communications means to read out said information from said alterable storage means of said time clock station and transmit it over said communications means and write it to said storage means of said data collection device.

6. A system adapted to record arrival and departure times of employees, comprising:

at least one satellite device;

at least one central device having time-keeping means, data communications means, communications channel means linking said communications means to said satellite devices, and means arranged to cause said data communications means to communicate time information supplied by said time-keeping means over said communications channel means to said satellite devices;

said satellite devices being adapted to employ the time information supplied by said central device to register information concerning arrival and departure times of respective individuals, and having means for storing said information;

said central device having means arranged to cause said data communications means to read out said information stored by said satellite devices over said communications channel means;

and power supply means at said satellite devices and said central device, each including both means adapted to power said devices from an alternating current outlet and battery-operated back-up power supply means arranged to power said devices in the event of a failure of the alternating current supply in a manner to permit said employees to clock out in the event of a plant closure during said power failure.--

7. A system as in claim 6 wherein said battery-operated back-up power supply means comprises rechargeable battery means connected to be charged from said alternating current outlet between power failures.

* * * * *